United States Patent
Inaba et al.

(10) Patent No.: US 9,501,934 B2
(45) Date of Patent: Nov. 22, 2016

(54) NOTIFICATION SYSTEM, ELECTRONIC DEVICE, NOTIFICATION METHOD, AND PROGRAM

(71) Applicant: HONDA MOTOR CO., LTD., Tokyo (JP)

(72) Inventors: Tomonobu Inaba, Utsunomiya (JP); Kenta Kawakami, Utsunomiya (JP); Tomoya Komizo, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/776,068

(22) PCT Filed: Mar. 26, 2014

(86) PCT No.: PCT/JP2014/058505
§ 371 (c)(1),
(2) Date: Sep. 14, 2015

(87) PCT Pub. No.: WO2014/157322
PCT Pub. Date: Oct. 2, 2014

(65) Prior Publication Data
US 2016/0027305 A1    Jan. 28, 2016

(30) Foreign Application Priority Data
Mar. 28, 2013  (JP) .................................. 2013-070528

(51) Int. Cl.
*G08G 1/09* (2006.01)
*G08G 1/16* (2006.01)
(Continued)

(52) U.S. Cl.
CPC ............... *G08G 1/166* (2013.01); *B60Q 9/008* (2013.01); *G01C 21/3697* (2013.01);
(Continued)

(58) Field of Classification Search
CPC .................... G08G 1/166; G08G 1/167; G08G 1/0112; G08G 1/0133; G08G 1/164;
(Continued)

(56) References Cited

U.S. PATENT DOCUMENTS 7,254,481 B2 *  8/2007  Yamada ............... G01C 21/343
340/988
7,493,214 B2 *  2/2009  Jung ................. G08G 1/096816
340/995.19
(Continued)

FOREIGN PATENT DOCUMENTS

JP   2001-357499 A   12/2001
JP   2007-172417 A   7/2007
(Continued)

OTHER PUBLICATIONS

International Search Report dated May 13, 2014, issued in counterpart Application No. PCT/JP2014/058505 (2 pages).

*Primary Examiner* — Anh V La
(74) *Attorney, Agent, or Firm* — Westerman, Hattori, Daniels & Adrian, LLP

(57) ABSTRACT

A notification system includes: a first extraction unit configured to extract caution-required locations present within a predetermined distance range centered on a current position of a vehicle from a plurality of caution-required locations of which the positional information is previously acquired; a second extraction unit configured to extract caution-required locations present within a predetermined angle centered on a current traveling direction of the vehicle from the plurality of caution-required locations; a third extraction unit configured to extract, as a notification target point, a caution-required location where the current position of the vehicle is present within a predetermined angle range centered on the orientation of a link through which the vehicle is determined to pass by referring to map data holding information of a (Continued)

plurality of links in which positions and orientations are matched with each other, from caution-required locations extracted in common by both the first extraction unit and the second extraction unit; and an execution unit configured to execute a caution-required location traveling notification in accordance with the approach of the vehicle to the notification target point extracted by the third extraction unit.

8 Claims, 30 Drawing Sheets

(51) Int. Cl.
*G09B 29/10* (2006.01)
*G01C 21/36* (2006.01)
*G09B 29/00* (2006.01)
*G08G 1/01* (2006.01)
*B60Q 9/00* (2006.01)

(52) U.S. Cl.
CPC ........... *G08G 1/0112* (2013.01); *G08G 1/0133* (2013.01); *G08G 1/0145* (2013.01); *G08G 1/164* (2013.01); *G08G 1/167* (2013.01); *G09B 29/007* (2013.01); *G09B 29/10* (2013.01)

(58) Field of Classification Search
CPC .................. G08G 1/0145; G60Q 9/008; G09B 29/007; G09B 29/10; G01C 21/3697
USPC .......... 340/905, 990, 995.19, 991, 992, 993, 340/994, 988; 701/426, 533, 411, 410, 424
See application file for complete search history.

(56) References Cited

U.S. PATENT DOCUMENTS

| | | | |
|---|---|---|---|
| 2011/0040626 A1* | 2/2011 | Lin | G01C 21/3682 705/14.63 |
| 2013/0147955 A1* | 6/2013 | Oosugi | G08G 1/096716 348/148 |

FOREIGN PATENT DOCUMENTS

| | | |
|---|---|---|
| JP | 2008-051642 A | 3/2008 |
| JP | 2010-170401 A | 8/2010 |
| JP | 2011-133427 A | 7/2011 |

* cited by examiner

NOTIFICATION SYSTEM, ELECTRONIC DEVICE, NOTIFICATION METHOD, AND PROGRAM

TECHNICAL FIELD

The present invention relates to a notification system, an electronic device, a notification method, and a program.

Priority is claimed on Japanese Patent Application No. 2013-70528, filed on Mar. 28, 2013; the contents of which are incorporated herein by reference.

BACKGROUND

There are techniques of detecting drivers' dangerous actions and the positions thereof and emitting a warning when vehicles approach the detected positions. For example, a technique described in Patent Document 1 is a warning system mounted on a vehicle. This warning system detects dangerous driving of the vehicle that exceeds safety criteria, records the positional information of the vehicle when there is dangerous driving on the basis of the detected signal, and warns a user that a position showing the previously recorded positional information of the vehicle when there is dangerous driving is close to a current position.

RELATED ART DOCUMENTS

Patent Documents

[Patent Document 1] Japanese Unexamined Patent Application, First Publication No. 2008-051642

SUMMARY OF INVENTION

Problems to be Solved by the Invention

However, in the technique described in Patent Document 1, a determination whether the vehicle approaches a position (hereinafter referred to as an action location) where a dangerous action has been performed and a determination whether the vehicle passes through the action location are not disclosed. There are problems in that the determination whether the vehicle approaches the action location and the determination whether the vehicle passes through the action location cannot be performed, and notification for the action location (caution-required location) cannot be made. In this way, there is a problem in that a user's convenience when the caution-required location is reported is not sufficient in the related art.

In view of the foregoing, an object of an aspect of the invention is to provide a notification system, an electronic device, a notification method, and a program that can improve a user's convenience when a caution-required location is reported.

Means for Solving the Problem

In the notification system, the electronic device, the notification method, and the program related to the aspects of the invention, the following configurations are adopted in order to attain the above object.

(1) A notification system according to an aspect of the invention includes: a first extraction unit configured to extract caution-required locations present within a predetermined distance range centered on a current position of a vehicle from a plurality of caution-required locations of which the positional information is previously acquired; a second extraction unit configured to extract caution-required locations present within a predetermined angle centered on a current traveling direction of the vehicle from the plurality of caution-required locations; a third extraction unit configured to extract, as a notification target point, a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted commonly by both the first extraction unit and the second extraction unit; and an execution unit configured to execute a caution-required location traveling notification in accordance with the approach of the vehicle to the notification target point extracted by the third extraction unit.

(2) In the above aspect (1), a target speed, which is calculated for each of the caution-required locations and each of the links and becomes a target for safely passing through a caution-required location may be included in the information of the plurality of links, wherein the notification system further may include: a distance determination unit configured to determine whether or not the distance between the current position of the vehicle and the notification target point is within a predetermined distance; a measurement unit configured to measure a traveling speed of the vehicle; a speed determination unit configured to compare the traveling speed of the vehicle measured by the measurement unit and the target speed of the link of the caution-required location; a first time determination unit configured to determine whether or not the vehicle reaches the notification target point from the current position of the vehicle within a first time threshold when the vehicle travels at the traveling speed measured by the measurement unit; and a second time determination unit configured to determine whether or not the vehicle reaches the notification target point from the current position of the vehicle within a second time threshold when the vehicle travels at the traveling speed measured by the measurement unit, and wherein the execution unit may execute the caution-required location traveling notification in the notification target point, on the basis of determination results of the distance determination unit, the speed determination unit, the first time determination unit, and the second time determination unit.

(3) In the above aspect (1) or (2), the execution unit may provide an operation allowable angle range where the caution-required location traveling notification is allowed to be executed around the orientation of the notification target point and may execute the caution-required location traveling notification when the current position of the vehicle is present within the operation allowable angle range.

(4) In any one of the above aspects (1) to (3), the execution unit may not execute the caution-required location traveling notification when a minimum speed of the vehicle within a past predetermined period of time exceeds a given speed.

(5) In any one of the above aspects (1) to (4), the caution-required location may be a caution-required location where a caution is predicted and determined to be required when a vehicle passes through a certain point, on the basis of the traveling history of a plurality of vehicles that is previously generated.

(6) An electronic device according to another aspect of the invention includes: a first extraction unit configured to extract caution-required locations present within a predetermined distance range centered on a current position of a vehicle from a plurality of caution-required locations of which the positional information is previously acquired; a second extraction unit configured to extract caution-required locations present within a predetermined angle centered on a current traveling direction of the vehicle from the plurality of caution-required locations; a third extraction unit configured to extract a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted commonly by both the first extraction unit and the second extraction unit; and an execution unit configured to execute a caution-required location traveling notification in accordance with the approach of the vehicle to the caution-required location extracted by the third extraction unit.

(7) A notification method according to another aspect of the invention includes: a first process of extracting caution-required locations present within a predetermined distance range centered on a current position of a vehicle from a plurality of caution-required locations of which the positional information is previously acquired; a second process of extracting caution-required locations present within a predetermined angle centered on a current traveling direction of the vehicle from the plurality of caution-required locations; a third process of extracting a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted commonly by both the first process and the second process; and a fourth process of executing a caution-required location traveling notification in accordance with the approach of the vehicle to the caution-required location extracted in the third process.

(8) A program according to another aspect of the invention causes a computer to execute: a first step of extracting caution-required locations present within a predetermined distance range centered on a current position of a vehicle from a plurality of caution-required locations of which the positional information is previously acquired; a second step of extracting caution-required locations present within a predetermined angle centered on a current traveling direction of the vehicle from the plurality of caution-required locations; a third step of extracting a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted commonly by both the first step and the second step; and a fourth step of executing a caution-required location traveling notification in accordance with the approach of the vehicle to the caution-required location extracted in the third step.

Advantage of the Invention

According to the above aspect (1), the notification system can extract the caution-required location where the current position of the vehicle is present within the predetermined distance range where the vehicle is located, within the predetermined angle centered on the current traveling direction of the vehicle, and within the predetermined angle range centered on the orientation of the link through which the vehicle is determined to pass, from the plurality of caution-required locations and can execute the caution-required location traveling notification in response to the vehicle approaching the caution-required location. For this reason, a user's convenience when the caution-required location is reported can be improved.

According to the above aspect (2), the notification system can determine whether or not the caution-required location traveling notification is executed in accordance with the distance from the position of the vehicle at the notification target point, the target speed and the traveling speed, the acceleration/deceleration operation of a notification target vehicle driver, and the time taken for the notification target point to reach a predetermined distance and can execute the caution-required location traveling notification only with respect to a caution-required location that satisfies a predetermined condition.

According to the above aspect (3), the notification system can provide the operation allowable angle range and can perform extraction of the notification target point, thereby suppressing erroneous notification on a parallel road or the like.

According to the above aspect (4), the notification system can determine whether or not the caution-required location traveling notification is executed on the basis of the minimum speed for a past predetermined period of time and can suppress the caution-required location traveling notification when the vehicle travels on a limited highway (freeway) or the like.

According to the above aspect (5), the notification system can extract the notification target point from the caution-required locations, which are predicted and determined on the basis of the traveling history of the plurality of vehicles, as a caution-required location in advance, and can execute the caution-required location traveling notification in response to the vehicle approaching the caution-required location. For this reason, a user's convenience when the caution-required location is reported can be improved.

According to the above aspect (6), the electronic device can extract the caution-required location where the current position of the vehicle is present within the predetermined distance range where the vehicle is located, within the predetermined angle centered on the current traveling direction of the vehicle, and within the predetermined angle range centered on the orientation of the link through which the vehicle is determined to pass, from the plurality of caution-required locations and can execute the caution-required location traveling notification in response to the vehicle approaching the caution-required location. For this reason, a user's convenience when the caution-required location is reported can be improved.

According to the above aspect (7), the notification method can extract the caution-required location where the current position of the vehicle is present within the predetermined distance range where the vehicle is located, within the predetermined angle centered on the current traveling direction of the vehicle, and within the predetermined angle range centered on the orientation of the link through which the vehicle is determined to pass, from the plurality of caution-required locations and can execute the caution-required location traveling notification in response to the vehicle approaching the caution-required location. For this reason, a user's convenience when the caution-required location is reported can be improved.

According to the above aspect (8), the program can extract the caution-required location where the current position of the vehicle is present within the predetermined distance range where the vehicle is located, within the predetermined angle centered on the current traveling direction of the vehicle, and within the predetermined angle range centered on the orientation of the link through which the vehicle is determined to pass, from the plurality of caution-required locations, and can execute the caution-required location traveling notification in response to the vehicle approaching the caution-required location. For this reason, a user's convenience when the caution-required location is reported can be improved.

In this way, according to an aspect of the invention, a user's convenience when the caution-required location is reported can be improved.

DESCRIPTION OF THE EMBODIMENTS

First Embodiment

Figure 1:
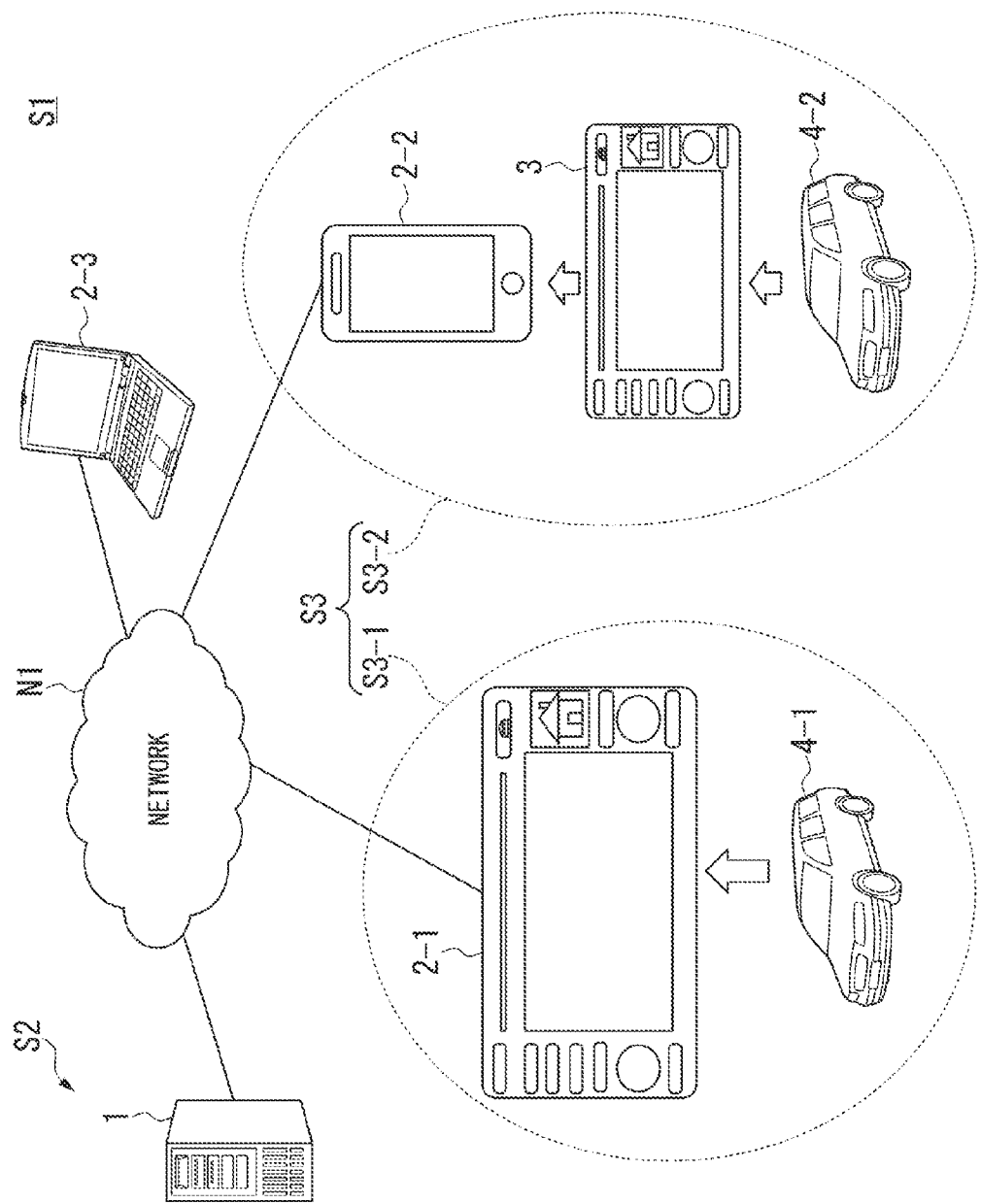
FIG. 1 is a schematic view illustrating an example of the configuration of a driving assist system related to a first embodiment of the invention.

Hereinafter, a first embodiment of the invention will be described in detail, referring to the drawings.

FIG. 1 is a schematic view illustrating an example of the configuration of a driving assist system S1 related to the first embodiment of the invention.

The driving assist system S1 includes a navigation information gathering system S2 and a navigation system S3.

The navigation information gathering system S2 includes a navigation information gathering device 1 and generates driving assist location information (hereinafter, also referred to as caution-required location information) including driving assist locations which the navigation system S3 provides a vehicle.

Here, the driving assist location is a location that is predicted to require assistance when a vehicle travels through the location (certain point). The driving assist location includes a caution-required location where caution is required when a vehicle travels through the location (certain point). The caution-required location includes, for example, an intersection where sudden deceleration occurs frequently, that is, a sudden braking frequent occurrence intersection or the like.

The navigation system S3 includes a navigation system S3-1 and a navigation system S3-2.

In the navigation system S3-1, for example, an electronic device 2-1 (for example, a vehicle-mounted terminal device equipped with communication means connectable with a network N1) mounted on a vehicle 4-1 gathers vehicle control information, such as the vehicle speed of the vehicle 4-1, acceleration when the vehicle 4-1 accelerates, deceleration when the vehicle 4-1 decelerates, an engine speed, and a brake state, and positional information (for example, latitude and longitude) and transmits the information to the navigation information gathering system S2 via the network N1. Additionally, the navigation system S3-1 executes driving assist of the vehicle 4-1 for a driver, on the basis of the driving assist location information if the driving assist location information is received.

In the navigation system S3-2, for example, an electronic device 2-2 (for example, a smart phone) mounted on a vehicle 4-2 gathers vehicle control information, such as the vehicle speed, the acceleration, the deceleration, the engine speed, and the brake state of the vehicle 4-2, via a vehicle-mounted terminal device 3 that is not equipped with communication means connectable with the network N1, and positional information (for example, latitude and longitude) and transmits the information to the navigation information gathering system S2 via the network N1. Additionally, the navigation system S3-2 executes driving assist of the vehicle 4-2 for a driver, on the basis of the driving assist location information if the driving assist location information is received.

Here, the communication between the electronic device 2-1 or the electronic device 2-2 and the navigation information gathering system S2 is realized by performing wireless communication with a base station device (not illustrated) within the network N1 and by performing wired or wireless communication between the base station device and the navigation information gathering device 1.

The driving assist system S1 may also include an electronic device 2-3 (for example, a personal computer). The electronic device 2-3 can communicate with the navigation information gathering device 1 in a wired or wireless manner via the network N1 and can display the driving assist location information, and an evaluation result (to be described below) when a vehicle is made to travel on the basis of the driving assist location information. Additionally, a user of the electronic device 2-3 can contribute to social media services by adopting remarks, comments, or the like when a vehicle actually travels on the basis of the driving assist location information using the electronic device 2-3 as word-of-mouth information.

The network N1 includes a base station device with which a mobile station device communicates, a relay device that relays the communication between the base station device and another base station device, a network management device, a home base station device, or the like.

Additionally, in the following description, a device obtained by connecting the electronic device 2-1, the electronic device 2-3, the vehicle-mounted terminal device 3 that is not equipped with the communication means connectable with the network N1, and the electronic device 2-2 in a wired or wireless manner is generically referred to as the electronic device 2. Additionally the vehicles 4-1 and 4-2 are generically referred to as a vehicle 4.

Figure 2:
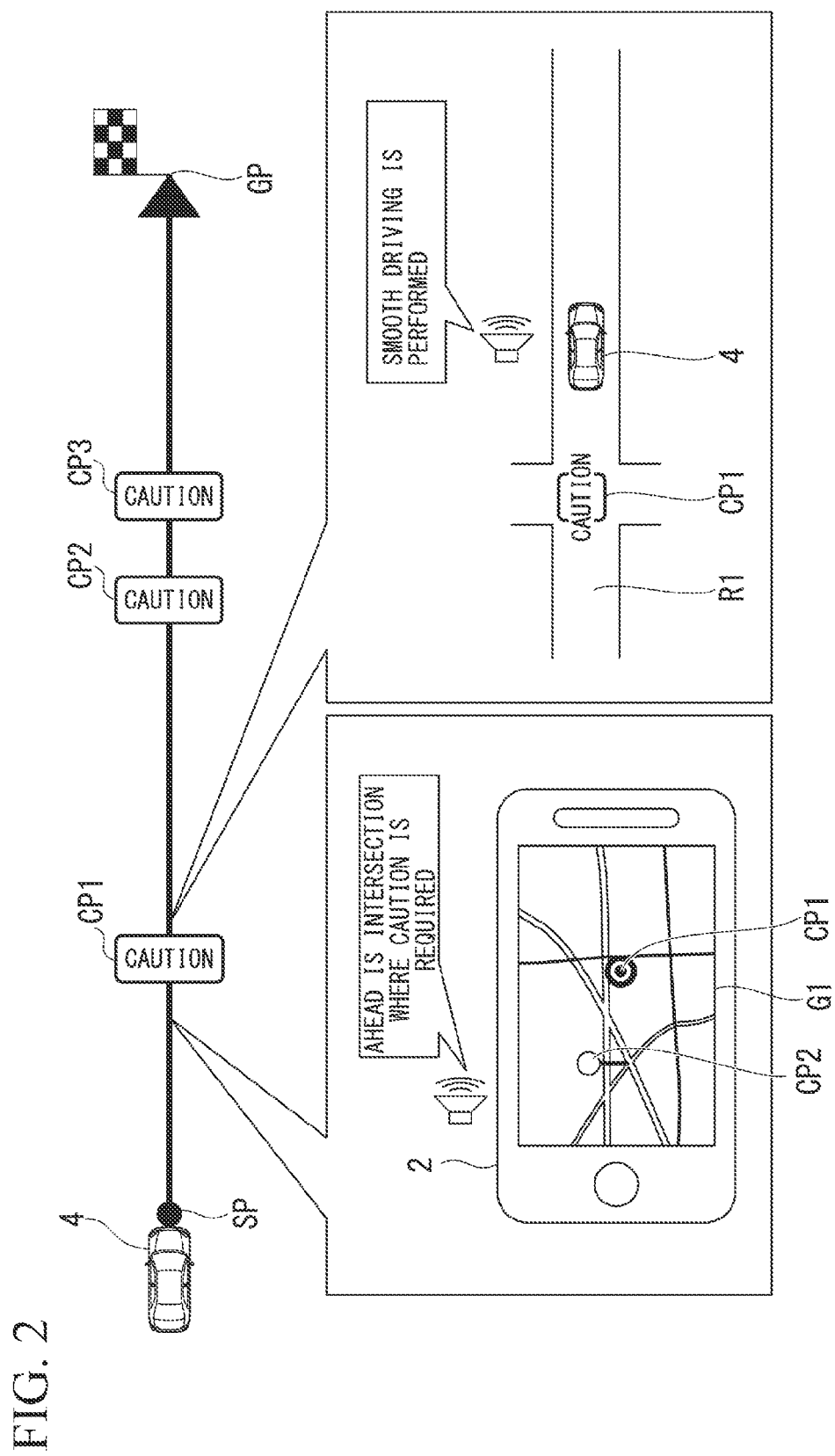
FIG. 2 is an explanatory view explaining an example of the usage of the driving assist system related to the present embodiment.

FIG. 2 is an explanatory view explaining an example of the usage of the driving assist system S1 related to the present embodiment.

When a driver drives the vehicle 4 from a starting point SP toward a goal point GP, a plurality (for example, three) of caution-required locations CP1, CP2, and CP3 that are predicted and for which it is determined that caution is required for traveling when passing through the locations (certain points) are present on the traveling route of the vehicle 4 from the starting point SP to the goal point GP on the basis of the driving assist location information.

For example, when the vehicle 4 approaches the caution-required location CP1, the electronic device 2 makes a display device of the electronic device 2 display an image G1, such as a map or a road schematic view and display a mark or a figure on the caution-required location CP1, or outputs a message "Ahead is an intersection where caution is required" with sound, thereby notifying a driver of the vehicle 4 of the caution-required location CP1 (the notification for traveling of the caution-required location, the traveling notification in the caution-required location, caution-required location traveling notification).

Additionally, for example, immediately after the vehicle 4 appropriately (safely) passes through the caution-required location CP1, the electronic device 2 evaluates the traveling aspect of the vehicle 4 in the caution-required location CP1, notifies the driver of the vehicle 4 of "Smooth driving has been performed" with sound, and feeds back the evaluation of the traveling aspect for the caution-required location CP1. The electronic device 2 notifies the driver of the vehicle 4 of the caution-required location traveling notification and an evaluation result obtained by performing evaluation in accordance with the traveling aspects in the caution-required locations, similarly, even in the caution-required locations CP2 and CP3.

Figure 3:
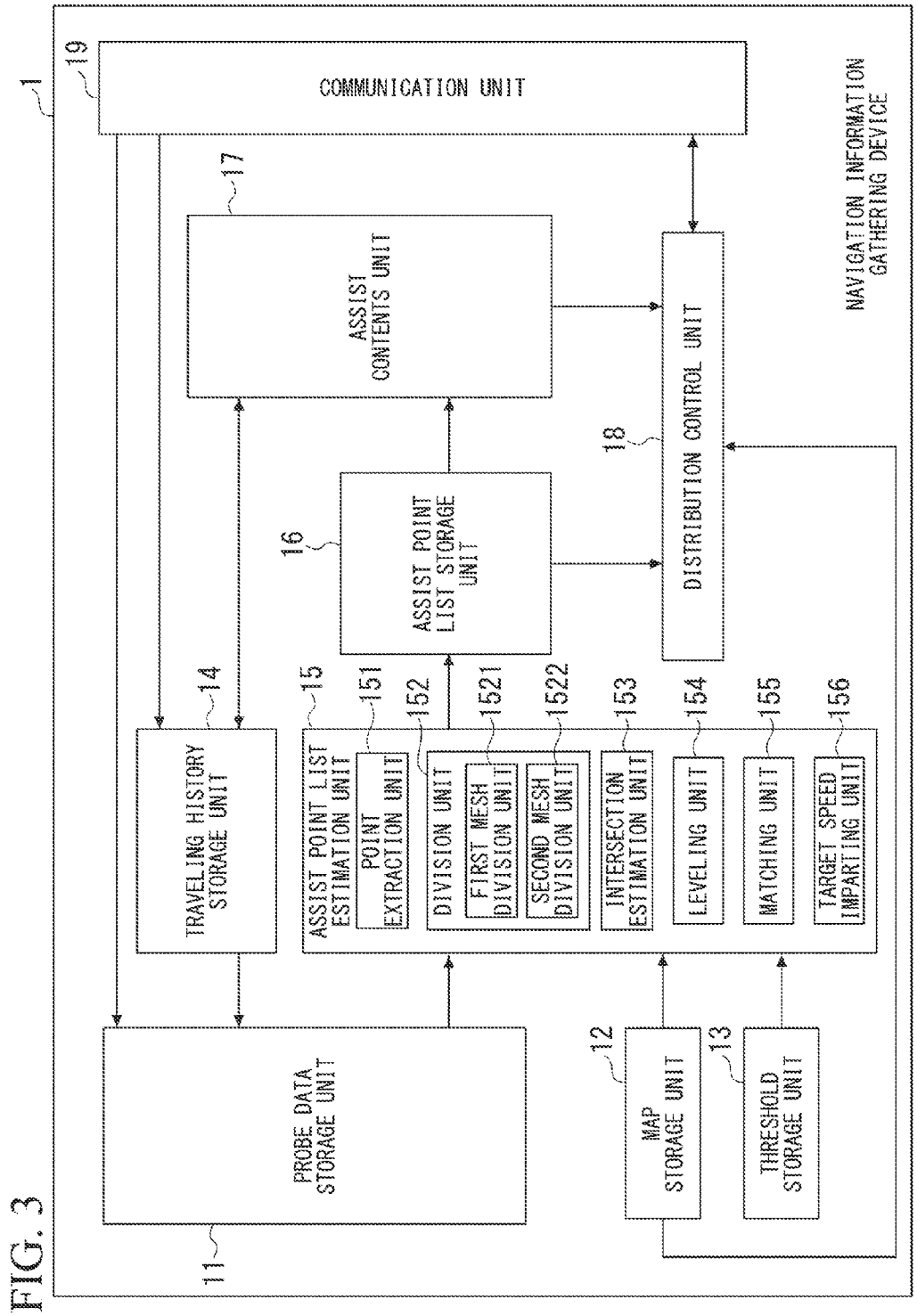
FIG. 3 is a schematic block diagram illustrating an example of the configuration of a navigation information gathering device related to the present embodiment.

FIG. 3 is a schematic block diagram illustrating an example of the configuration of the navigation information gathering device 1 related to the present embodiment.

The navigation information gathering device 1 includes a probe data storage unit 11, a map storage unit 12, a threshold storage unit 13, a traveling history storage unit (individual history storage unit) 14, an assist point list estimation unit 15, an assist point list storage unit 16, an assist contents unit 17, a distribution control unit 18, and a communication unit 19.

The assist point list estimation unit 15 includes a point extraction unit 151 (extraction unit), a division unit 152, an intersection estimation unit 153 (estimation unit), a leveling unit 154, a matching unit 155, and a target speed imparting unit 156. The division unit 152 includes a first mesh division unit 1521 and a second mesh division unit 1522.

The probe data storage unit 11 stores probe data including positional information uploaded by a plurality of vehicles, time information when a vehicle is present in the positional information, vehicle speed information when a vehicle travels through a point represented by the positional information, traveling route information from a starting point to a goal point, or the like.

This probe data is accumulated for a predetermined period of time. Acceleration information when a vehicle accelerates for each vehicle, deceleration information when a vehicle decelerates, stop time information, such as the stop time of a vehicle, or the like is included in the speed information.

The map storage unit 12 stores map data. For example, road coordinate data showing position coordinates on a road required for the processing of map matching based on a current position of the electronic device 2, and road map data (for example, a plurality of links in which nodes, positions, and orientations are matched, link costs, road shapes, and road types, traffic light information representing the presence/absence of traffic lights at each intersection, or the like) required for calculation of a guidance route are included in the map data. The node is a coordinate point consisting of the latitude and longitude of a predetermined point on a road, such as an intersection or a branch point. The link is a line that connects the nodes together and is a road section that connects the nodes together. The link cost is information showing a distance of the road section corresponding to the link or a time required for movement of the road section.

The threshold storage unit 13 stores thresholds regarding the extraction precision of caution-required locations to be reported when the intersection estimation unit 153 (to be described below) notifies a driver of the caution-required locations.

The traveling history storage unit 14 stores, for example, the traveling history of each vehicle including the vehicle 4. The traveling route information, the positional information, the time information, the vehicle speed information, or the like is included in the traveling history. The traveling history storage unit 14 stores a traveling history equivalent to each trip with the trip from one starting point to a goal point as one trip. The traveling history storage unit 14 uploads the traveling history to the probe data storage unit 11.

The point extraction unit 151 reads the probe data from the probe data storage unit 11 and extracts, from the probe data, sudden deceleration information including a position where a sudden deceleration phenomenon corresponding to a predetermined condition (for example, the vehicle speed information is deceleration equal to or higher than a threshold) has occurred and the traveling direction of the vehicle when the sudden deceleration phenomenon has occurred. The point extraction unit 151 outputs the extracted sudden deceleration information to the intersection estimation unit 153.

The division unit 152 reads map data from the map storage unit 12, divides the map data into a plurality of block-shaped meshes with a predetermined size and a predetermined number of divisions, and generates mesh map data.

Specifically, the first mesh division unit 1521 equally divides a predetermined range of the map data into block-shaped meshes, for example, eight in the latitudinal direction and eight in the longitudinal direction, and generates first mesh map data. The first mesh division unit 1521 outputs the generated first mesh map data to the second mesh division unit 1522 and the intersection estimation unit 153.

The second mesh division unit 1522 divides one mesh in the first mesh map data into, for example, nine meshes, and generates second mesh map data. The second mesh division unit 1522 outputs the generated second mesh map data to the intersection estimation unit 153.

The intersection estimation unit 153 applies the number of vehicles, that have generated the sudden deceleration phenomenon included in the sudden deceleration information input from the point extraction unit 151, to the first mesh map data input from the first mesh division unit 1521 and counts the number of vehicles that have passed within each mesh of the first mesh map data. The intersection estimation unit 153 counts the number of sudden deceleration occurrence points (occurrence point of a sudden deceleration) included in the sudden deceleration information as the number of sudden deceleration cases for each mesh in the first mesh map data.

The intersection estimation unit 153 calculates sudden deceleration probability from the number of vehicles that have passed and the number of sudden deceleration cases for each mesh in the first mesh map data and estimates a mesh, in which the sudden deceleration probability is, for example, equal to or higher than 50%, as a sudden deceleration frequent occurrence mesh (a mesh in which the sudden deceleration occurs frequently).

The intersection estimation unit 153 applies the number of sudden deceleration occurrence points, which are included in the sudden deceleration information input from the point extraction unit 151, to the second mesh map data input from the second mesh division unit 1522 and counts the number of sudden deceleration occurrence points as the number of sudden deceleration cases for each mesh of the second mesh map data. The intersection estimation unit 153 estimates, as candidate meshes, the second mesh map data including certain meshes of the second mesh map data in which the number of sudden deceleration cases counted in the meshes in the second mesh map data is, for example, equal to or higher than 80% of the total of the number of sudden deceleration cases counted in the relevant first mesh map data.

The intersection estimation unit 153 estimates, as a sudden deceleration orientation, an orientation having the most sudden deceleration phenomena among, for example, eight orientations of north, northeast, east, southeast, south, southwest, west, and northwest, in the estimated candidate meshes. With respect to the estimated candidate meshes, the intersection estimation unit 153 extracts, for example, intersections on the basis of the sudden deceleration orientations of the candidate meshes, refers to traffic light information on the extracted intersections, and when the traffic light information is traffic light information showing that there are traffic lights, excludes the candidate meshes from driving assist location targets.

Figure 5:
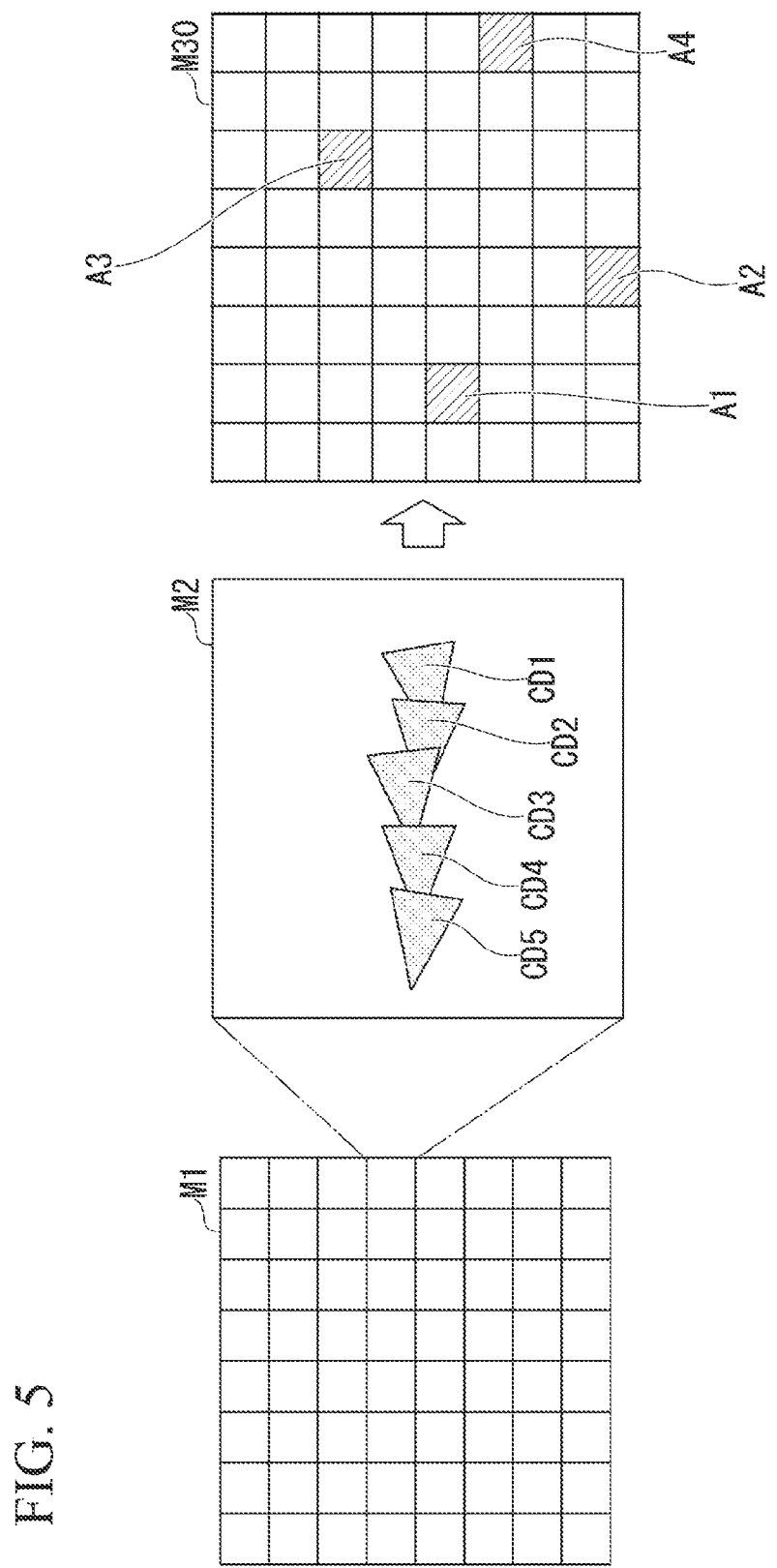
FIG. 5 is a schematic view illustrating an example of the processing of a first mesh division unit and an intersection estimation unit related to the present embodiment.
Figure 6:
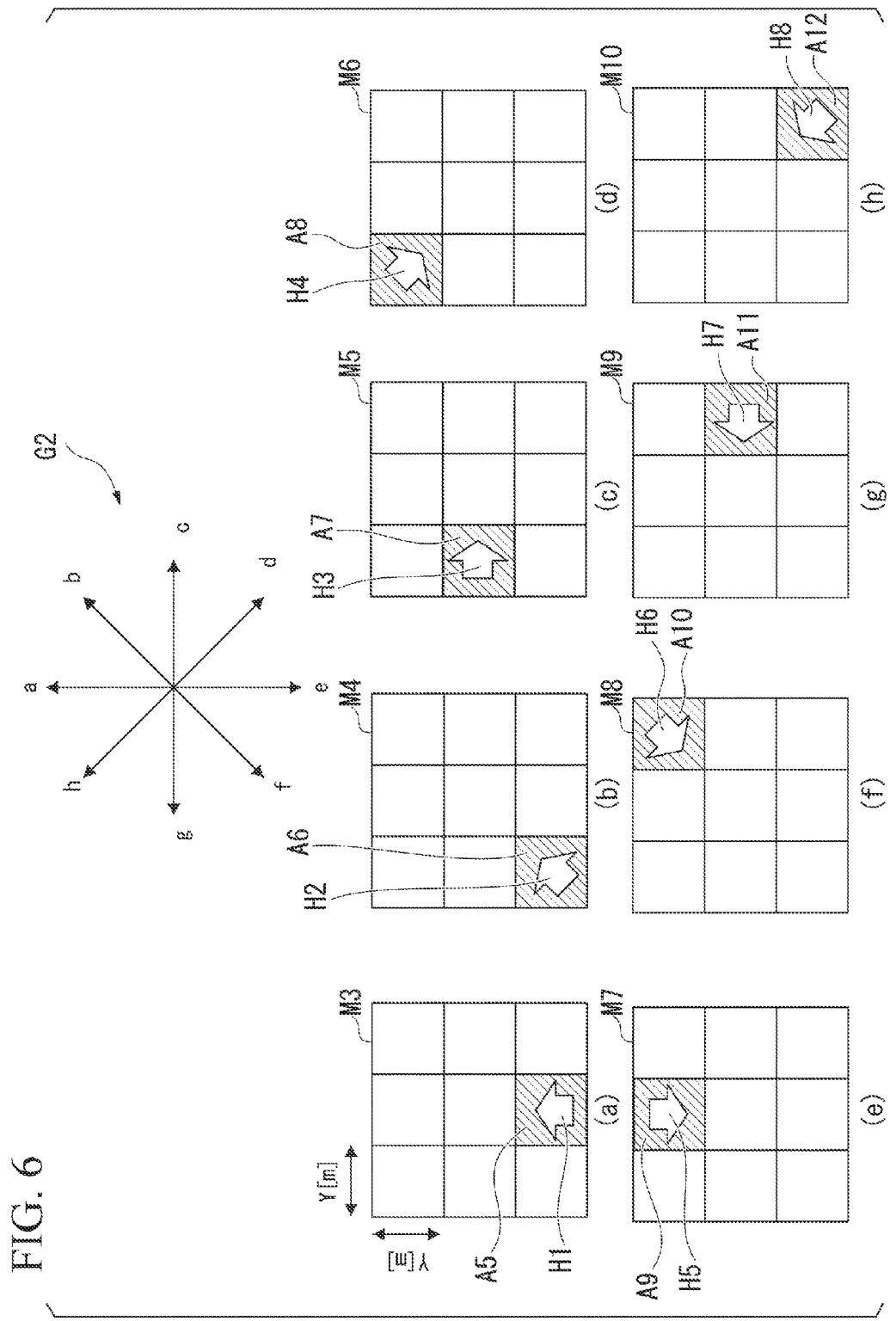
FIG. 6 is a schematic view illustrating an example of the processing of a second mesh division unit and the intersection estimation unit related to the present embodiment.
Figure 7:
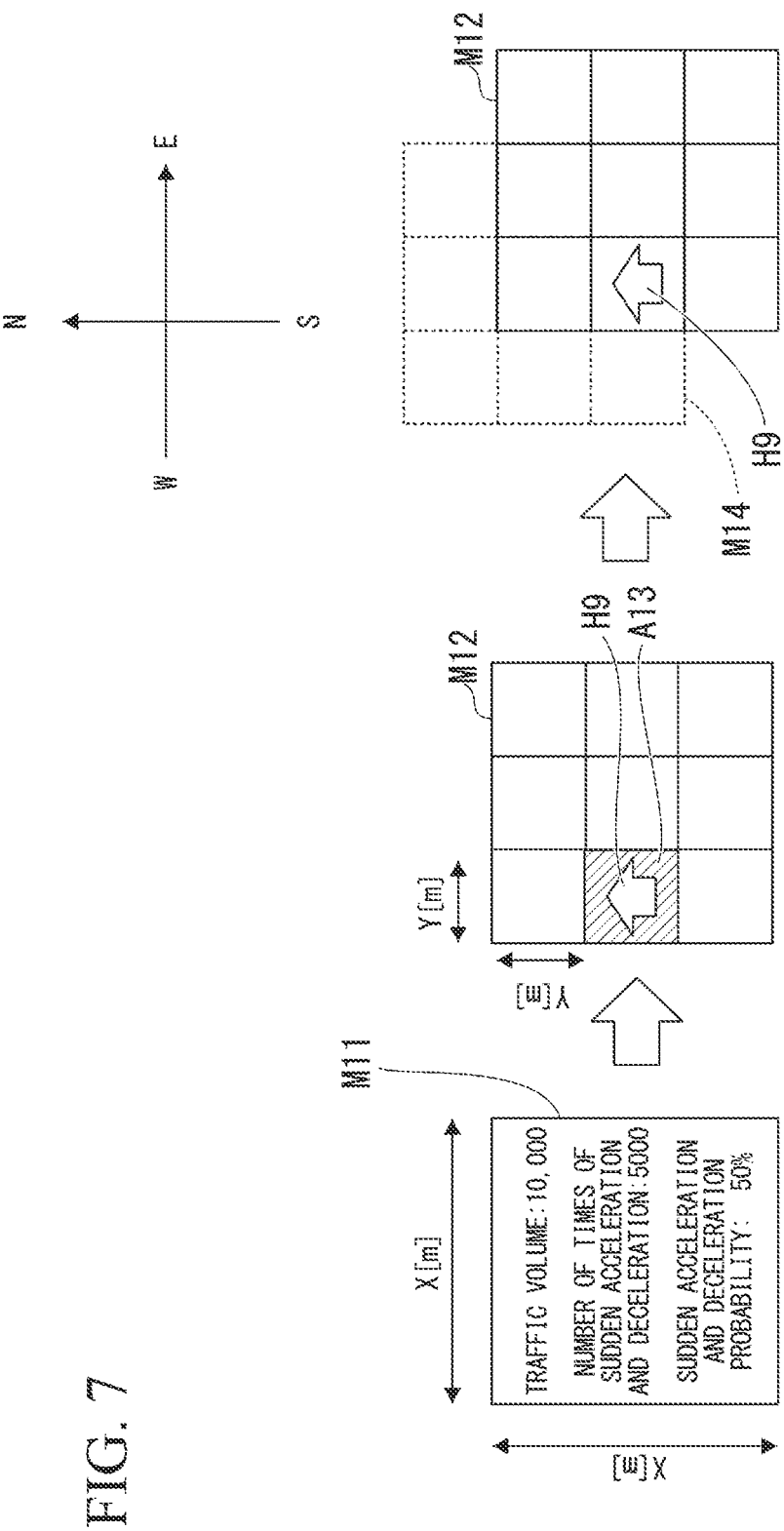
FIG. 7 is an explanatory view explaining estimation processing of a sudden braking frequent occurrence intersection of the intersection estimation unit related to the present embodiment.

The intersection estimation unit 153 estimates, as sudden braking frequent occurrence intersections, intersections that are the shortest from central points of meshes in which the candidate meshes are present, among a plurality of front meshes (for example, nine meshes) in the direction of a sudden deceleration orientation, with respect to the candidate meshes that are not excluded from the targets, and extracts the position coordinates of the intersections (refer to FIGS. 5, 6, and 7 to be described below). In addition, when intersections of traffic light information showing that there is no traffic light are not present within the plurality of front meshes, the intersection estimation unit 153 does not estimate the candidate meshes as sudden braking frequent occurrence intersections. The intersection estimation unit 153 outputs the estimated sudden braking frequent occurrence intersections to the leveling unit 154, the matching unit 155, and the target speed imparting unit 156.

The leveling unit 154 refers to the probe data stored in the probe data storage unit 11 and levels one or both of the probe data and the sudden braking frequent occurrence intersections estimated by the intersection estimation unit 153 in a predetermined period of any of, for example, time, a day, a month, a season, a year, and the like.

The matching unit 155 refers to the map data read from the map storage unit 12, matches the sudden braking frequent occurrence intersections estimated by the intersection estimation unit 153 with the map data, as the numbers of links and the orientations of each of the links as coordinates, and stores the matched results in the assist point list storage unit 16. The matching unit 155 calculates average actual vehicle speeds in the sudden braking frequent occurrence intersections on the basis of the probe data read from the probe data storage unit 11, and matches the average actual vehicle speeds with the sudden braking frequent occurrence intersections. In addition, the matching unit 155 may match the calculated average actual vehicle speeds with the sudden braking frequent occurrence intersections as target speeds. Here, the average actual vehicle speed is an average traveling speed in a certain point (for example, the sudden braking frequent occurrence intersection) based on the probe data stored in the probe data storage unit 11.

The average actual vehicle speeds are used for the operation thresholds of the caution-required location traveling notification (to be described below) in the electronic device 2 that actually performs driving assist, or the thresholds of determining the extraction precision in the extraction of the caution-required location. Accordingly, a case where the vehicle 4 is appropriately traveling along a flow peculiar to a road, for example, a vehicle speed can be excluded from caution-required location traveling notification targets. Additionally, a point in a case where the vehicle 4 is appropriately traveling along a flow peculiar to a road, for example, a vehicle speed, can be excluded from caution-required location extraction targets.

The target speed imparting unit 156 imparts target speeds, which are calculated for each of links in the sudden braking frequent occurrence intersections and become targets for safely passing through the sudden braking frequent occurrence intersections, to the sudden braking frequent occurrence intersections estimated by the intersection estimation unit 153, on the basis of the probe data and the map data read from the probe data storage unit 11 and the map storage unit 12. The target speed imparting unit 156 stores information, showing the sudden braking frequent occurrence intersections to which target speeds are imparted, as sudden braking frequent occurrence intersection information in the assist point list storage unit 16.

The assist point list storage unit 16 stores some of map data including the caution-required location information and the target speeds of the caution-required locations, as an assist point list. Specifically, the assist point list storage unit 16 stores the assist point list in which the numbers of links and the orientations of the links as coordinates in the sudden braking frequent occurrence intersections (caution-required locations) estimated by the intersection estimation unit 153 are matched with the map data.

Additionally, the assist point list storage unit 16 stores the sudden braking frequent occurrence intersection information representing the sudden braking frequent occurrence intersections to which the target speed imparting unit 156 imparts the target speeds.

In addition, although it is described that the navigation information gathering device 1 holds the map data, the electronic device 2 may hold the map data.

The assist contents unit 17 manages software for executing applications for assisting in driving in the electronic device 2, data generation for the applications, or the like. Additionally, the assist contents unit 17 reads a traveling history and the assist point list from the traveling history storage unit 14 and the assist point list storage unit 16 in order to perform comprehensive evaluation when the vehicle 4 is made to travel, and totalizes evaluation on the basis of the vehicle speed information, such as acceleration, deceleration, or slow-moving time included in the traveling history. The assist contents unit 17 stores the totalized evaluation result in the traveling history storage unit 14, and outputs the evaluation result to the distribution control unit 18. Additionally, the assist contents unit 17 outputs contents information, such as applications or software for executing the applications, to the distribution control unit 18. In addition, stop time for which the vehicle 4 stops is also included in the slow-moving time.

The distribution control unit 18 controls the distribution of the applications managed by the assist contents unit 17. Additionally, the distribution control unit 18 reads the assist point list from the assist point list storage unit 16 on the basis of an instruction signal from the electronic device 2, and performs the control of distributing the assist point list to the electronic device 2. The distribution control unit 18 performs the control of distributing the assist point list and the contents information to the electronic device 2 via the communication unit 19 and the network N1. Additionally, the distribution control unit 18 reads the map data from the map storage unit 12 on the basis of an instruction signal from the electronic device 2, and performs the control of distributing a predetermined range of the map data including the current position of the vehicle 4 to the electronic device 2 via the communication unit 19 and the network N1.

The communication unit 19 performs communication with the electronic device 2. The communication unit 19 performs communication processing, such as coding/decoding, modulation/demodulation, analog to digital (AD)/digital to analog (DA) conversion, or frequency conversion of data, or transmission/reception of data signals through radio waves. The communication unit 19 is connected to the network N1 in a wired or wireless manner.

Figure 4:
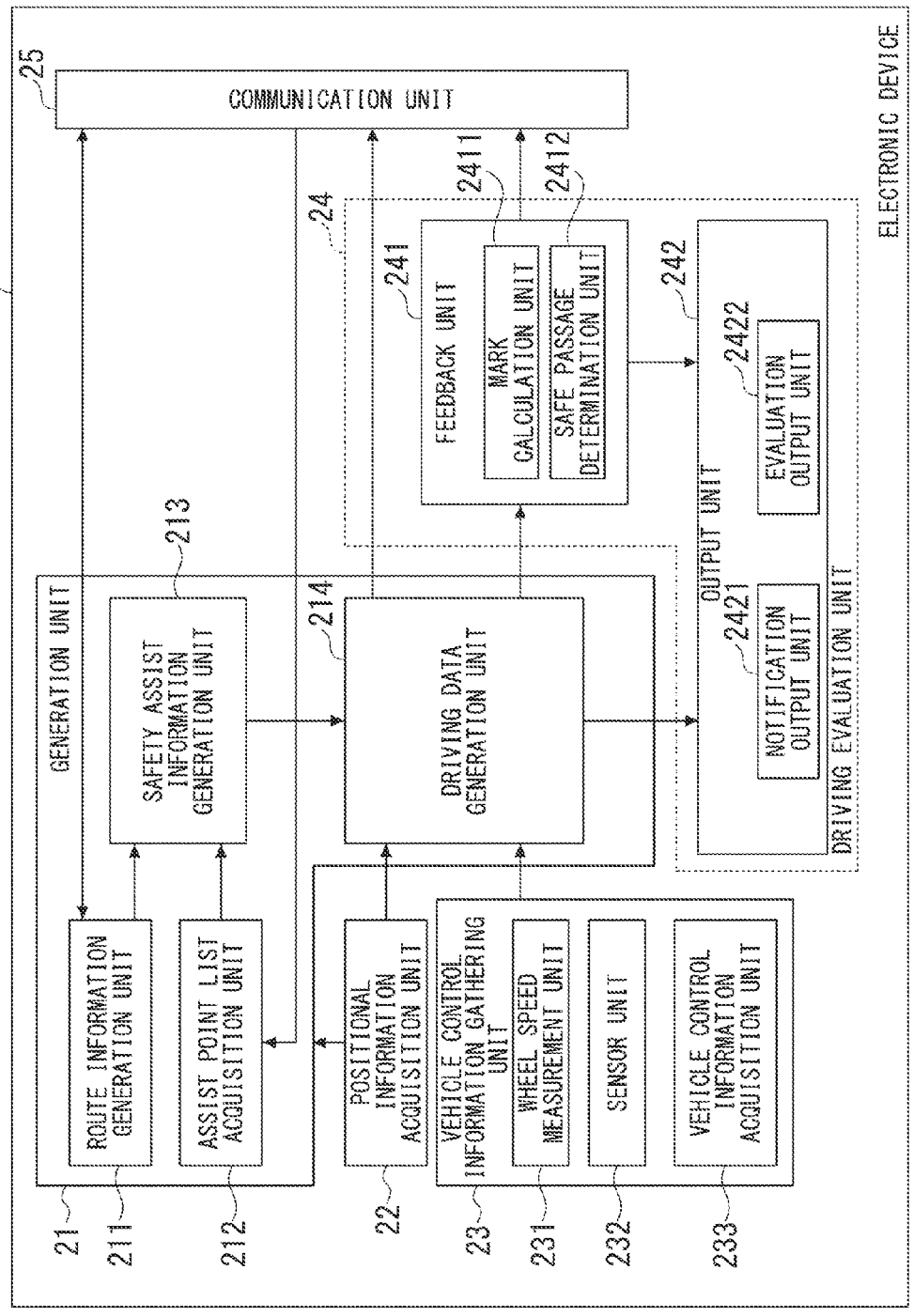
FIG. 4 is a schematic block diagram illustrating an example of the configuration of an electronic device related to the present embodiment.

FIG. 4 is a schematic block diagram illustrating an example of the configuration of the electronic device 2 related to the present embodiment.

The electronic device 2 is a personal computer, a smart phone, a vehicle-mounted terminal device equipped with communication means connectable with the network N1, an electronic device obtained by combining a vehicle-mounted terminal device, which is not equipped with communication means connectable with the network N1, with a personal computer or a smart phone, or the like. The electronic device 2 is an electronic device equipped with a display unit.

In the following description, the electronic device 2 will be described taking as an example a combination of a smart phone temporarily mounted on the vehicle 4 and a vehicle-mounted terminal device that is not equipped with communication means connectable with the network N1.

The electronic device 2 includes a generation unit 21, a positional information acquisition unit 22, a vehicle control information gathering unit 23, a driving evaluation unit 24, and a communication unit 25. The generation unit 21 includes a route information generation unit 211, an assist point list acquisition unit 212, a safety assist information generation unit 213, and a driving data generation unit 214. The vehicle control information gathering unit 23 includes a wheel speed measurement unit 231, a sensor unit 232, and a vehicle control information acquisition unit 233. The driving evaluation unit 24 includes a feedback unit 241 and an output unit 242. The feedback unit 241 includes a mark calculation unit 2411 and a safe passage determination unit 2412. The output unit 242 includes a notification output unit 2421 and an evaluation output unit 2422.

The route information generation unit 211 receives input of a starting point and a goal point. The route information generation unit 211 transmits the starting point and the goal point to the navigation information gathering device 1 via the communication unit 25 and the network N1 as point information. Additionally, the route information generation unit 211 transmits an instruction signal, which gives an instruction regarding acquisition of map data including the point information, to the navigation information gathering device 1 via the communication unit 25 and the network N1. The route information generation unit 211 acquires a predetermined range of the map data including the point information from the navigation information gathering device 1 via the communication unit 25 and the network N1. The route information generation unit 211 searches for a route on the basis of the starting point and the goal point, which are included in the point information, from the acquired map data, and generates navigation information. The route information generation unit 211 outputs the generated navigation information to the safety assist information generation unit 213.

In addition, when the starting point is the current position of the vehicle 4, the route information generation unit 211 may acquire positional information from the positional information acquisition unit 22, and transmit the information including the current position and the goal point to the navigation information gathering device 1 via the communication unit 25 and the network N1 as the point information.

The assist point list acquisition unit 212 acquires a predetermined range of the assist point list including the point information that the route information generation unit 211 has transmitted to the navigation information gathering device 1 via the communication unit 25, and outputs the acquired assist point list to the safety assist information generation unit 213.

The safety assist information generation unit 213 matches the sudden braking frequent occurrence intersection information (hereafter also referred to as the driving assist location information or the caution-required location information) included in the assist point list with the map data included in the navigation information, on the basis of the navigation information input from the route information generation unit 211 and the assist point list input from the assist point list acquisition unit 212, and generates the driving assist location information. The safety assist information generation unit 213 outputs the generated driving assist location information to the driving data generation unit 214.

The driving data generation unit 214 executes driving assist in the traveling of the vehicle 4, on the basis of the current position of the vehicle 4 input from the positional information acquisition unit 22, the vehicle control information input from the vehicle control information gathering unit 23, and the driving assist location information input from the safety assist information generation unit 213. Specifically, except for the sudden braking frequent occurrence intersection information, navigation of the traveling route included in the driving assist location information is performed. Also, the driving data generation unit 214 sets a sudden braking frequent occurrence intersection that satisfies predetermined conditions to a point for notification target (hereinafter referred to as a notification target point) where the driver of the vehicle 4 is urged to exercise caution. If the vehicle 4 approaches the notification target point, an instruction signal, which gives an instruction regarding a caution-required location traveling notification showing that the notification target point approaches, is output to the notification output unit 2421, and the notification output unit 2421 is made to execute the caution-required location traveling notification.

Also, when the vehicle 4 passes through the notification target point included in the driving assist location information, the driving data generation unit 214 outputs the vehicle control information in a measurement section from a predetermined distance of the notification target point to a predetermined distance ahead of the notification target point, the positional information, and notification target point information, such as the positional information and the target speed of the notification target point, to the feedback unit 241.

Additionally, when a sudden deceleration phenomenon occurs while the vehicle 4 travels, the driving data generation unit 214 transmits the position where the sudden deceleration phenomenon occurs and the vehicle control information including the vehicle speed information to the navigation information gathering device 1 via the communication unit 25.

The positional information acquisition unit 22 acquires the positional information (current position) of the vehicle 4 using, for example, a global positioning system (GPS).

The vehicle control information gathering unit 23 gathers the vehicle control information. The vehicle control information gathering unit 23 acquires vehicle control information, such as a traveling speed, an engine speed, a brake state, inter-vehicular distance information, or failure diagnosis information, using a controller area network (CAN) used for the data transfer between control instruments of a vehicle that are interconnected.

The wheel speed measurement unit 231 measures the rotating speed of the wheels of the vehicle 4. The wheel speed measurement unit 231 calculates the travel distance of the vehicle 4 from the measured rotating speed of the wheels of the vehicle 4.

The sensor unit 232 is equipped with various sensors for acquiring the vehicle control information of the vehicle 4, and measures, for example, the inter-vehicular distance between the vehicle 4 and another vehicle.

The vehicle control information acquisition unit 233 acquires operating information of an accelerator pedal and a brake pedal (neither is illustrated), a brake state, an engine speed, and failure diagnosis information through well-known techniques.

The mark calculation unit 2411 evaluates the traveling aspect of the vehicle 4 in the notification target point, on the basis of the vehicle control information input from the driving data generation unit 214.

The mark calculation unit 2411 calculates a performance index (for example, mark) when the vehicle 4 travels through a traveling speed of z [km/h] or higher in a measurement section from a predetermined distance x [m] short of the notification target point to a point having a distance y [m] in front of the notification target point, and approaches a portion within the radius r [m] of the notification target point within the measurement section, and the traveling time in the measurement section is within t [seconds].

First, the mark calculation unit 2411 acquires the traveling speed [km/h] of the vehicle 4 through predetermined sampling in the measurement section. Then, the mark calculation unit 2411 differentiates the acquired traveling speed [km/h], and calculates acceleration [G] and deceleration [G] from the obtained differential value. Additionally, the mark calculation unit 2411 calculates a total time for which the acquired traveling speed [km/h] of the vehicle 4 is a traveling speed equal to or lower than n [km/h] in the measurement section.

Specifically, the mark calculation unit 2411 calculates the performance index on the basis of, for example, the acceleration [G], the deceleration [G], and the stop or slow-moving time [second]. The mark calculation unit 2411 in this case performs calculation such that a mark-subtracting proportion to the acceleration is greater than a mark-subtracting proportion to the deceleration when the vehicle 4 passes through a caution-required location. The mark calculation unit 2411 outputs information showing the calculated performance index to the safe passage determination unit 2412.

The safe passage determination unit 2412 determines whether or not the vehicle 4 has passed through the notification target point in a safe traveling manner, based on the traveling aspect of the vehicle 4 in the measurement section including the notification target point when the vehicle travels through the notification target point. Specifically, the safe passage determination unit 2412 determines whether or not the performance index included in the information showing the performance index is equal to or more than a predetermined mark, on the basis of the information showing the performance index input from the mark calculation unit 2411. When the performance index is equal to or more than the predetermined mark, the safe passage determination unit 2412 outputs an instruction signal, which gives an instruction to notify the driver of the vehicle 4 of an evaluation result, to the evaluation output unit 2422, and causes the evaluation output unit 2422 to report the evaluation result. Meanwhile, when the performance index is less than the predetermined mark, the safe passage determination unit 2412 outputs an instruction signal, which gives an instruction to notify the driver of the vehicle 4 of an evaluation result of urging the driver to improve the traveling aspect, to the evaluation output unit 2422, and causes the evaluation output unit 2422 to report the evaluation result.

Additionally, the safe passage determination unit 2412 transmits the evaluation result to the navigation information gathering device 1 via the communication unit 25.

In addition, when the driver of the vehicle 4 is notified of the evaluation result, the driving evaluation unit 24 may notify the driver of the evaluation result with any of a plurality of types of voice, or may notify the driver of the evaluation result, using the voice that the driver or the like recorded in advance. Additionally, the driving evaluation unit 24 may not evaluate the traveling aspect for a predetermined period of time when the vehicle 4 has passed through a caution-required location multiple times in a predetermined period of time. Additionally, the driving evaluation unit 24 may be adapted to be able to change the notice aspect with which the driver of the vehicle 4 is notified when the vehicle 4 has passed through a caution-required location in a predetermined period of time equal to or more than a predetermined number of times.

The notification output unit 2421 is, for example, a display device, such as a liquid crystal display, a plasma display, or an organic electroluminescent display, and performs display on the display device, thereby executing the caution-required location traveling notification.

The evaluation output unit 2422 is, for example, a voice output device, such as a loudspeaker, and outputs a voice from the voice output device, thereby notifying the driver of the vehicle 4 of the evaluation result.

In addition, the notification output unit 2421 and the evaluation output unit 2422 may be equipped with one or both of the display device and the voice output device as the output unit 242 and may perform notification of an evaluation result according to the caution-required location traveling notification and the traveling aspect when the vehicle travels in a caution-required location with one or both of display and voice.

The communication unit 25 performs communication with the navigation information gathering device 1. The communication unit 25 performs communication processing, such as coding/decoding, modulation/demodulation, AD/DA conversion, or frequency conversion of data, or transmission/reception of data signals through radio waves. The communication unit 25 is connected to the network N1 in a wired or wireless manner.

FIG. 5 is a schematic view illustrating an example of the processing of the first mesh division unit 1521 and the intersection estimation unit 153 related to the present embodiment.

First, the first mesh division unit 1521 divides a predetermined range of the map data including a position where the vehicle 4 is present into block-shaped meshes with a predetermined size and a predetermined number of divisions (for example, eight divisions in horizontal and vertical directions) in the latitudinal direction and the longitudinal direction, and generates first mesh map data M1.

As mentioned above, the intersection estimation unit 153 counts the number CD1, CD2, CD3, CD4, and CD5 of vehicles that have passed through a mesh M2 for each of the eight-divided meshes M2 in the first mesh map data M1, and counts the number of sudden deceleration occurrence points as the number of sudden deceleration cases for each mesh M2 in the first mesh map data M1.

Also, the intersection estimation unit 153 calculates sudden deceleration probability, based on the number of vehicles that have passed and the number of sudden deceleration cases, for each mesh M2 in the first mesh map data M1, and estimates meshes A1, A2, A3, and A4 of the first mesh map data M30 in which the sudden deceleration probability is, for example, equal to or more than 50% as sudden deceleration frequent occurrence meshes.

FIG. 6 is a schematic view illustrating an example of the processing of the second mesh division unit 1522 and the intersection estimation unit 153 related to the present embodiment.

The second mesh division unit 1522 divides one mesh in the first mesh map data into a plurality of (for example, nine) meshes, and generates second mesh map data. The second mesh division unit 1522 outputs the generated second mesh map data to the intersection estimation unit 153.

The intersection estimation unit 153 applies the number of sudden deceleration occurrence points to the second mesh map data, and counts this number as the number of sudden deceleration cases for each mesh of the second mesh map data. The intersection estimation unit 153 estimates, as candidate meshes, certain meshes of the second mesh map data in which the number of sudden deceleration cases counted in the meshes in the second mesh map data is, for example, equal to or higher than 80% of the total of the number of sudden deceleration cases counted in the relevant first mesh map data.

The intersection estimation unit 153 estimates, as a sudden deceleration orientation, an orientation having the most sudden deceleration phenomena among eight orientations (the north a, the northeast b, the east c, the southeast d, the south e, the southwest f, the west g, and the northwest h) illustrated in G2 of FIG. 6, in an estimated candidate mesh. Here, the orientations (the north a, the northeast b, the east c, the southeast d, the south e, the southwest f, the west g, and the northwest h) illustrated in G2 of FIG. 6 and sudden deceleration orientations H1, H2, H3, H4, H5, H6, H7, and H8 in a plurality of front meshes (for example, nine meshes) M3, M4, M5, M6, M7, M8, M9, and M10 of (a), (b), (c), (d), (e), (f), (g), and (h) of FIG. 6 correspond to each other.

The intersection estimation unit 153 estimates, as a sudden braking frequent occurrence intersection, an intersection that is the shortest from a central point of a mesh in which the candidate mesh is present among a plurality of front meshes ((a), (b), (c), (d), (e), (f), (g), and (h) of FIG. 6) in the direction of a sudden deceleration orientation, with respect to the estimated candidate mesh, and extracts the position coordinates of the intersection (refer to FIG. 7 to be described below).

Specifically, in (a) of FIG. 6, the intersection estimation unit 153 estimates, as a sudden braking frequent occurrence intersection, an intersection that is the shortest from a central point of a mesh where a candidate mesh AS is present among a plurality of front meshes M3 in the direction of the sudden deceleration orientation H1, with respect to the candidate mesh A5. Here, one mesh in the plurality of front meshes M3 is Y [m] square.

In addition, although (b), (c), (d), (e), (f), (g), and (h) of FIG. 6 are different from front (a) of FIG. 6 in terms of the positions of the sudden deceleration orientations H2, H3, H4, H5, H6, H7, and H8 and the positions of a plurality of front meshes M4, M5, M6, M7, M8, M9, and M10 where candidate meshes A6, A7, A8, A9, A10, A11, and A12 are present, the description thereof will be omitted because the other configurations are the same.

FIG. 7 is an explanatory view explaining estimation processing of a sudden braking frequent occurrence intersection of the intersection estimation unit 153 related to the present embodiment.

The intersection estimation unit 153 estimates a sudden deceleration frequent occurrence mesh, on the basis of the threshold of the deceleration (sudden deceleration) and the threshold of the sudden deceleration probability in the first mesh map data. Specifically, in the first mesh map data that is divided into a plurality of meshes M11 with a size of X [m] square, the intersection estimation unit 153 estimates the meshes M11 in the first mesh map data as sudden deceleration frequent occurrence meshes, for example, if traffic volume (the number of vehicles that have passed) is 10000, the number of times of sudden deceleration (the number of sudden deceleration cases) is 5000 (cases), and the threshold of the sudden deceleration probability is 50 [%].

Next, when the number of sudden deceleration cases counted in a certain mesh A13 of second mesh map data M12 divided into a plurality of meshes with a size of Y [m] square and included in the first mesh map data is, for example, five, and a sudden deceleration orientation H9 is the north, the intersection estimation unit 153 estimates the second mesh map data M12 including the mesh A13, which accounts for a proportion of, for example, 80% or more among the total number of sudden deceleration cases counted in the sudden deceleration frequent occurrence meshes M11 in the first mesh map data, as candidate meshes.

Then, the intersection estimation unit 153 refers to and searches for the map data stored in the map storage unit 12, using front meshes M14 as an intersection search range, on the basis of the position of the mesh A13 and the sudden deceleration orientation H9 in the second mesh map data (candidate meshes) M12. In this case, the intersection estimation unit 153 sets the front meshes M14 so that a central portion of a lower end of the front meshes M14 that are a plurality of meshes configured similar to the second mesh map data (candidate meshes) M12 are provided at the position of the mesh A13 where a sudden deceleration phenomenon has occurred in the second mesh map data (candidate meshes) M12, estimates an intersection, which is the shortest from a central point of the front meshes M14, as a sudden braking frequent occurrence intersection, and extracts the position coordinates of the intersection. In this case, when the traffic light information in the intersection estimated as the sudden braking frequent occurrence intersection is information showing that a traffic light is installed, this intersection is excluded from the sudden braking frequent occurrence intersections. Additionally, when the traffic light information in the intersection estimated as the sudden braking frequent occurrence intersection is information showing that no traffic light is installed, the positional information (position coordinates) of this intersection is stored in the assist point list storage unit 16.

Figure 8:
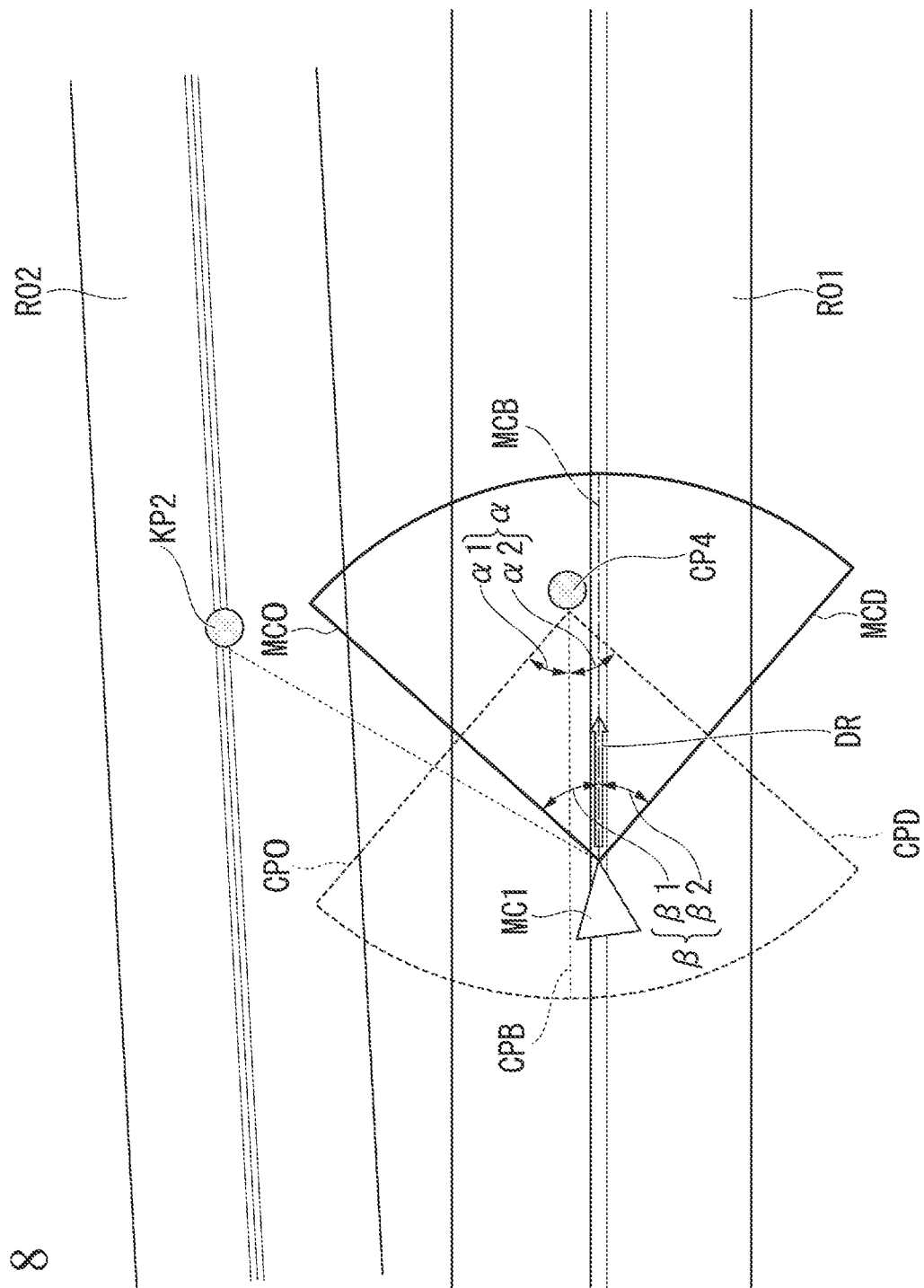
FIG. 8 is an explanatory view illustrating an example when a driving data generation unit related to the present embodiment extracts a notification target point from sudden braking frequent occurrence intersections (driving assist locations, caution-required locations).

FIG. 8 is an explanatory view illustrating an example when the driving data generation unit 214 related to the present embodiment extracts a notification target point from sudden braking frequent occurrence intersections.

The driving data generation unit 214 executes driving assist in the traveling of the vehicle 4, on the basis of a current position MC1 of the vehicle 4 in a road R01, the vehicle control information including vehicle speed information or the like, and the driving assist location information.

First, first candidate sudden braking frequent occurrence intersection extracting means of the driving data generation unit 214 extracts, as first candidate sudden braking frequent occurrence intersections, sudden braking frequent occurrence intersections KP2 and CP4, which are present within a predetermined distance range (for example, radius r [m]) centered on the current position MCI of the vehicle 4 from the plurality of sudden braking frequent occurrence intersections KP2 and CP4.

Next, second candidate sudden braking frequent occurrence intersection extracting means of the driving data generation unit 214 extracts, as a second candidate sudden braking frequent occurrence intersection, the sudden braking frequent occurrence intersection CP4, which is present within a predetermined angle (for example, within an angle β between an imaginary line MCO having an angle β1 from a center MCB and an imaginary line MCD having an angle β2 from the center MCB) having a current traveling direction DR of the vehicle 4 passing through the current position MC1 of the vehicle 4 as the center MCB from the plurality of sudden braking frequent occurrence intersections KP2 and CP4.

Then, notification target point extracting means of the driving data generation unit 214 extracts, as a notification target point, the sudden braking frequent occurrence intersection CP4 where the current position MC1 of the vehicle 4 is present within a predetermined angle range (for example, within a predetermined angle range α between an imaginary line CPO having an angle α1 from a center CPB and an imaginary line CPD having an angle α2 from the center CPB) having the orientation of a link through which the vehicle 4 is determined to pass, as the center CPB, by referring to the map data, from the sudden braking frequent occurrence intersections CP4 extracted in common by both the first candidate sudden braking frequent occurrence intersection extracting means and the second candidate sudden braking frequent occurrence intersection extracting means.

In addition, the map data may be acquired from the navigation information gathering device 1 as a portion of the assist point list. The electronic device 2 or the vehicle-mounted terminal device may be configured to hold the map data.

Figure 9:
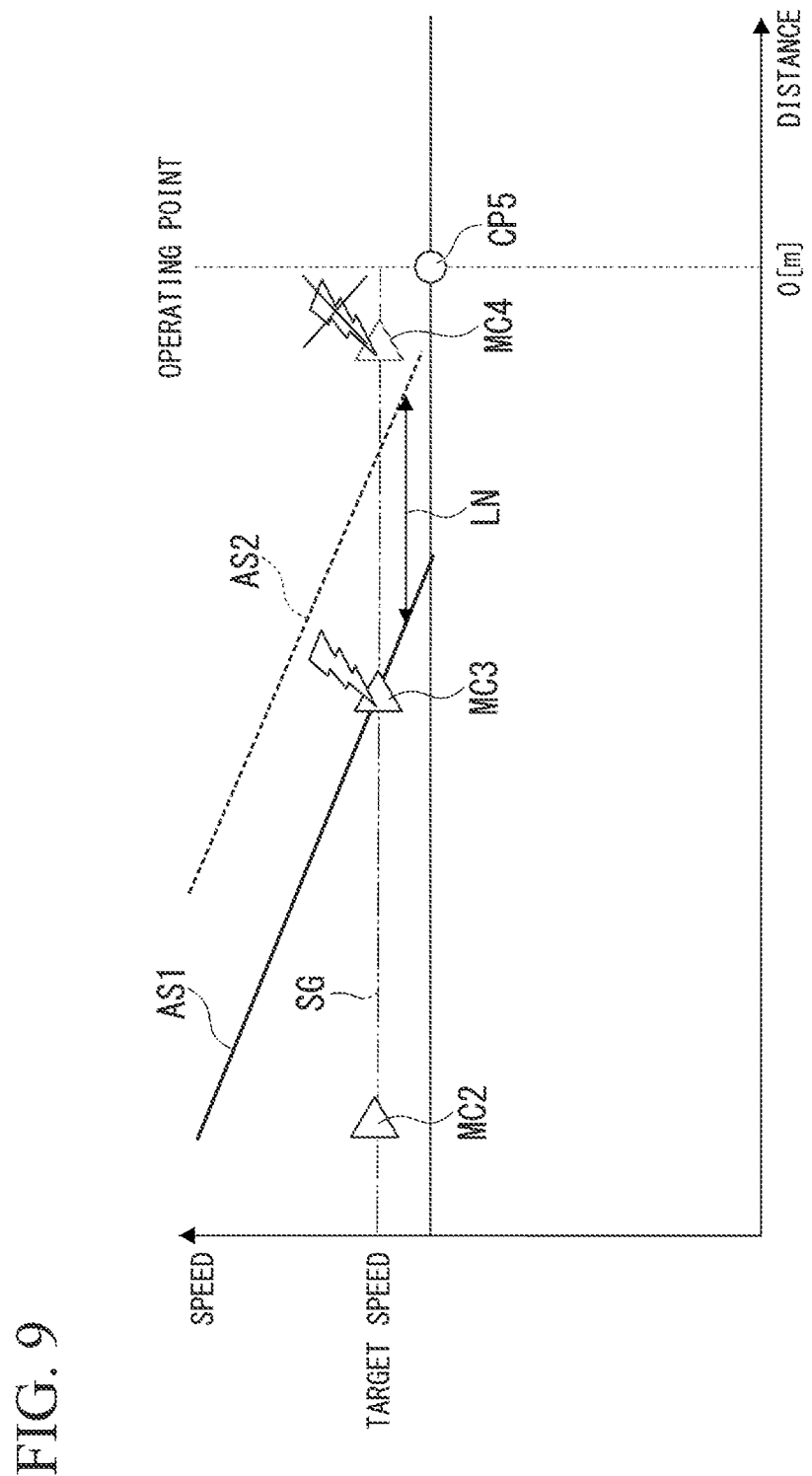
FIG. 9 is an explanatory view illustrating an example of notification determination when the driving data generation unit related to the present embodiment performs notification in the notification target point.

FIG. 9 is an explanatory view illustrating an example of notification determination when the driving data generation unit 214 related to the present embodiment performs notification in the notification target point.

First, target speeds calculated for a notification target point and a link of the notification target point are imparted to the notification target point and the link of the notification target point.

Distance determination means of the driving data generation unit 214 determines whether or not the distance between a current position MC2 of the vehicle 4 and a notification target point CP5 is within a predetermined distance.

Then, speed determining means of the driving data generation unit 214 compares the traveling speed (target speed) of the vehicle 4 with a target speed SG of a link of the notification target point CP5, when the distance between the current position MC2 of the vehicle 4 and the notification target point CP5 is within the predetermined distance. When the traveling speed of the vehicle 4 is equal to or higher than the target speed and when the current traveling speed of the vehicle 4 is a uniform speed, first time determination means of the driving data generation unit 214 determines whether or not the vehicle 4 reaches the notification target point CP5 from the current position MC2 of the vehicle 4 within a first time threshold (until the vehicle 4 reaches a position MC3).

When the vehicle 4 reaches the notification target point CP5 from the current position MC2 of the vehicle 4 within the first time threshold and when the current traveling speed of the vehicle 4 is a uniform speed, second time determination means of the driving data generation unit 214 determines whether or not the vehicle 4 reaches the notification target point CP5 from the current position MC2 of the vehicle 4 within a second time threshold.

When the current traveling speed of the vehicle 4 is a uniform speed and the vehicle 4 reaches the notification target point CP5 from the current position MC2 of the vehicle 4 within the second time threshold, execution means of the driving data generation unit 214 executes the caution-required location traveling notification in the notification target point. In this case, an operation line where the distance and the speed when the vehicle 4 reaches the notification target point CP5 within the first time threshold are matched with each other is AS1, and an operation line where the distance and the speed when the vehicle 4 reaches the notification target point CP5 within the second time threshold are matched with each other is AS2. Additionally, the distance between the operation line AS1 and the operation line AS2 is a notification section LN where the caution-required location traveling notification is executed. In addition, no caution-required location traveling notification is executed with respect to the vehicle 4 that travels through a position MC4 that has passed through operation line AS2.

Figure 10:
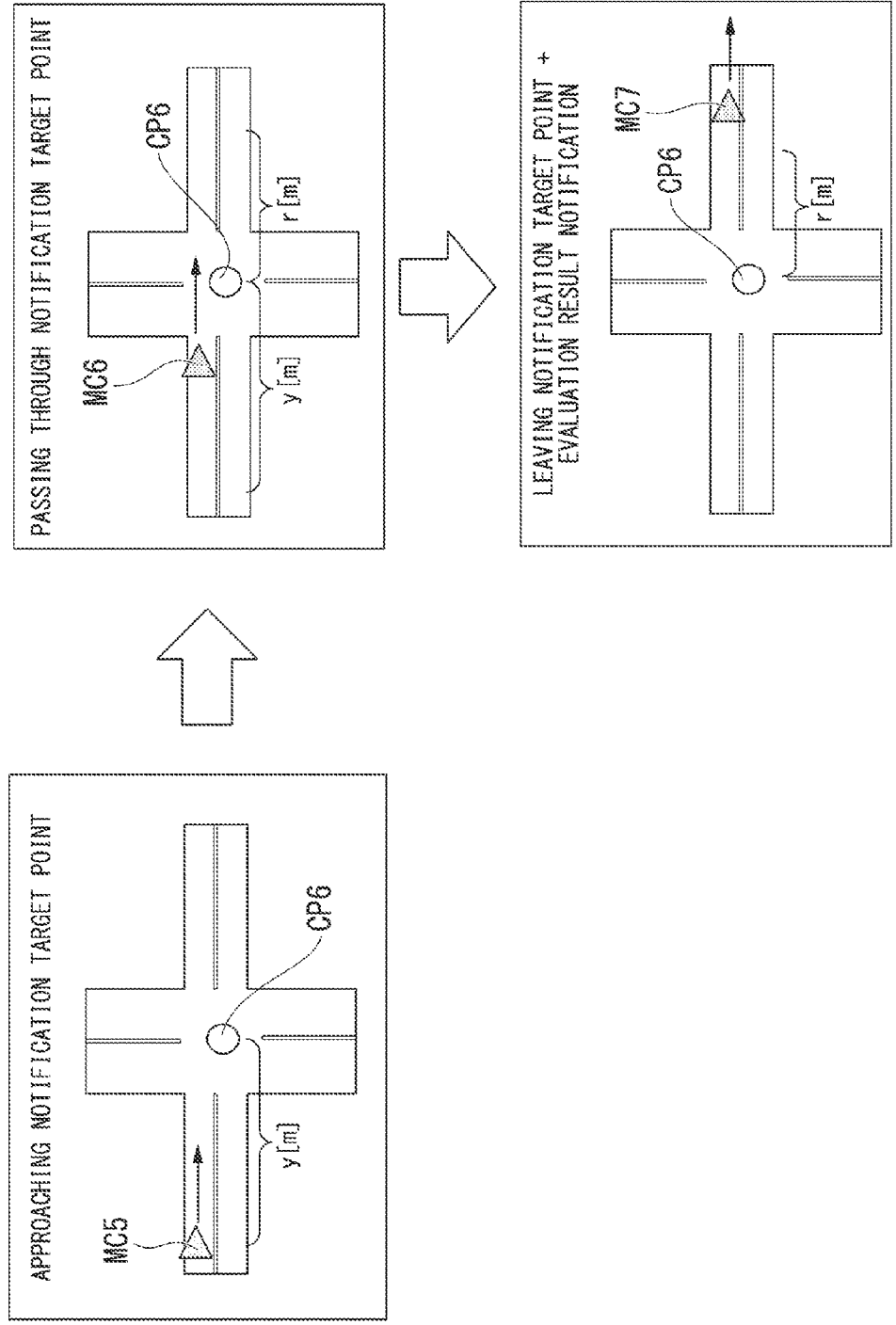
FIG. 10 is an explanatory view explaining an example when a driving evaluation unit related to the present embodiment notifies a vehicle driver of an evaluation result.

FIG. 10 is an explanatory view explaining an example when the driving evaluation unit 24 related to the present embodiment notifies the driver of the vehicle 4 of execution of the caution-required location traveling notification and an evaluation result.

The distance determination means of the driving data generation unit 214 determines whether or not the distance between the current position MC5 (position) of the vehicle 4 and a notification target point CP6 is within a predetermined distance y [m], and compares the traveling speed (target speed) of the vehicle 4 with a target speed in a link of the notification target point CP6 when the distance between the current position MC5 of the vehicle 4 and the notification target point CP6 is within the predetermined distance. When the traveling speed of the vehicle 4 is equal to or higher than the target speed and when the current traveling speed of the vehicle 4 is a uniform speed, the first time determination means of the driving data generation unit 214 determines whether or not the vehicle 4 reaches the notification target point CP6 from the current position MC5 of the vehicle 4 within the first time threshold, and when the vehicle 4 reaches the notification target point CP6 from the current position MC5 of the vehicle 4 within the first time threshold and when the current traveling speed of the vehicle 4 is a uniform speed, second time determination means of the driving data generation unit 214 determines whether or not the vehicle 4 reaches the notification target point CP6 from the current position MC5 of the vehicle 4 within the second time threshold.

When the current traveling speed of the vehicle 4 is a uniform speed and when the vehicle 4 travels in a section having the predetermined distance y [m] from the current position MC5 of the vehicle 4 to the notification target point CP6 within the second time threshold, the execution means of the driving data generation unit 214 executes the caution-required location traveling notification in the section having the predetermined distance y [m] up to the notification target point CP6.

The safe passage determination unit 2412 determines whether or not the vehicle 4 has passed through the notification target point in a safe traveling manner from the traveling aspect of the vehicle 4 in a caution-required location when the vehicle 4 travels through the notification target point. Then, immediately after the vehicle 4 has passed through the notification target point, the driving evaluation unit 24 evaluates the traveling aspect of the vehicle 4 in the notification target point in accordance with the determination result determined by the safe passage determination unit 2412, and notifies the driver of the vehicle 4 of the evaluation result.

Specifically, the vehicle 4 travels through the positions MC5, MC6, and MC7, approaches the notification target point CP6, and passes through the notification target point CP6. In this case, when the vehicle 4 travels through the position MC5 having the distance y [In] that is a predetermined range for executing the caution-required location traveling notification for the notification target point CP6, the driving data generation unit 214 executes the caution-required location traveling notification that performs the notification of approaching the caution-required location.

After the vehicle 4 travels in order of the positions MC5, MC6, and MC7 and enters a position having the distance y [m] that is a predetermined range, the vehicle enters a position having a distance r [m] that is a predetermined range in front of the notification target point, and passes through the distance r [m] that is a predetermined range in front of the notification target point.

When the vehicle 4 leaves the position having the distance r [m] that is a predetermined range in front of the notification target point, the driving evaluation unit 24 evaluates the traveling aspect when the vehicle 4 traveled at the notification target point CP6. Immediately after the vehicle 4 leaves the position having the distance r [m] that is a predetermined range, that is, when the vehicle 4 travels through the position MC7, the driving evaluation unit 24 notifies the driver of the vehicle 4 of an evaluation result.

Figure 11:
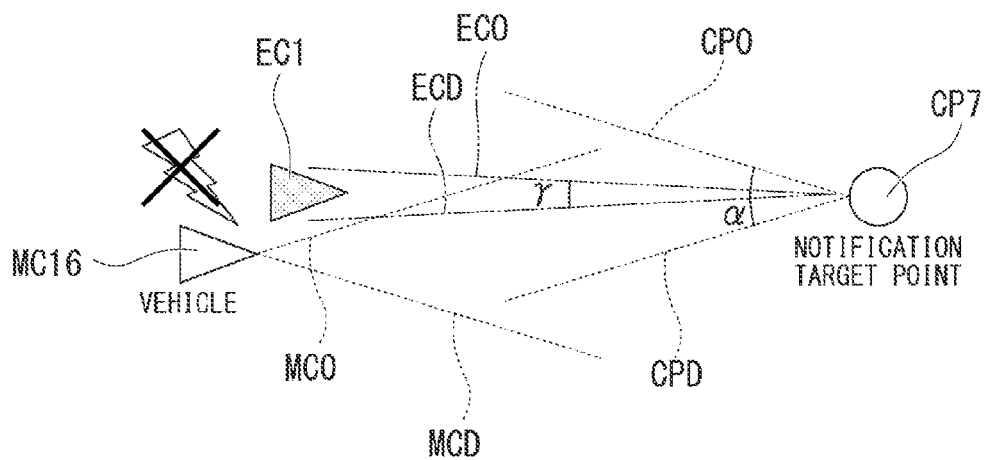
FIG. 11 is an explanatory view explaining an example in which the driving data generation unit related to the present embodiment performs malfunction suppression determination in the notification target point.

FIG. 11 is an explanatory view explaining an example in which the driving data generation unit 214 related to the present embodiment performs malfunction suppression determination in the notification target point.

In order to suppress a malfunction of the caution-required location traveling notification on an adjacent parallel road, the driving data generation unit 214 may provide a notification target point with an operation allowable angle range γ around a sudden deceleration orientation in which a sudden deceleration phenomenon has occurred, may determine whether the vehicle 4 is present within the operation allowable angle range γ, and may execute the caution-required location traveling notification when the vehicle 4 is present within the operation allowable angle range γ. In this case, for example, while the vehicle 4 is traveling at a position MC16, the vehicle is not within the operation allowable angle range γ. Therefore, the driving data generation unit 214 does not execute the caution-required location traveling notification with respect to the vehicle 4 that travels through the position MC16.

Here, the operation allowable angle range γ is an angle range narrower than the predetermined angle range α in FIG. 8.

On the other hand, while the vehicle 4 is traveling at a position EC1, the vehicle is within the operation allowable angle range of the notification target point CP7. Therefore, the driving data generation unit 214 may execute the caution-required location traveling notification with respect to the vehicle 4 that travels through the position EC 1.

Additionally, in order to suppress a malfunction on a parallel road under an elevated load, the driving data generation unit 214 may not execute the caution-required location traveling notification when the minimum speed of the vehicle 4 within a past predetermined period of time exceeds a given speed.

Figure 12:
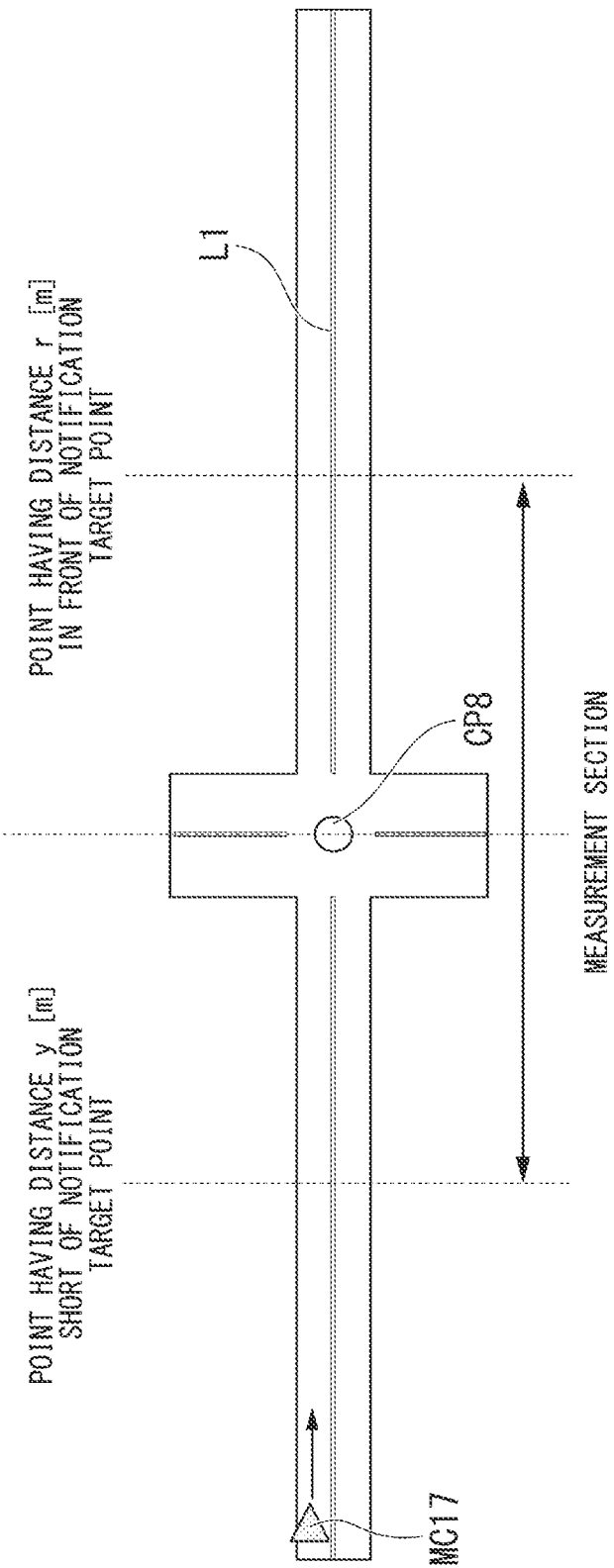
FIG. 12 is an explanatory view explaining an example when the driving evaluation unit related to the present embodiment performs evaluation on the basis of the traveling aspect of a vehicle.

FIG. 12 is an explanatory view explaining an example when the driving evaluation unit 24 related to the present embodiment performs evaluation on the basis of the traveling aspect of the vehicle 4.

When the vehicle 4 tends to travel through a position MC17 and travel through a notification target point CP8, a section from a point having a distance y [m] short of the notification target point CP8 to a point r [m] in front of the notification target point CP8 when the notification target point CP8 is viewed from the vehicle 4 in a route LI on which the vehicle 4 travels is a measurement section.

In this measurement section, the driving evaluation unit 24 performs evaluation of the traveling aspect, on the basis of the traveling aspect (acceleration, deceleration, slow-moving time, or stop time) of the vehicle 4.

Figure 13:
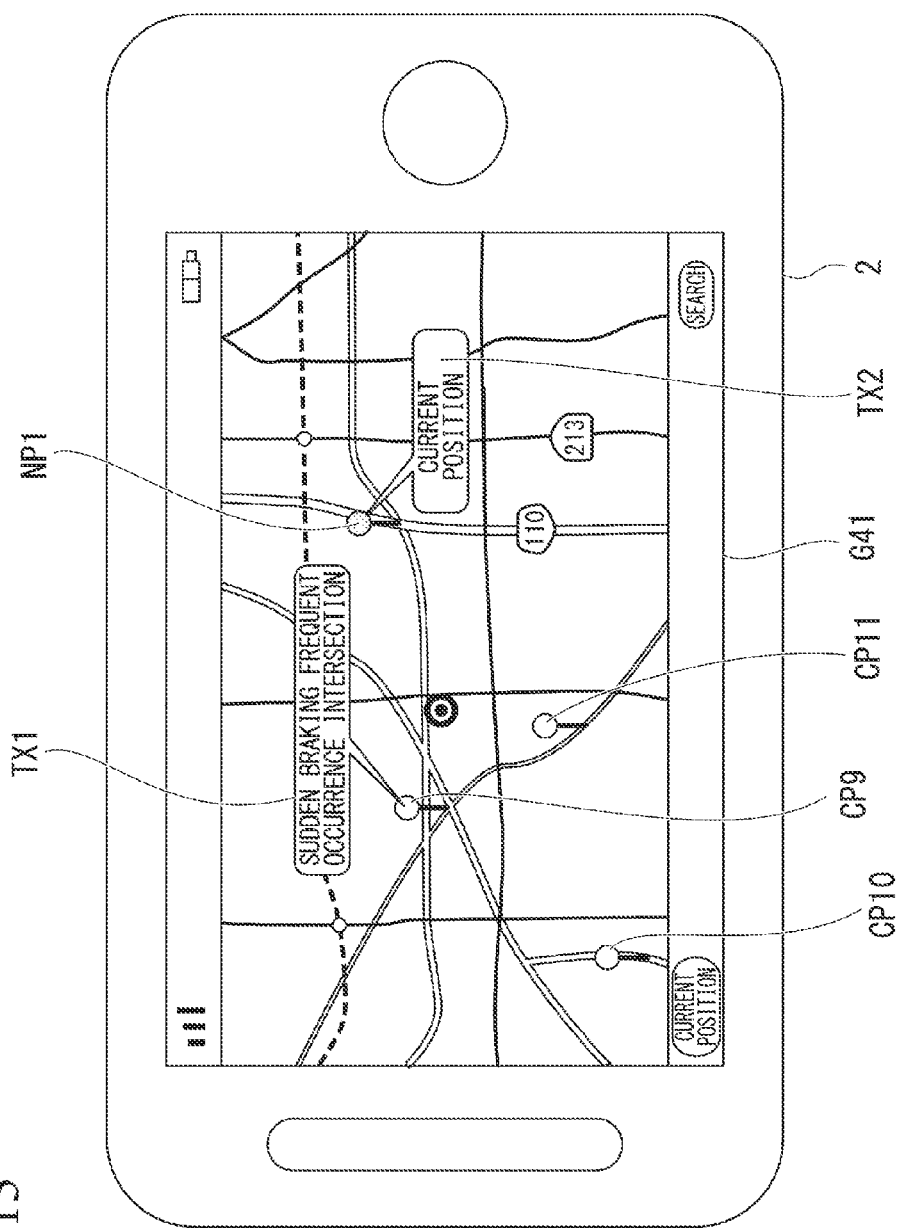
FIG. 13 is a view illustrating an example of a display screen when information on sudden braking frequent occurrence intersections (driving assist locations, caution-required locations) output by an output unit of the electronic device related to the present embodiment is provided.

FIG. 13 is a view illustrating an example of a display screen when information on sudden braking frequent occurrence intersections (driving assist locations, caution-required locations) output by the output unit 242 of the electronic device 2 related to the present embodiment is provided.

The output unit 242 of the electronic device 2 displays, for example, a map image G41, and displays a current position NP1 of the vehicle 4, and sudden braking frequent occurrence intersections CP9, CP10 and CP11. In this case, for example, different icons may be displayed at the current position NP1 of the vehicle 4 and the sudden braking frequent occurrence intersections CP9, CP10, and CP11; a text box TX1 may be displayed at the sudden braking frequent occurrence intersections CP9, CP10, and CP11 and the expression "SUDDEN BRAKING FREQUENT OCCURRENCE INTERSECTION" may be displayed on the text box TX1; or a text box TX2 may be displayed on the current position NP1 of the vehicle 4 and the expression "CURRENT POSITION" may be displayed on the text box TX2.

Figure 14:
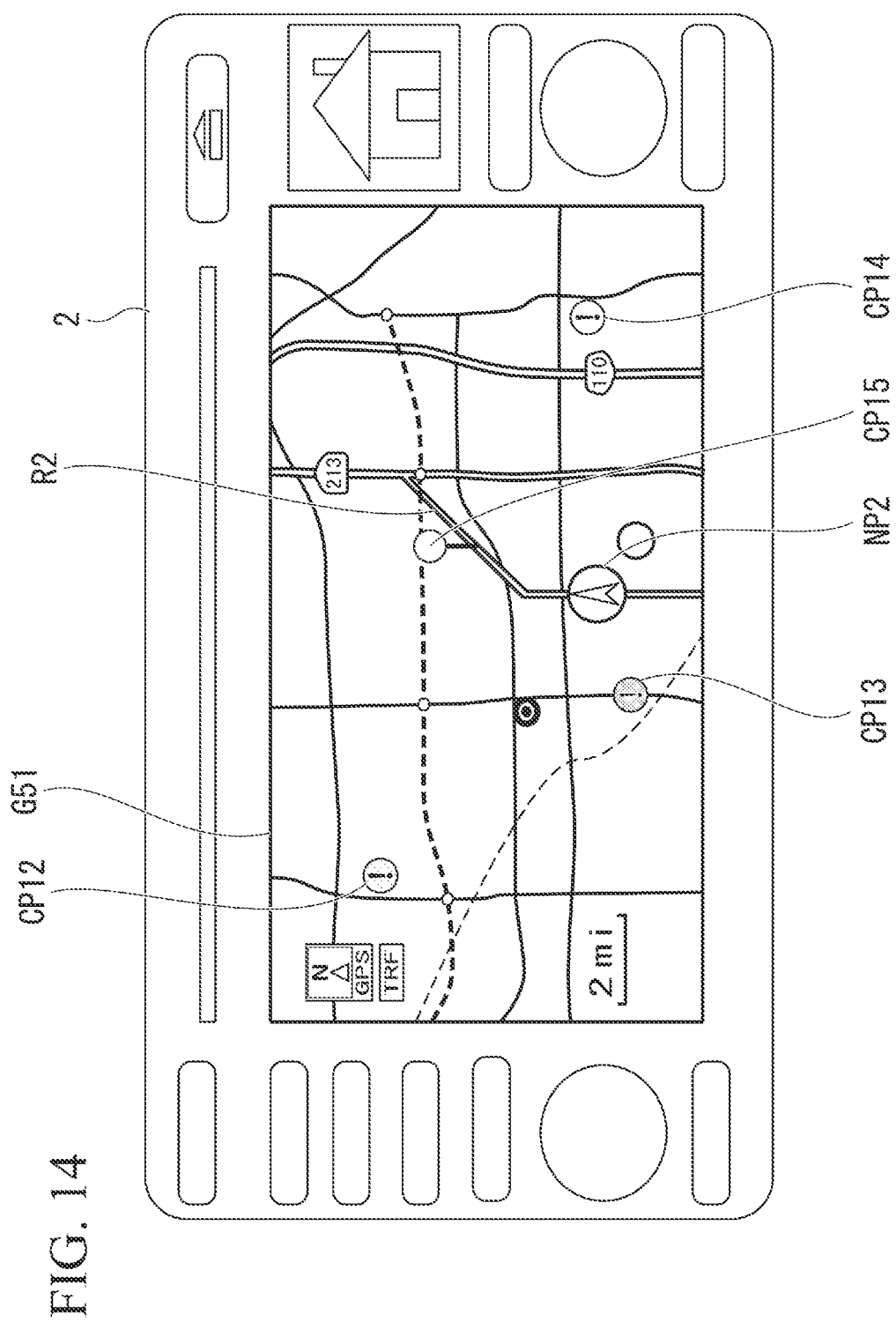
FIG. 14 is a view illustrating an example of a display screen when the information on the sudden braking frequent occurrence intersections (driving assist locations, caution-required locations) output by the output unit of the electronic device related to the present embodiment is provided.

FIG. 14 is a view illustrating an example of a display screen when information on sudden braking frequent occurrence intersections (driving assist locations, caution-required locations) output by the output unit 242 of the electronic device 2 related to the present embodiment is provided.

The output unit 242 of the electronic device 2 displays, for example, a map image G51, and displays a current position NP2 of the vehicle 4 and sudden braking frequent occurrence intersections (driving assist locations, caution-required locations) CP12, CP13, CP14 and CP15. In this case, only the sudden braking frequent occurrence intersection CP15 is present on a traveling route R2 on which the vehicle 4 travels. Therefore, the output unit 242 may display only a display icon of the sudden braking frequent occurrence intersection CP15 in the traveling route R2 with a display icon that is different from the sudden braking frequent occurrence intersections CP12, CP13, and CP14 outside of the traveling route R2. Additionally, there may be adopted a display aspect in which the output unit 242 may stepwisely display the color of a display icon (for example, a three-color display icon) or may change and display the display icons themselves to be displayed, on the basis of the sudden deceleration probabilities in sudden braking frequent occurrence intersections of each of the sudden braking frequent occurrence intersections CP12, CP13, and CP14.

Figure 15:
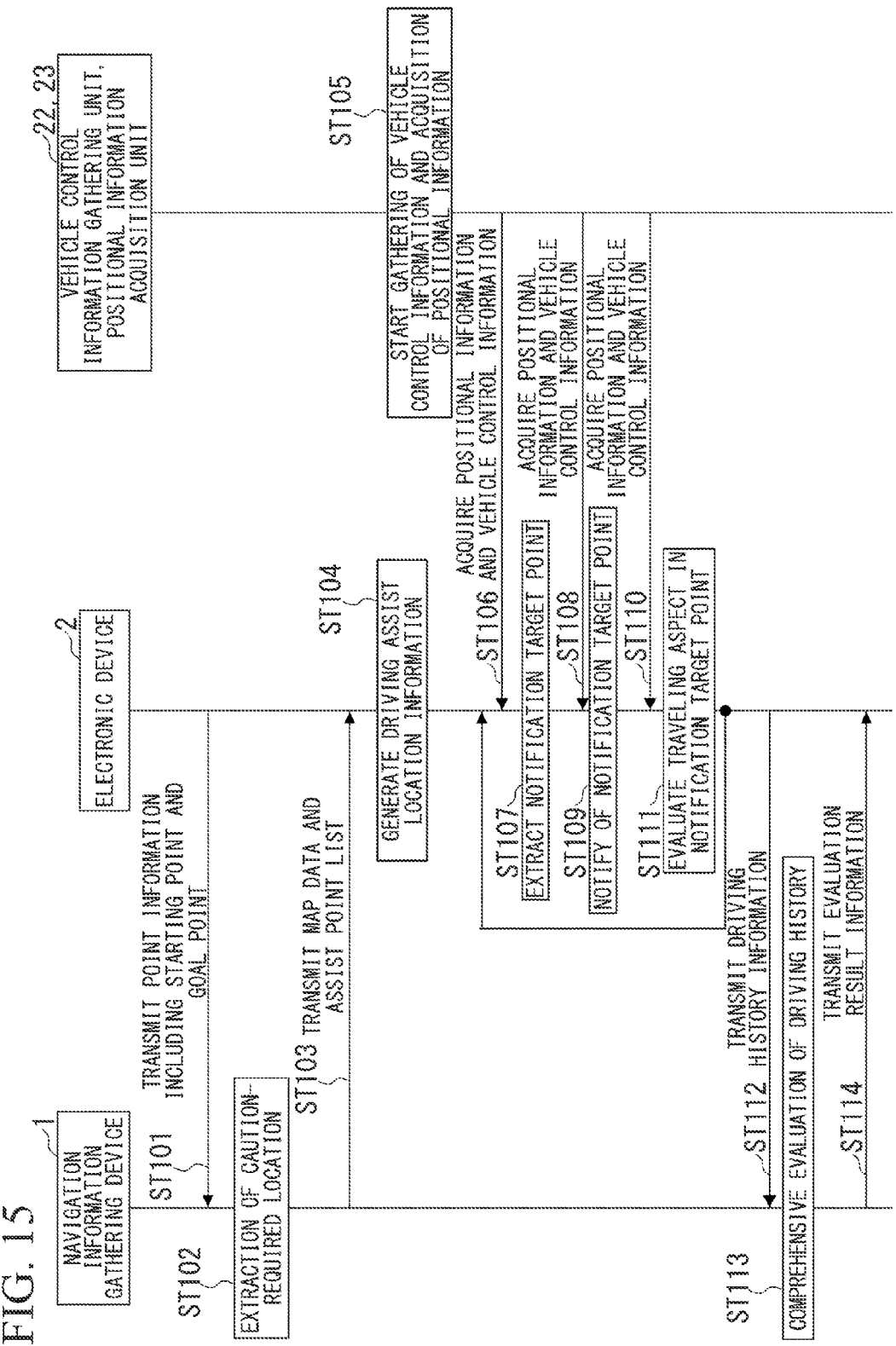
FIG. 15 is a sequence diagram illustrating an example of the operation of the driving assist system related to the present embodiment.

FIG. 15 is a sequence diagram illustrating an example of the operation of the driving assist system S1 related to the present embodiment.

In Step ST101, the electronic device 2 transmits point information including a starting point and a goal point, which is generated by the route information generation unit 211, to the navigation information gathering device 1.

In Step ST102, the intersection estimation unit 153 of the navigation information gathering device 1 performs extraction of caution-required locations, and stores the caution-required locations in the assist point list storage unit 16.

In Step ST103, the navigation information gathering device 1 transmits map data and an assist point list within a range including the point information gathered or acquired by the distribution control unit 18, to the electronic device 2.

In Step ST104, the safety assist information generation unit 213 of the electronic device 2 generates driving assist location information on the basis of the map data, the point information, and the assist point list.

In Step ST105, the positional information acquisition unit 22 and the vehicle control information gathering unit 23 of the electronic device 2 start acquisition of the positional information of the vehicle 4 and gathering of the vehicle control information of the vehicle 4.

In Step ST106, the driving data generation unit 214 of the electronic device 2 acquires the positional information of the vehicle 4 and the vehicle control information of the vehicle 4 that are acquired or gathered by the positional information acquisition unit 22 and the vehicle control information gathering unit 23.

In Step ST107, the driving data generation unit 214 extracts a notification target point from the plurality of caution-required locations included in the assist point list, on the basis of the acquired positional information and vehicle control information.

In Step ST108, the driving data generation unit 214 acquires the positional information of the vehicle 4 and the vehicle control information of the vehicle 4 that are acquired or gathered by the positional information acquisition unit 22 and the vehicle control information gathering unit 23.

In Step ST109, the driving data generation unit 214 performs notification determination for the extracted notification target point, and executes the caution-required location traveling notification on the basis of the determination result.

In Step ST110, the driving data generation unit 214 acquires the positional information of the vehicle 4 and the vehicle control information of the vehicle 4 that are acquired or gathered by the positional information acquisition unit 22 and the vehicle control information gathering unit 23.

In Step ST111, the driving evaluation unit 24 performs evaluation for the traveling aspect of the vehicle 4, on the basis of the traveling aspect of the vehicle 4 within a predetermined range including the notification target point, and notifies the driver of the vehicle 4 of the evaluation result immediately after the vehicle 4 has passed through the notification target point.

In addition, the electronic device 2 repeats the processing of Step ST106 to Step ST111, and performs the processing until the vehicle reaches the goal point from the starting point.

In Step ST112, the electronic device 2 transmits one trip, that is, a traveling history from the starting point to the goal point, to the navigation information gathering device 1 as driving history information.

In Step ST113, the navigation information gathering device 1 stores the driving history information received from the electronic device 2 in the traveling history storage unit 14, and the assist contents unit 17 comprehensively evaluates the driving history.

In Step ST114, the navigation information gathering device 1 transmits evaluation result information including the evaluation result to the electronic device 2.

Figure 16:
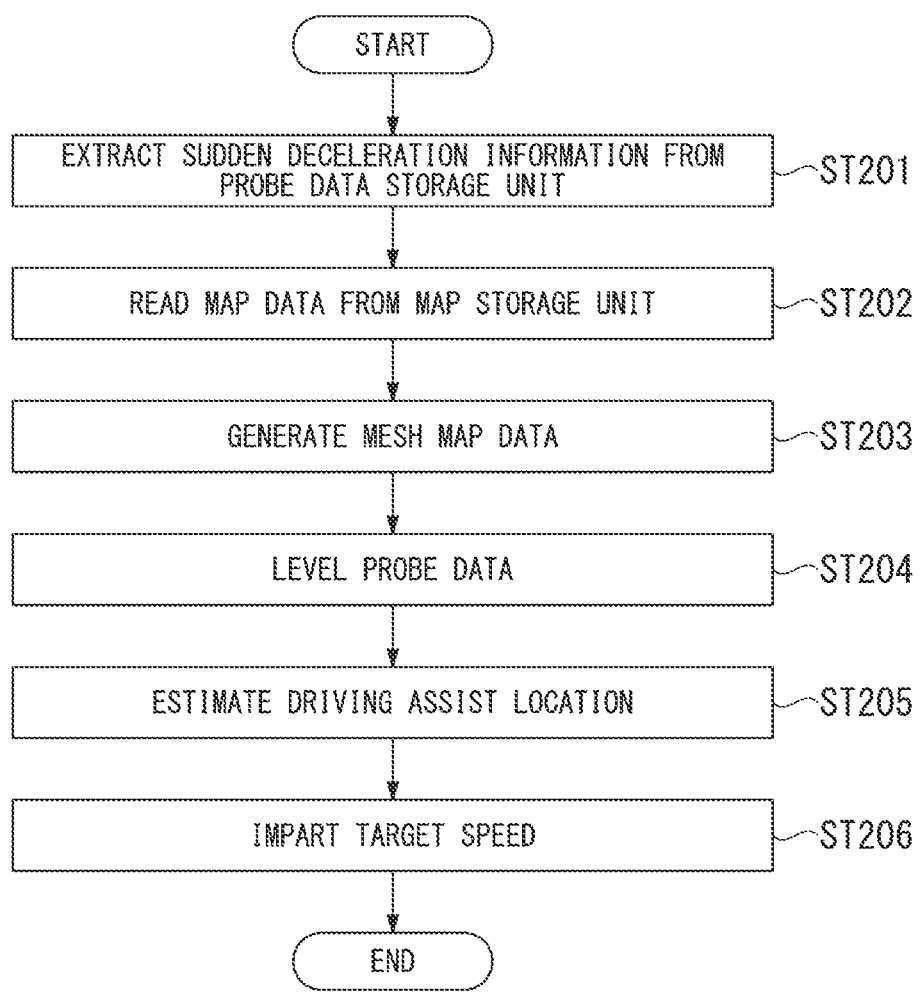
FIG. 16 is a flowchart illustrating an example of assist point list extraction processing of an assist point list estimation unit related to the present embodiment.

FIG. 16 is a flowchart illustrating an example of assist point list extraction processing of the assist point list estimation unit 15 related to the present embodiment.

In Step ST201, the point extraction unit 151 reads probe data from the probe data storage unit 11, and extracts sudden deceleration information, including a position where a sudden deceleration phenomenon has occurred, from the probe data and the traveling direction of the vehicle when the sudden deceleration phenomenon occurred.

In Step ST202, the division unit 152 reads map data from the map storage unit 12.

In Step ST203, the first mesh division unit 1521 divides a predetermined range of the map data into block-shaped meshes in the latitudinal direction and the longitudinal direction, and generates first mesh map data. The second mesh division unit 1522 divides one mesh in the first mesh map data into a plurality of (for example, nine) meshes, and generates second mesh map data.

In Step ST204, the leveling unit 154 refers to the probe data, and levels one or both of the probe data and sudden braking frequent occurrence intersections estimated by the intersection estimation unit 153 in a predetermined period of time.

In Step ST205, the intersection estimation unit 153 estimates the sudden braking frequent occurrence intersections as driving assist locations, on the basis of the first mesh map data, the second mesh map data, the number of sudden deceleration occurrence points, a sudden deceleration orientation, and sudden deceleration probability.

In Step ST206, the target speed imparting unit 156 imparts target speeds, which are calculated for each of links in the sudden braking frequent occurrence intersections and become targets for safely passing through the sudden braking frequent occurrence intersections, to the sudden braking frequent occurrence intersections, on the basis of the probe data and the map data.

Figure 17:
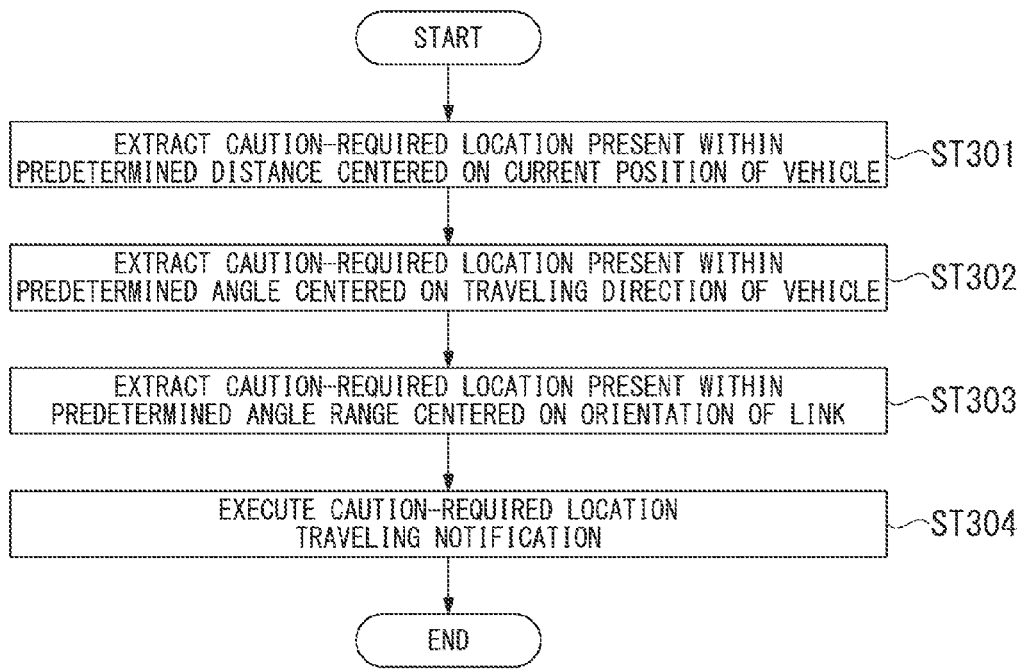
FIG. 17 is a flowchart illustrating an example of notification target point extraction processing in the driving data generation unit related to the present embodiment.

FIG. 17 is a flowchart illustrating an example of notification target point extraction processing in the driving data generation unit 214 related to the present embodiment.

In Step ST301, the driving data generation unit 214 extracts, as a first candidate sudden braking frequent occurrence intersection, a caution-required location present within a predetermined distance range centered on the current position of the vehicle 4, from the plurality of caution-required locations.

In Step ST302, the driving data generation unit 214 extracts, as a second candidate sudden braking frequent occurrence intersection, a caution-required location present within a predetermined angle centered on the current traveling direction of the vehicle 4 passing through the current position of the vehicle 4, from the plurality of caution-required locations.

In Step ST303, the driving data generation unit 214 extracts, as a notification target point, a caution-required location where the current position of the vehicle 4 is present within a predetermined angle range centered on the orientation of a link through which the vehicle 4 is determined to pass by referring to map data holding information of a plurality of links in which positions and orientations are matched with each other, from caution-required locations extracted in common by both the first candidate sudden braking frequent occurrence intersection and the second candidate sudden braking frequent occurrence intersection.

In Step ST304, the driving data generation unit 214 determines whether or not the distance between the current position of the vehicle 4 and the notification target point is within a predetermined distance. Then, the driving data generation unit 214 compares the traveling speed of the vehicle 4 with a target speed in the link of the notification target point, when the distance between the current position of the vehicle 4 and the notification target point is within the predetermined distance. When the traveling speed of the vehicle 4 is equal to or higher than a predetermined value of the target speed and when the current traveling speed of the vehicle 4 is a uniform speed, the driving data generation unit 214 determines whether or not the vehicle 4 reaches the notification target point from the current position of the vehicle 4 within a first time threshold. When the vehicle 4 reaches the notification target point from the current position of the vehicle within the first time threshold and when the current traveling speed of the vehicle 4 is a uniform speed, the driving data generation unit 214 determines whether or not the vehicle 4 reaches the notification target point from the current position of the vehicle 4 within a second time threshold. When the current traveling speed of the vehicle 4 is a uniform speed and the vehicle 4 reaches the notification target point from the current position of the vehicle 4 within the second time threshold, the driving data generation unit 214 executes the caution-required location traveling notification in the notification target point.

Figure 18:
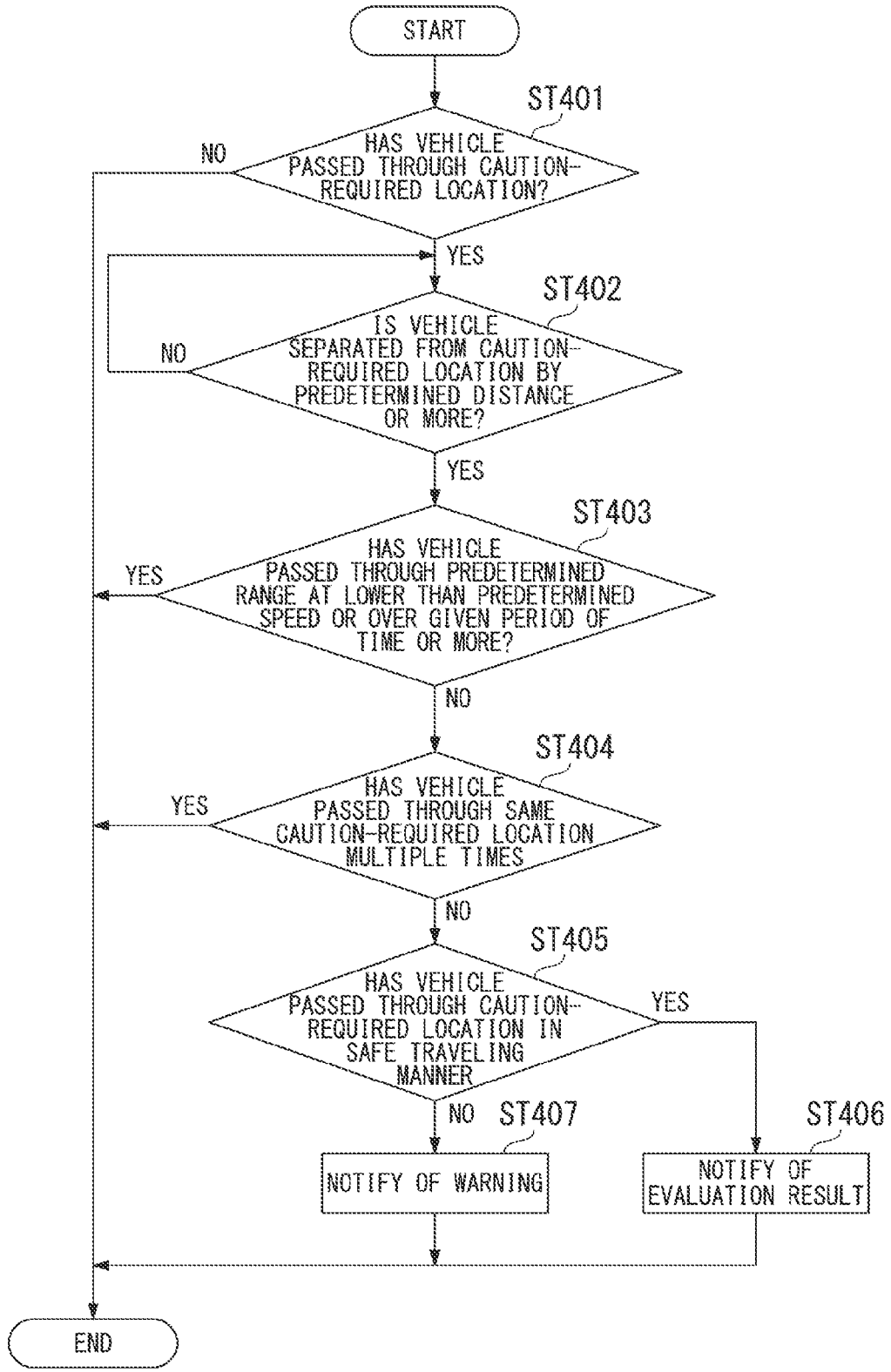
FIG. 18 is a flowchart illustrating an example in which the driving evaluation unit related to the present embodiment performs evaluation processing of the traveling aspect of the vehicle in the notification target point.

FIG. 18 is a flowchart illustrating an example in which the driving evaluation unit 24 related to the present embodiment performs evaluation processing of the traveling aspect of the vehicle 4 in the notification target point.

In Step ST401, the driving evaluation unit 24 determines whether or not the vehicle 4 has passed through the caution-required location that is the notification target point. When the vehicle 4 has not passed through the caution-required location, the evaluation processing is ended. On the other hand, when the vehicle 4 has passed through the caution-required location, the processing proceeds to Step ST402.

In Step ST402, the driving evaluation unit 24 determines whether or not the vehicle 4 is separated from the caution-required location by a predetermined distance or more. When the vehicle 4 is not separated from the caution-required location by the predetermined distance or more, the processing of Step ST402 is repeated. On the other hand, when the vehicle 4 is separated from the caution-required location by the predetermined distance or more, the processing proceeds to Step ST403.

In Step ST403, the driving evaluation unit 24 determines whether or not the vehicle 4 has passed through a predetermined range at lower than a predetermined speed or passed through the predetermined range over a given period of time or more. When the vehicle 4 has passed through the predetermined range at lower than the predetermined speed, or when the vehicle has passed through the predetermined range over the given period of time or more, the evaluation is regarded as being outside of a target and the evaluation processing is ended. On the other hand, when the vehicle 4 does not pass through the predetermined range at lower than the predetermined speed or when the vehicle does not pass through the predetermined range over a given period of time or more, the processing proceeds to Step ST404. That is, when the vehicle 4 has passed through the predetermined range at the predetermined speed or higher or when the vehicle has passed through the predetermined range within the given period of time, the processing proceeds to Step ST404.

In Step ST404, the driving evaluation unit 24 determines whether or not the vehicle 4 has passed through the same caution-required location multiple times. When the vehicle 4 has passed through the same caution-required location multiple times, the evaluation of the caution-required location is regarded as being outside of the target and the evaluation processing is ended. On the other hand, when the vehicle 4 does not pass through the same caution-required location multiple times, the processing proceeds to Step ST405.

In Step ST405, the driving evaluation unit 24 determines whether or not the vehicle 4 has passed through the caution-required location in a safe (suitable) traveling manner. When the vehicle 4 has passed through the caution-required location in a safe (suitable) traveling manner, the processing proceeds to Step ST406. On the other hand, when the vehicle 4 does not pass through the caution-required location in a safe (suitable) traveling manner, the processing proceeds to Step ST407.

In Step ST406, the driving evaluation unit 24 notifies the driver of the vehicle 4 of an evaluation result, and ends the evaluation processing.

In Step ST407, the driving evaluation unit 24 notifies the driver of the vehicle 4 of the warning of urging the driver to pass through the caution-required location in a safe traveling manner, and ends the evaluation processing.

In this way, according to the present embodiment, a notification system (the driving assist system S1) includes a first extraction unit (the first candidate sudden braking frequent occurrence intersection extracting means of the driving data generation unit 214) that extracts caution-required locations present within a predetermined distance range centered on a current position of a vehicle from a plurality of caution-required locations of which the positional information is previously acquired; a second extraction unit (the second candidate sudden braking frequent occurrence intersection extracting means of the driving data generation unit 214) that extracts a caution-required location present within a predetermined angle centered on a current traveling direction of the vehicle from the plurality of caution-required locations; a third extraction unit (the notification target point extracting means of the driving data generation unit 214) that extracts a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted in common by both the first extraction unit (the first candidate sudden braking frequent occurrence intersection extracting means) and the second extraction unit (the second candidate sudden braking frequent occurrence intersection extracting means); and an execution unit (the output unit 242) that executes a caution-required location traveling notification in accordance with the approach of the vehicle to the caution-required location extracted by the third extraction unit (notification target point extracting means of the driving data generation unit 214).

Accordingly, the notification system (driving assist system S1) can extract the caution-required location where the current position of the vehicle 4 is present within the predetermined distance range where the vehicle 4 is located, within the predetermined angle centered on the current traveling direction of the vehicle 4, and within the predetermined angle range centered on the orientation of the link through which the vehicle 4 is determined to pass through from the plurality of caution-required locations, and can execute the caution-required location traveling notification in response to the vehicle 4 approaching the caution-required location. For this reason, a user's convenience when the caution-required location is reported can be improved.

Second Embodiment

Hereinafter, a second embodiment of the invention will be described in detail, referring to the drawings.

Figure 19:
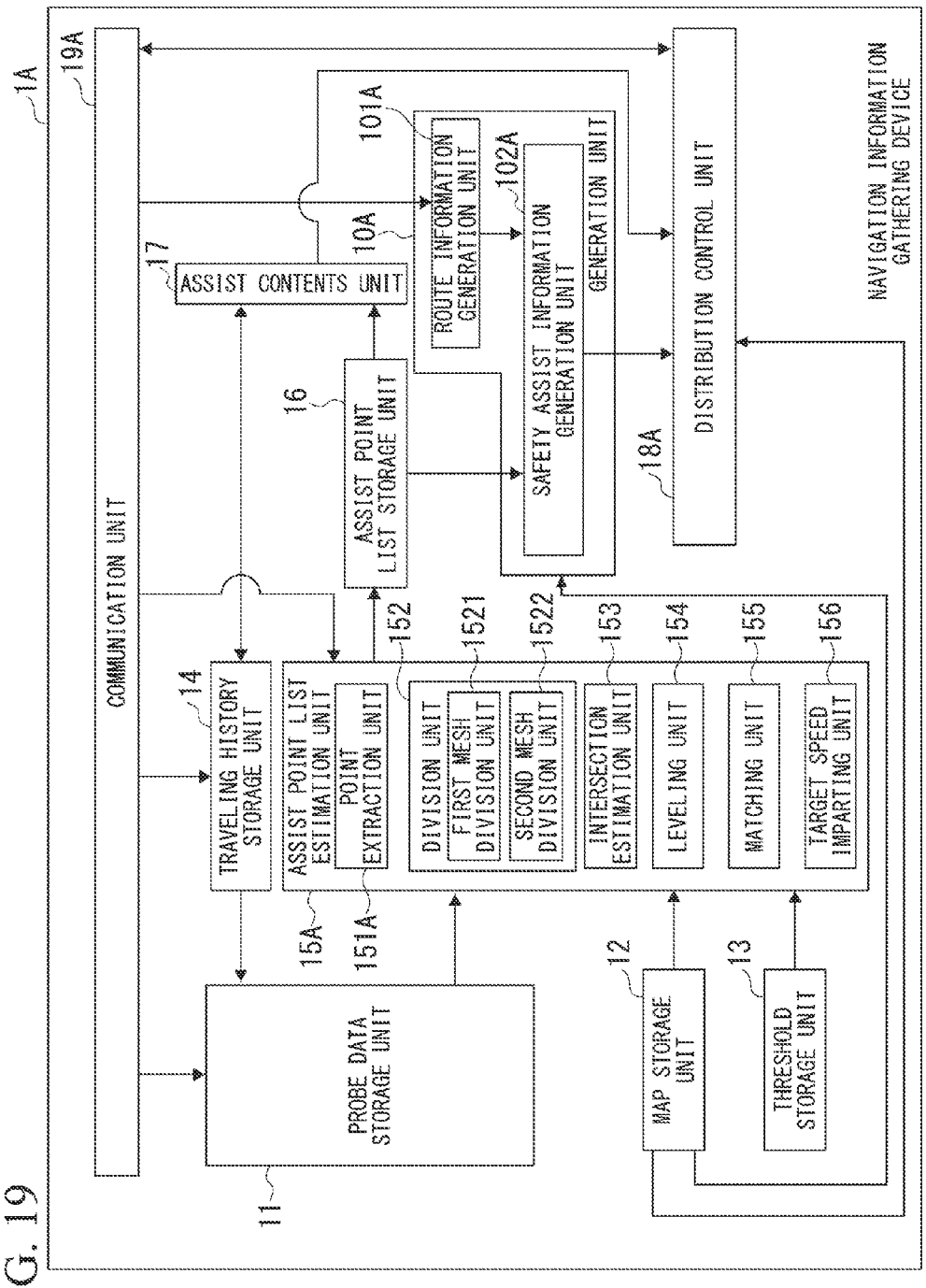
FIG. 19 is a schematic block diagram illustrating an example of the configuration of a navigation information gathering device related to a second embodiment of the invention.

FIG. 19 is a schematic block diagram illustrating an example of the configuration of a navigation information gathering device 1A related to the second embodiment of the invention.

The navigation information gathering device 1A includes the probe data storage unit 11, the map storage unit 12, the threshold storage unit 13, the traveling history storage unit 14, an assist point list estimation unit 15A, the assist point list storage unit 16, the assist contents unit 17, a distribution control unit 18A, a communication unit 19A, and a generation unit 10A. The assist point list estimation unit 15A includes a point extraction unit 151A, the division unit 152, the intersection estimation unit 153, the leveling unit 154, the matching unit 155, and the target speed imparting unit 156. The division unit 152 includes the first mesh division unit 1521 and the second mesh division unit 1522. The generation unit 10A includes a route information generation unit 101A and a safety assist information generation unit 102A.

If the navigation information gathering device 1 related to the first embodiment and the navigation information gathering device 1A related to the second embodiment are compared with each other, the generation unit 10A is added in the navigation information gathering device 1A. Since the other configurations are the same as that of the navigation information gathering device 1 related to the first embodiment, the description thereof will be omitted. In addition, since the point extraction unit 151A of the assist point list estimation unit 15A, the distribution control unit 18A, the communication unit 19A, and the generation unit 10A in the navigation information gathering device 1A are different in terms of operation, the description thereof will be made.

The point extraction unit 151A reads a predetermined range of the probe data including point information received from the electronic device 2A via the communication unit 19A and the network N1, from the probe data storage unit 11, and extracts sudden deceleration information, including a position where a sudden deceleration phenomenon corresponding to a predetermined condition (for example, the vehicle speed information is deceleration equal to or higher than a threshold) has occurred, from the probe data and the traveling direction of the vehicle when the sudden deceleration phenomenon occurred. The point extraction unit 151A outputs the extracted sudden deceleration information to the intersection estimation unit 153.

If point information including a starting point and a goal point is received via the communication unit 19A from the electronic device 2A, the route information generation unit 101A reads map data within a range including the point information from the map storage unit 12, searches for a route, on the basis of the starting point and the goal point, which are included in the point information, from the map data, and generates navigation information. The route information generation unit 101A outputs the generated navigation information to the safety assist information generation unit 102A.

The safety assist information generation unit 102A reads an assist point list within the range including the point information from the assist point list storage unit 16, on the basis of the point information including the starting point and the goal point received via the communication unit 19A from the electronic device 2A. The safety assist information generation unit 102A matches sudden braking occurrence intersection information (driving assist location information or caution-required location information) included in the assist point list with the map data included in the navigation information, on the basis of the assist point list and the navigation information input from the route information generation unit 101A, and generates driving assist location information. The safety assist information generation unit 102A outputs the generated driving assist location information to the distribution control unit 18A.

The distribution control unit 18A controls the distribution of the applications managed by the assist contents unit 17. Additionally, the distribution control unit 18A performs the control of transmitting the driving assist location information, which is input from the safety assist information generation unit 102A, to the electronic device 2A via the communication unit 19A and the network N1. Additionally, the distribution control unit 18 performs the control of transmitting contents information, which is input from the assist contents unit 17, to the electronic device 2A via the communication unit 19A and the network N1.

The communication unit 19A performs communication with the electronic device 2A. The communication unit 19A performs communication processing, such as coding/decoding, modulation/demodulation, AD/DA conversion, or frequency conversion of data, or transmission/reception of data signals through radio waves. The communication unit 19A is connected to the network N1 in a wired or wireless manner.

Figure 20:
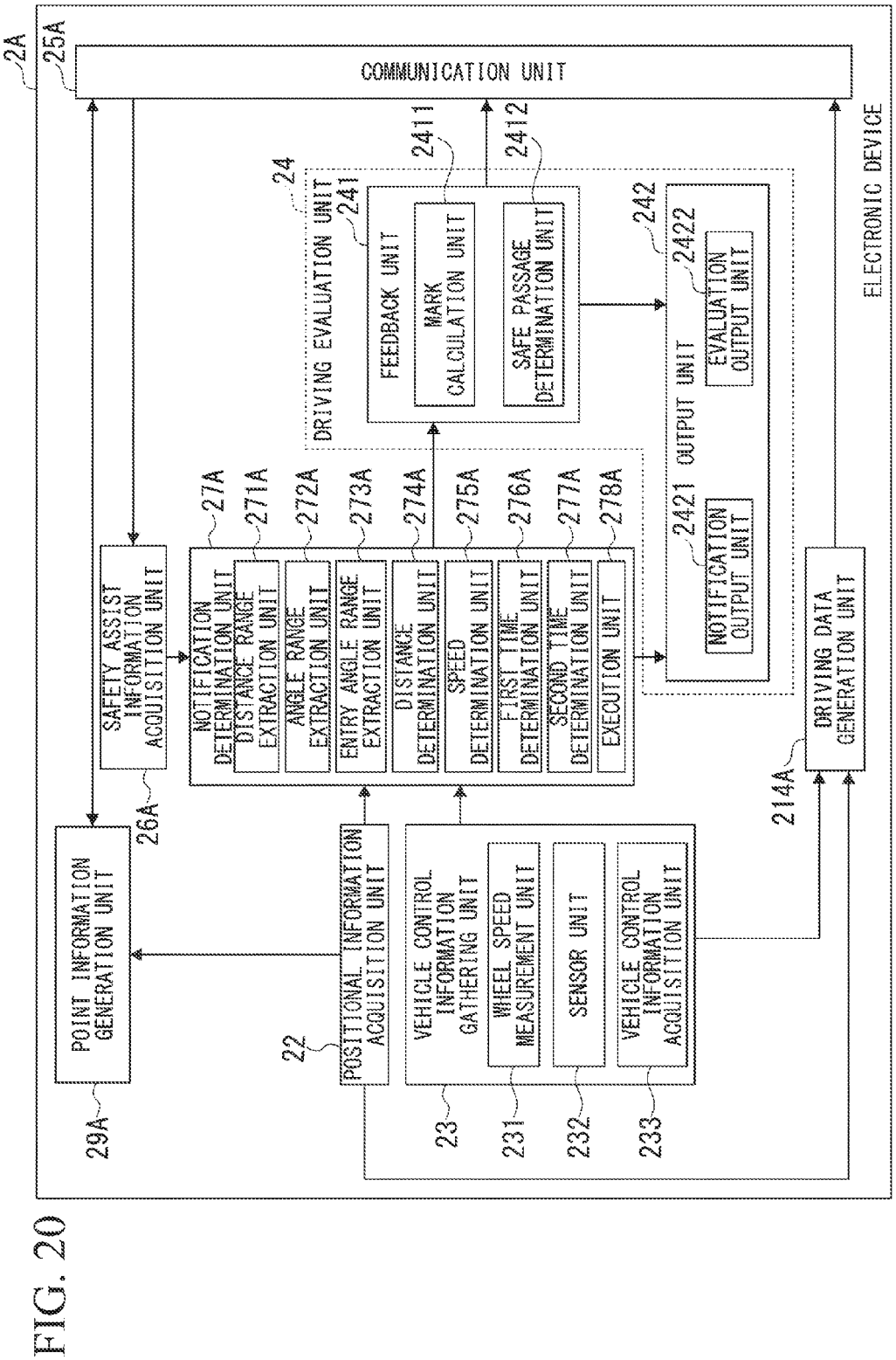
FIG. 20 is a schematic block diagram illustrating an example of the configuration of the electronic device.

FIG. 20 is a schematic block diagram illustrating an example of the configuration of the electronic device 2A related to the present embodiment.

The electronic device 2A includes a driving data generation unit 214A, the positional information acquisition unit 22, the vehicle control information gathering unit 23, the driving evaluation unit 24, a communication unit 25A, a safety assist information acquisition unit 26A, a notification determination unit 27A, and a point information generation unit 29A. The vehicle control information gathering unit 23 includes the wheel speed measurement unit 231, the sensor unit 232, and the vehicle control information acquisition unit 233. The driving evaluation unit 24 includes the feedback unit 241 and the output unit 242. The feedback unit 241 includes the mark calculation unit 2411 and the safe passage determination unit 2412. The output unit 242 includes the notification output unit 2421 and the evaluation output unit 2422. The notification determination unit 27A includes a distance range extraction unit 271A, an angle range extraction unit 272A, an entry angle range extraction unit 273A, a distance determination unit 274A, a speed determination unit 275A, a first time determination unit 276A, a second time determination unit 277A, and an execution unit 278A.

If the electronic device 2 related to the first embodiment is compared with the electronic device 2A related to the second embodiment, the generation unit 21 is eliminated from the electronic device 2A, and the driving data generation unit 214A, the safety assist information acquisition unit 26A, the notification determination unit 27A, and the point information generation unit 29A are added to the electronic device 2A. Since the other configurations are the same as those of the electronic device 2, the description thereof will be omitted.

The point information generation unit 29A receives input of a starting point and a goal point. The point information generation unit 29A transmits the received starting point and the goal point to the navigation information gathering device 1A via the communication unit 25A and the network N1 as point information. In addition, when the starting point is a current position of the vehicle 4, the point information generation unit 29A may acquire positional information from the positional information acquisition unit 22 and transmit the information including the current position and the goal point to the navigation information gathering device 1A via the communication unit 25A and the network N1 as the point information.

The safety assist information acquisition unit 26A acquires driving assist location information from the navigation information gathering device 1A via the communication unit 25A and the network N1. The safety assist information acquisition unit 26A outputs the acquired driving assist location information to the notification determination unit 27A.

The driving data generation unit 214A matches the positional information of the vehicle 4 with the vehicle control information and generates a traveling history, on the basis of the current position of the vehicle 4 input from the positional information acquisition unit 22 and the vehicle control information input from the vehicle control information gathering unit 23, and transmits the generated traveling history to the navigation information gathering device 1A via the communication unit 25 and the network N1.

The notification determination unit 27A executes driving assist in the traveling of the vehicle 4, on the basis of the positional information input from the positional information acquisition unit 22, the vehicle control information input from the vehicle control information gathering unit 23, and the driving assist location information input from the safety assist information acquisition unit 26A. Additionally, the notification determination unit 27A extracts a notification target point when predetermined conditions to be described below are satisfied, from a plurality of caution-required locations, on the basis of the positional information input from the positional information acquisition unit 22, the vehicle control information input from the vehicle control information gathering unit 23, and the driving assist location information input from the safety assist information acquisition unit 26A, and executes a caution-required location traveling notification in accordance with the approach of the vehicle 4 to the notification target point. Additionally, the notification determination unit 27A outputs the information regarding the extracted notification target point, the positional information, and the vehicle control information to the feedback unit 241.

First, the distance range extraction unit 271A (first extraction unit) extracts, as a first candidate caution-required location, a sudden braking frequent occurrence intersection, which is present within a predetermined distance range centered on the current position of the vehicle 4, from a plurality of caution-required locations included in the driving assist location information.

Next, the angle range extraction unit 272A (second extraction unit) extracts, as a second candidate caution-required location, a sudden braking frequent occurrence intersection, which is present nearest to the current position of the vehicle 4, from the plurality of caution-required locations included in the driving assist location information.

Then, the entry angle range extraction unit 273A (third extraction unit) extracts, as a notification target point, a caution-required location in a link where the vehicle 4 travels with the highest probability as a caution-required location in a traveling route along which the vehicle 4 travels, from caution-required locations extracted in common by both the first candidate caution-required location extracted by the distance range extraction unit 271A and the second candidate caution-required location extracted by the angle range extraction unit 272A.

In this way, the notification target point is extracted from the plurality of caution-required locations, when predetermined conditions are satisfied in each of the distance range extraction unit 271A. the angle range extraction unit 272A, and the entry angle range extraction unit 273A.

The distance determination unit 274A determines whether or not the distance between the current position of the vehicle 4 and the notification target point is within the predetermined distance.

When the distance between the current position of the vehicle 4 and the notification target point is within the predetermined distance, the speed determination unit 275A compares the traveling speed of the vehicle 4 with a target speed of the link of the notification target point, and determines whether or not the traveling speed of the vehicle 4 is equal to or higher than a predetermined value of the target speed.

When the traveling speed of the vehicle 4 is equal to or higher than the predetermined value of the target speed and the current traveling speed of the vehicle 4 is a uniform speed, the first time determination unit 276A determines whether or not the vehicle 4 reaches the notification target point from the current position of the vehicle 4 within a first time threshold.

When the vehicle 4 reaches the notification target point from the current position of the vehicle 4 within the first time threshold and the current traveling speed of the vehicle 4 is a uniform speed, the second time determination unit 277A determines whether or not the vehicle 4 reaches the notification target point from the current position of the vehicle 4 within a second time threshold.

When the current traveling speed of the vehicle 4 is a uniform speed and when the vehicle 4 reaches the notification target point from the current position of the vehicle 4 within the second time threshold, the execution unit 278A executes the caution-required location traveling notification in the notification target point.

In this way, the execution unit 278A executes the caution-required location traveling notification in the notification target point while interlocking with the output unit 242, on the basis of the determination results in the distance determination unit 274A, the speed determination unit 275A, the first time determination unit 276A, and the second time determination unit 277A.

The communication unit 25A performs communication with the navigation information gathering device 1. The communication unit 25A performs communication processing, such as coding/decoding, modulation/demodulation, AD/DA (conversion, or frequency conversion of data, or transmission/reception of data signals through radio waves. The communication unit 25A is connected to the network N1 in a wired or wireless manner.

Figure 21:
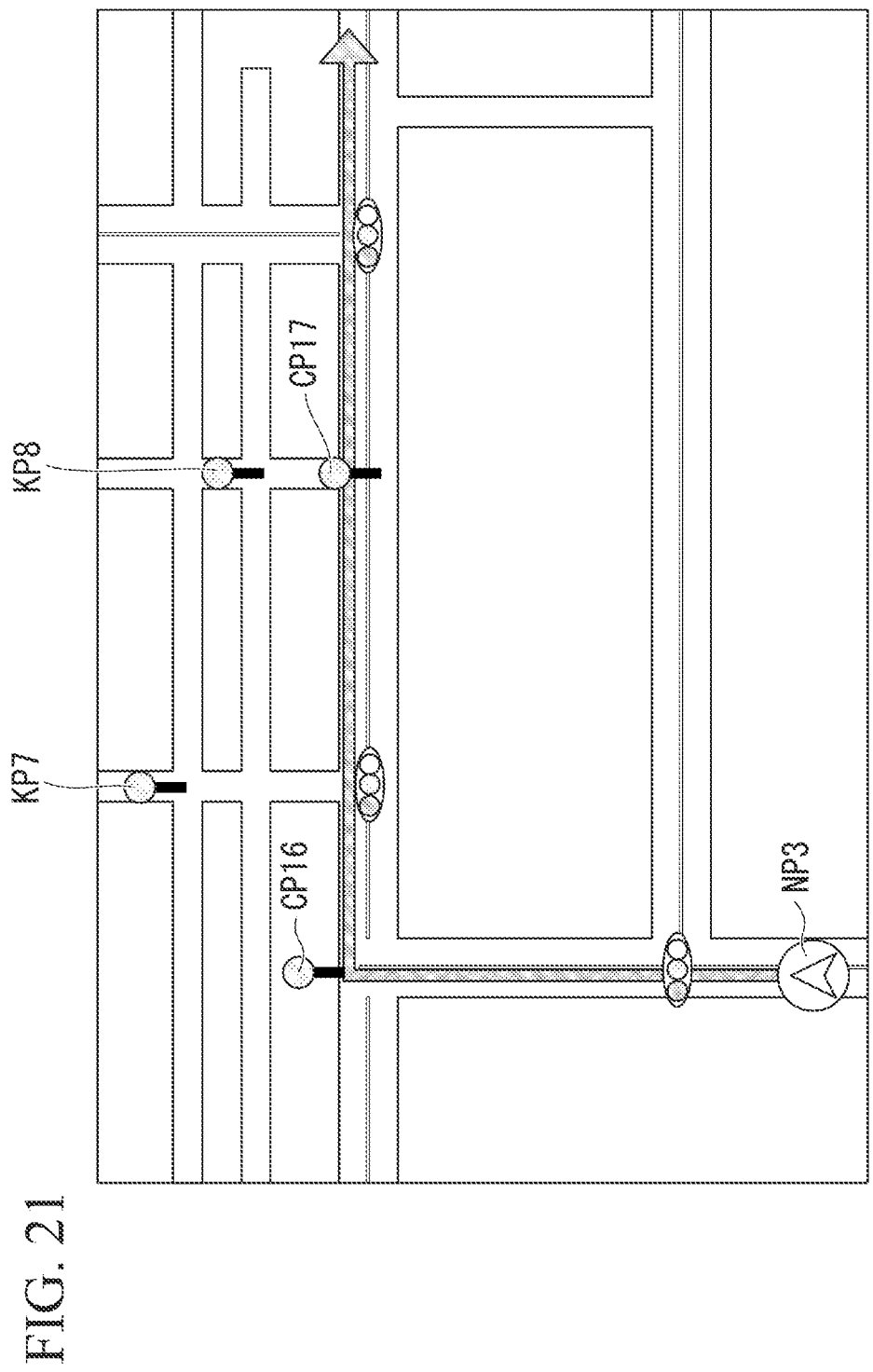
FIG. 21 is an explanatory view explaining the operation of a notification system related to the present embodiment.

FIG. 21 is an explanatory view explaining the operation of a notification system related to the present embodiment.

When a vehicle travels in a predetermined route at a current position NP3 of the vehicle 4 and a goal point, in the notification system, a plurality of caution-required locations KP7, KP8, CP16, and CP17 are present in a predetermined range of the driving assist location information including the current position of the vehicle 4 and the goal point. The distance range extraction unit 271A, the angle range extraction unit 272A, and the entry angle range extraction unit 273A extract notification target points from caution-required locations in an interlocking manner, thereby extracting the caution-required locations CP16 and CP17 present on a route R3 along which the vehicle 4 travels, as notification target points.

Accordingly, when a plurality of caution-required locations are present in a predetermined range including the current position of the vehicle 4, notification for the caution-required locations KP7 and KP8 that are not present on the route R3 along which the vehicle 4 travels can be kept from being executed, and erroneous caution-required location traveling notification in caution-required locations can be suppressed.

Figure 22:
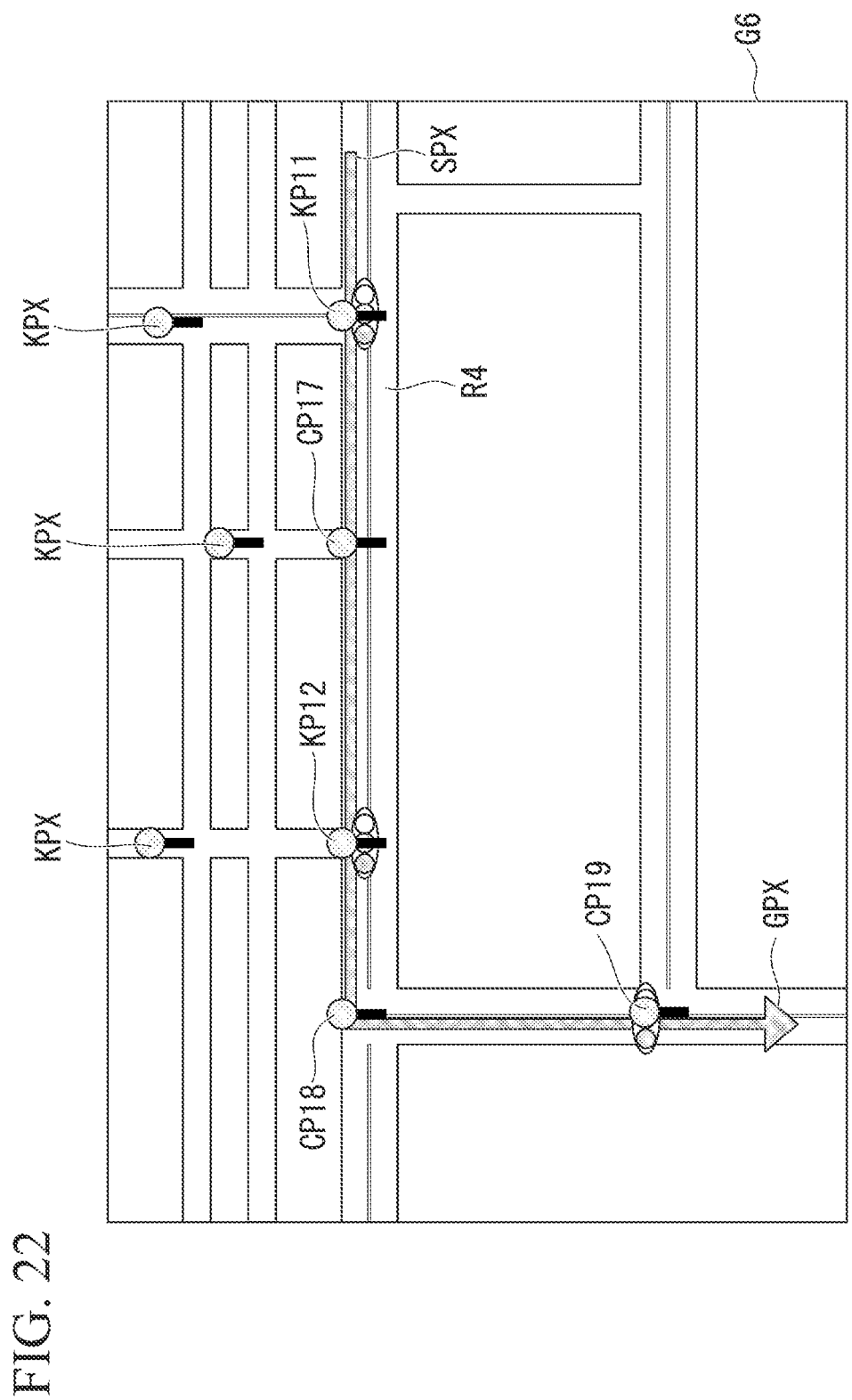
FIG. 22 is an explanatory view explaining a plurality of caution-required locations, notification target points, and a traveling route of the vehicle, related to the present embodiment.

FIG. 22 is an explanatory view explaining a plurality of caution-required locations, notification target points, and a traveling route of the vehicle 4, related to the present embodiment.

An explanatory view G6 is a map image view. A traveling route R4 when the traveling route of the vehicle 4 is searched for with reference to map data on the basis of a starting point SPX and a goal point GPX, and a plurality of caution-required locations KPX, KP11, KP12, CP17, CP18 and CP19 are included in the explanatory view G6. In this case, the caution-required locations KP11, CP17, KP12, CP18, and CP19 are also present on the traveling route R4. Here, traffic light information in the caution-required locations KP11, KP12, and CP19 shows that traffic lights are installed, and the distance range extraction unit 271A, the angle range extraction unit 272A, and the entry angle range extraction unit 273A do not extract the caution-required locations KP11, KP12, and CP19 as notification target points in an interlocking manner. In the caution-required locations CP17 and CP18 that are extracted by the distance range extraction unit 271A, the angle range extraction unit 272A, and the entry angle range extraction unit 273A, the execution unit 278A executes the caution-required location traveling notification, on the basis of determination results in the distance determination unit 274A, the speed determination unit 275A, the first time determination unit 276A, and the second time determination unit 277A.

Figure 23:
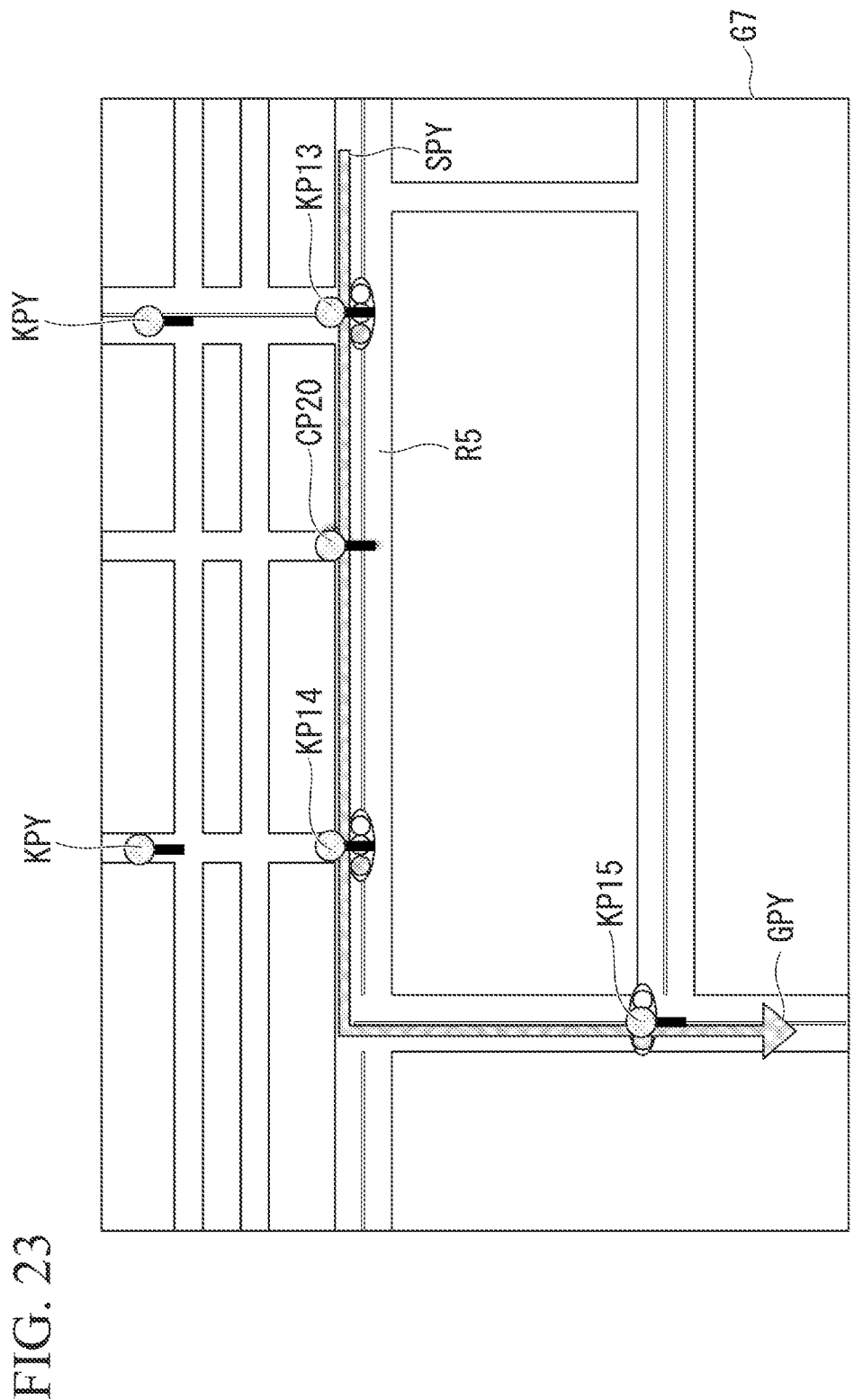
FIG. 23 is an explanatory view explaining a plurality of caution-required locations, a notification target point, and a traveling route of the vehicle, related to the present embodiment.

FIG. 23 is an explanatory view explaining a plurality of caution-required locations, a notification target point, and a traveling route of the vehicle 4, related to the present embodiment.

An explanatory view G7 is a map image view. A traveling route R5 when the traveling route of the vehicle 4 is searched for with reference to map data on the basis of a starting point SPY and a goal point GPY, and a plurality of caution-required locations KPY, KP13, CP20, KP14 and KP15, are included in the explanatory view G7.

Here, if the explanatory view G6 of FIG. 22 is compared with the explanatory view G7 of FIG. 23, the number of the caution-required locations in the explanatory view G7 is smaller than the number of the caution-required locations in the explanatory view G6. This is because the assist point list estimation unit 15A reduces the number of caution-required locations extracted with reference to a threshold stored in the threshold storage unit 13. In this way, the number of caution-required locations extracted can be adjusted by referring to the threshold in the extraction of caution-required locations. In addition, the distribution control unit 18A may filter an assist point list read from the assist point list storage unit 16 with reference to the threshold storage unit 13, and may adjust the number of caution-required locations.

The caution-required locations KP13, CP20, KP14, and KP15 are included in the traveling route R5 of the vehicle 4 in the explanatory view G7. Here, since the caution-required locations KP13, KP14, and KP15 are intersections where traffic lights are installed, the distance range extraction unit 271A, the angle range extraction unit 272A, and the entry angle range extraction unit 273A do not extract the caution-required locations KP13, KP14, and KP15 as notification target points in an interlocking manner.

The distance range extraction unit 271A, the angle range extraction unit 272A, and the entry angle range extraction unit 273A extract a caution-required location CP20 as a notification target point in an interlocking manner, and execute the caution-required location traveling notification on the basis of the positional information and the vehicle control information of the vehicle 4.

Figure 24:
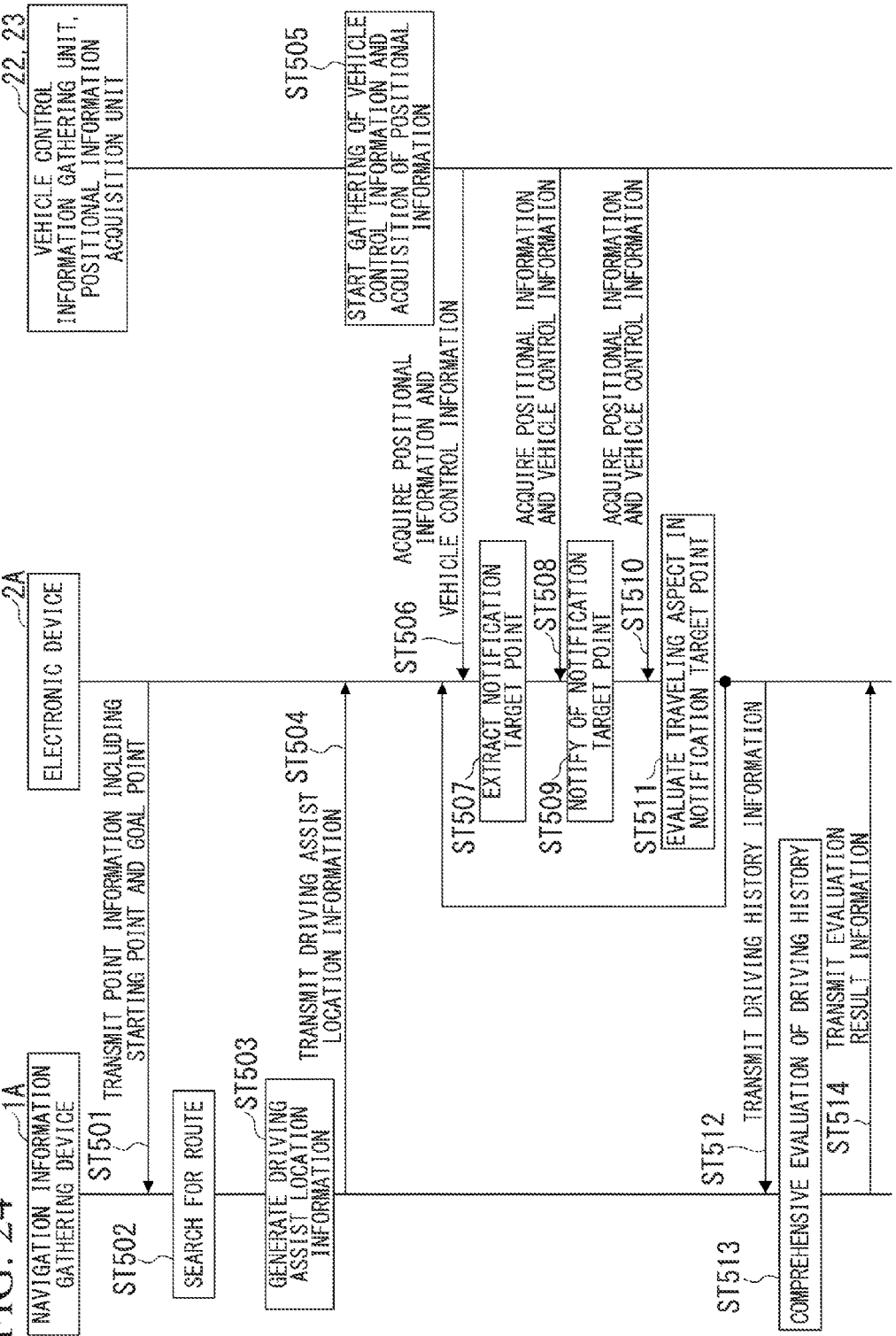
FIG. 24 is a sequence diagram illustrating an example of the operation of a driving assist system related to the present embodiment.

FIG. 24 is a sequence diagram illustrating an example of the operation of the driving assist system S1 related to the present embodiment.

In Step ST501, the electronic device 2A transmits point information including a starting point and a goal point, which is generated by the point information generation unit 29A, to the navigation information gathering device 1A.

In Step ST502, the route information generation unit 101A reads map data from the map storage unit 12, searches for a route on the basis of the starting point and the goal point, which are included in the point information, from the map data, and generates navigation information.

In Step ST503, the safety assist information generation unit 102A of the navigation information gathering device 1A reads an assist point list within the range including the point information from the assist point list storage unit 16, on the basis of the point information received from the electronic device 2A. The safety assist information generation unit 102A matches sudden braking frequent occurrence intersection information included in the assist point list with the map data included in the navigation information, on the basis of the assist point list and the navigation information input from the route information generation unit 101A, and generates driving assist location information.

In Step ST504, the navigation information gathering device 1A transmits the driving assist location information to the electronic device 2A.

In Step ST505, the positional information acquisition unit 22 and the vehicle control information gathering unit 23 of the electronic device 2A start acquisition of the positional information of the vehicle 4 and gathering of the vehicle control information of the vehicle 4.

In Step ST506, the notification determination unit 27A of the electronic device 2A acquires the positional information of the vehicle 4 and the vehicle control information of the vehicle 4 that are acquired or gathered by the positional information acquisition unit 22 and the vehicle control information gathering unit 23.

In Step ST507, the notification determination unit 27A extracts a notification target point from a plurality of caution-required locations included in the assist point list, on the basis of the acquired positional information and vehicle control information.

In Step ST508, the notification determination unit 27A acquires the positional information of the vehicle 4 and the vehicle control information of the vehicle 4 that are acquired or gathered by the positional information acquisition unit 22 and the vehicle control information gathering unit 23.

In Step ST509, the notification determination unit 27A performs notification determination for the extracted notification target point, and executes the caution-required location traveling notification on the basis of the determination result.

In Step ST510, the notification determination unit 27A acquires the positional information of the vehicle 4 and the vehicle control information of the vehicle 4 that are acquired or gathered by the positional information acquisition unit 22 and the vehicle control information gathering unit 23.

In Step ST511, the driving evaluation unit 24 performs evaluation for the traveling aspect of the vehicle 4, on the basis of the traveling aspect of the vehicle 4 within a predetermined range including the notification target point, and notifies the driver of the vehicle 4 of the evaluation result immediately after the vehicle 4 has passed through the notification target point.

In addition, the electronic device 2A repeats the processing of Step ST506 to Step ST511, and performs the processing until the vehicle 4 reaches the goal point from the starting point.

In Step ST512, the electronic device 2A transmits one trip, that is, a traveling history from the starting point to the goal point, to the navigation information gathering device 1A as driving history information.

In Step ST513, the navigation information gathering device 1A stores the driving history information received from the electronic device 2A in the traveling history storage unit 14, and the assist contents unit 17 comprehensively evaluates the driving history.

In Step ST514, the navigation information gathering device 1A transmits evaluation result information including the evaluation result to the electronic device 2A.

Figure 25:
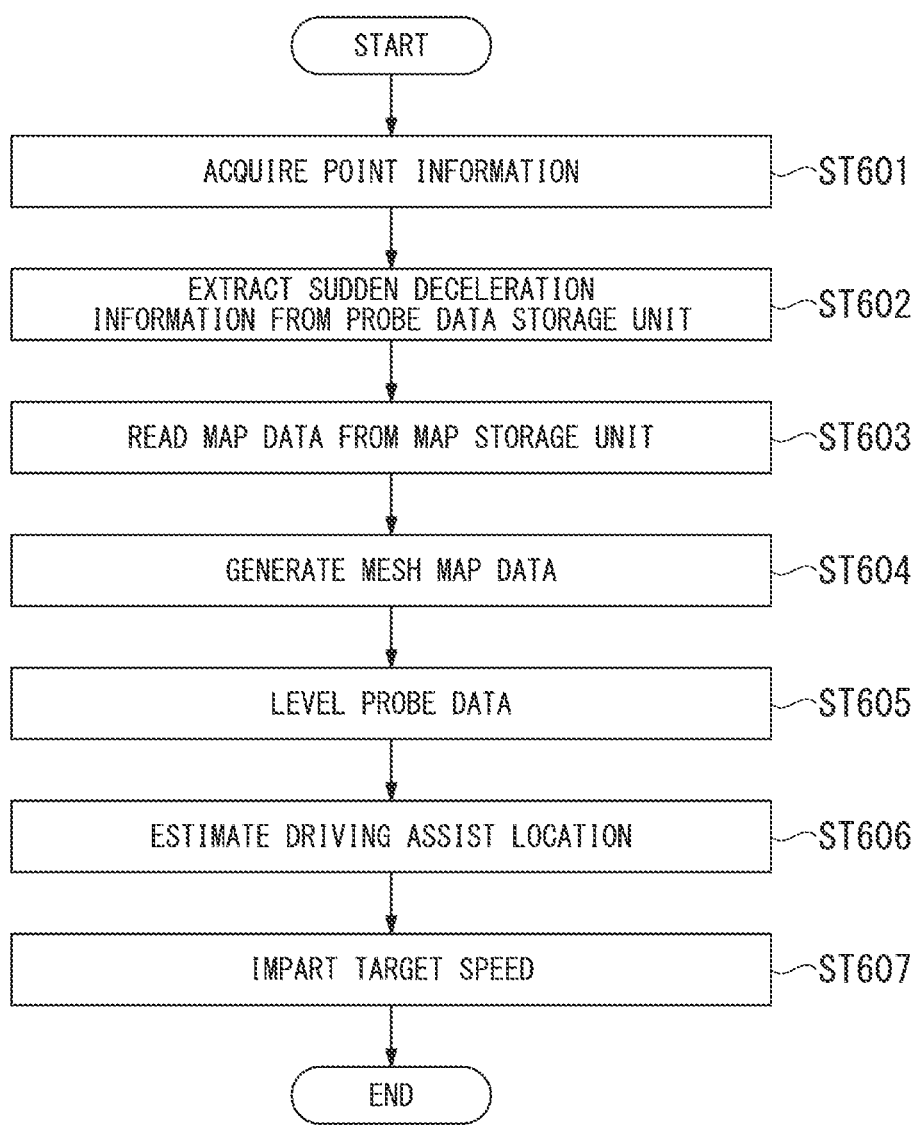
FIG. 25 is a flowchart illustrating an example of the assist point list extraction processing of an assist point list estimation unit related to the present embodiment.

FIG. 25 is a flowchart illustrating an example of assist point list extraction processing of the assist point list estimation unit 15A related to the present embodiment.

In Step ST601, the point extraction unit 151A acquires point information from the electronic device 2A via the communication unit 19A and the network N1.

In Step ST602, the point extraction unit 151A reads a predetermined range of probe data including the point information from the probe data storage unit 11, and extracts, from the probe data, sudden deceleration information, including a position where a sudden deceleration phenomenon corresponding to a predetermined condition (for example, the vehicle speed information is deceleration equal to or higher than a threshold) has occurred and the traveling direction of the vehicle when the sudden deceleration phenomenon occurred.

In Step ST603, the division unit 152 reads map data from the map storage unit 12.

In Step ST604, the first mesh division unit 1521 divides a predetermined range of the map data into block-shaped meshes in the latitudinal direction and the longitudinal direction, and generates first mesh map data. The second mesh division unit 1522 divides one mesh in the first mesh map data into, for example, nine meshes, and generates second mesh map data.

In Step ST605, the leveling unit 154 refers to the probe data, and levels one or both of the probe data and sudden braking occurrence intersections estimated by the intersection estimation unit 153 in a predetermined period.

In Step ST606, the intersection estimation unit 153 estimates the sudden braking frequent occurrence intersections as driving assist locations, on the basis of the first mesh map data, the second mesh map data, the number of sudden deceleration occurrence points, a sudden deceleration orientation, and sudden deceleration probability.

In Step ST607, the target speed imparting unit 156 imparts target speeds, which are calculated for each of links in the sudden braking frequent occurrence intersections and become targets for safely passing through the sudden braking frequent occurrence intersections, to the sudden braking frequent occurrence intersections, on the basis of the probe data and the map data.

Figure 26:
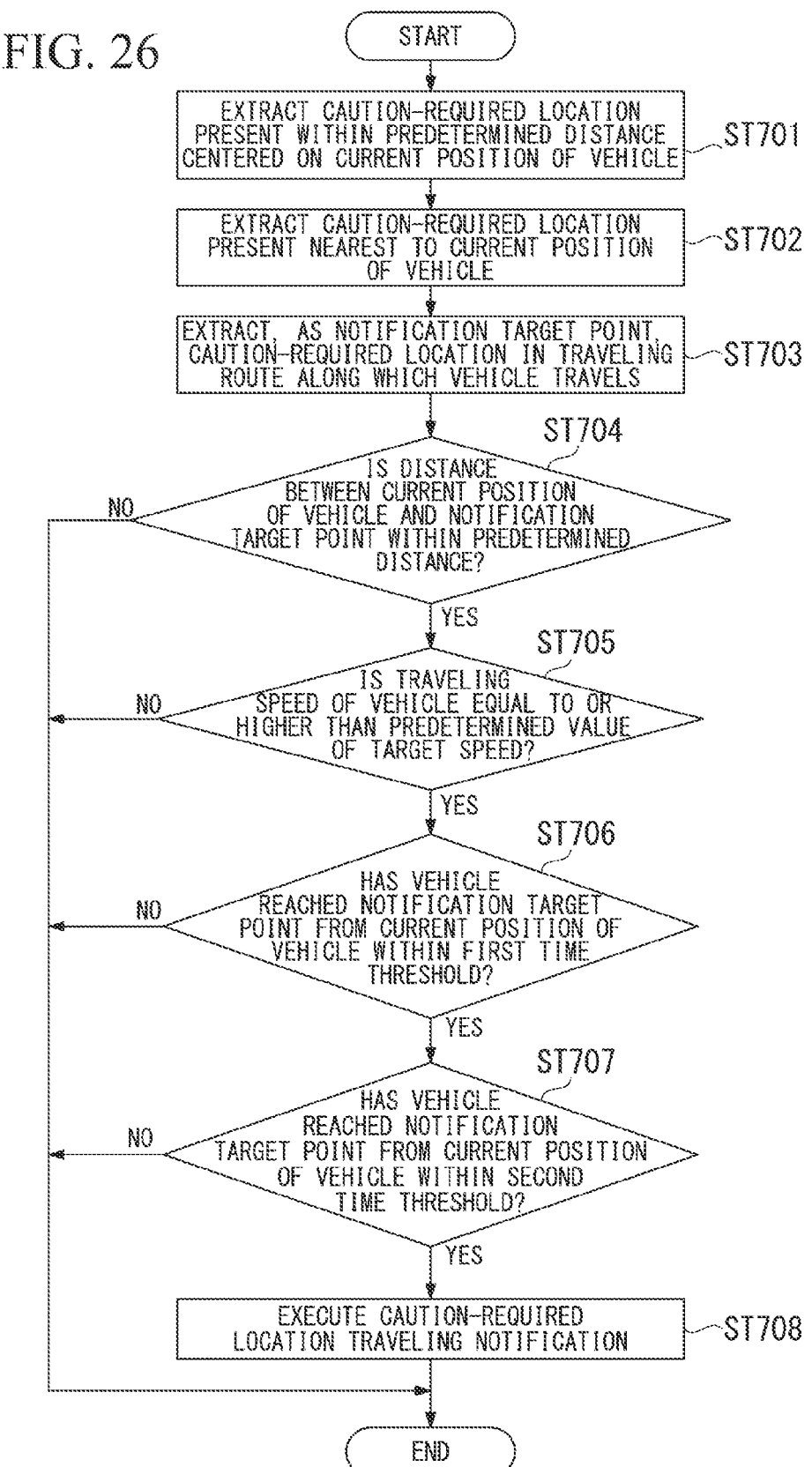
FIG. 26 is a flowchart illustrating an example of notification target point extraction processing and caution-required location traveling notification processing in a notification determination unit related to the present embodiment.

FIG. 26 is a flowchart illustrating an example of notification target point extraction processing and caution-required location traveling notification processing in the notification determination unit 27A related to the present embodiment.

In Step ST701, the distance range extraction unit 271A (first extraction unit) extracts, as a first candidate caution-required location, a sudden braking frequent occurrence intersection, which is present within a predetermined distance range centered on the current position of the vehicle 4, from a plurality of caution-required locations included in the driving assist location information.

In Step ST702, the angle range extraction unit 272A (second extraction unit) extracts, as a second candidate caution-required location, a sudden braking occurrence intersection, which is present nearest to the current position of the vehicle 4, from the plurality of caution-required locations included in the driving assist location information.

In Step ST703, the entry angle range extraction unit 273A (third extraction unit) extracts, as a notification target point, driving assist location information in a link where the vehicle 4 travels with the highest probability as a caution-required location in a traveling route along which the vehicle 4 travels, from caution-required locations extracted in common by both the first candidate caution-required locations extracted by the distance range extraction unit 271A and the second candidate caution-required locations extracted by the angle range extraction unit 272A.

In Step ST704, the distance determination unit 274A determines whether or not the distance between the current position of the vehicle 4 and the notification target point is within a predetermined distance. When the distance between the current position of the vehicle 4 and the notification target point is within the predetermined distance, the processing proceeds to Step ST705. On the other hand, when the distance between the current position of the vehicle 4 and the notification target point is not within the predetermined distance, the caution-required location traveling notification processing is ended without executing the caution-required location traveling notification for the driver of the vehicle 4.

In Step ST705, when the distance between the current position of the vehicle 4 and the notification target point is within the predetermined distance, the speed determination unit 275A compares the traveling speed (operation target speed) of the vehicle 4 with a target speed of the link of the notification target point, and determines whether or not the traveling speed of the vehicle 4 is equal to or higher than a predetermined value of the target speed. When the traveling speed of the vehicle 4 is equal to or higher than the predetermined value of the target speed, the processing proceeds to Step ST706. On the other hand, when the traveling speed of the vehicle 4 is not equal to or higher than the predetermined value of the target speed, the caution-required location traveling notification processing is ended without executing the caution-required location traveling notification for the driver of the vehicle 4.

In Step ST706, when the current traveling speed of the vehicle 4 is a uniform speed, the first time determination unit 276A determines whether or not the vehicle 4 reaches the notification target point from the current position of the vehicle 4 within a first time threshold. When the vehicle 4 reaches the notification target point from the current position of the vehicle 4 within the first time threshold, the processing proceeds to Step ST707. On the other hand, when the vehicle 4 does not reach the notification target point from the current position of the vehicle 4 within the first time threshold, the caution-required location traveling notification processing is ended without executing the caution-required location traveling notification for the driver of the vehicle 4.

In Step ST707, when the current traveling speed of the vehicle 4 is a uniform speed, the second time determination unit 277A determines whether or not the vehicle 4 reaches the notification target point from the current position of the vehicle 4 within a second time threshold. When the vehicle 4 reaches the notification target point from the current position of the vehicle 4 within the second time threshold, the processing proceeds to Step ST708. On the other hand, when the vehicle 4 does not reach the notification target point from the current position of the vehicle 4 within the second time threshold, the caution-required location traveling notification processing is ended without executing the caution-required location traveling notification for the driver of the vehicle 4.

In Step ST708, the execution unit 278A executes the caution-required location traveling notification in the notification target point.

In this way, according to the present embodiment, a notification system (the driving assist system S1) includes: a first extraction unit (the distance range extraction unit 271A) that extracts caution-required locations present within a predetermined distance range centered on a current position of a vehicle from a plurality of caution-required locations of which the positional information is previously acquired; a second extraction unit (the angle range extraction unit 272A) that extracts caution-required locations present within a predetermined angle centered on a current traveling direction of the vehicle from the plurality of caution-required locations; a third extraction unit (the entry angle range extraction unit 273A) that extracts a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted in common by both the first extraction unit (the distance range extraction unit 271A) and the second extraction unit (the angle range extraction unit 272A); and an execution unit 278A that executes a caution-required location traveling notification in accordance with the approach of the vehicle to the caution-required location extracted by the third extraction unit (the entry angle range extraction unit 273A).

Accordingly, the notification system (driving assist system S1) can determine whether or not the caution-required location traveling notification is executed in accordance with the distance from the position of the vehicle at the notification target point, the target speed and the traveling speed, the acceleration/deceleration operation of a notification target vehicle driver, or the time taken for the notification target point to reach a predetermined distance, and can execute the caution-required location traveling notification only with respect to a caution-required location that satisfies predetermined conditions.

Third Embodiment

Hereinafter, a third embodiment of the invention will be described in detail, referring to the drawings.

Figure 27:
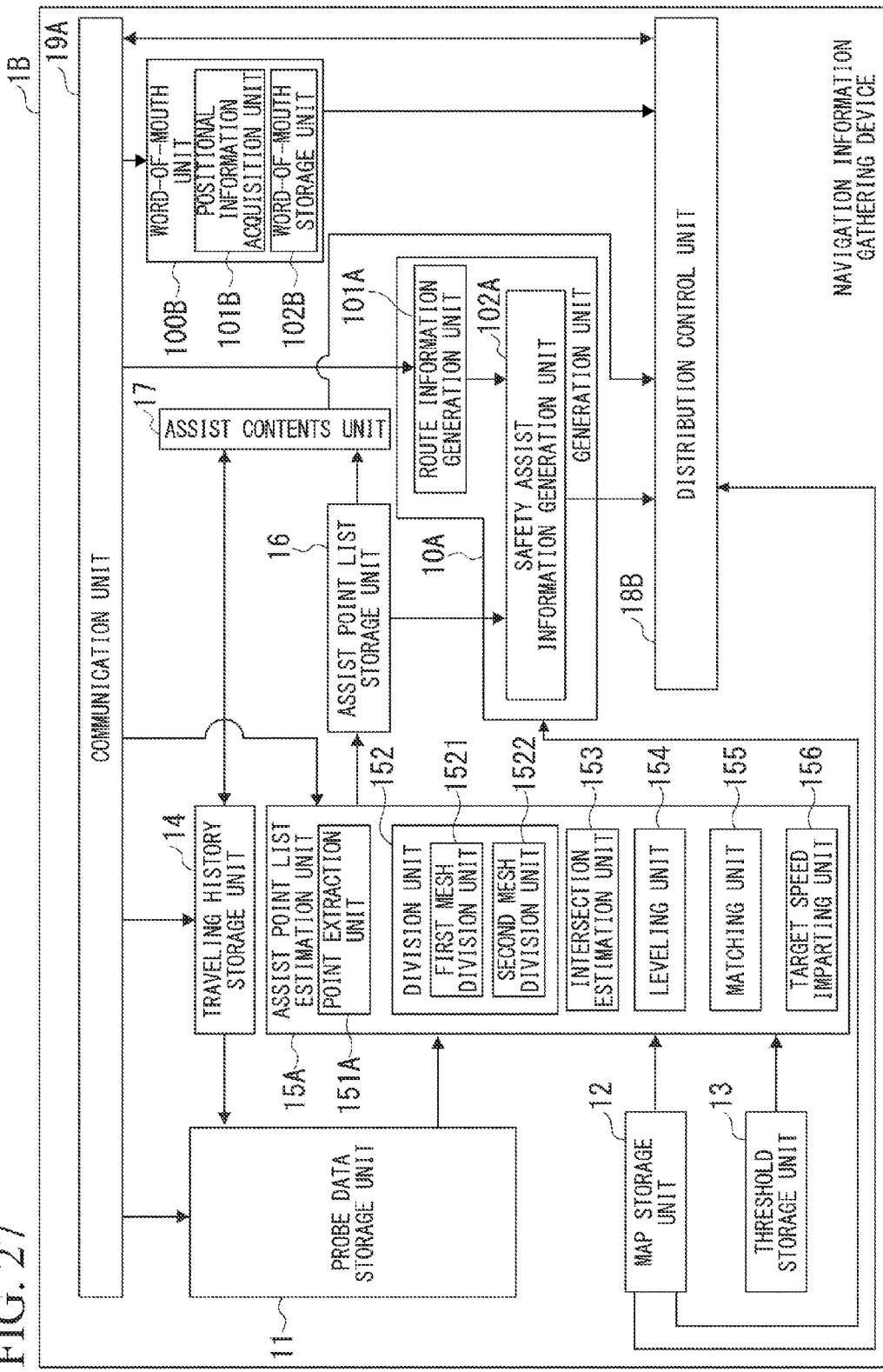
FIG. 27 is a schematic block diagram illustrating an example of the configuration of a navigation information gathering device related to a third embodiment of the invention.

FIG. 27 is a schematic block diagram illustrating an example of the configuration of a navigation information gathering device 1B related to the third embodiment of the invention.

The navigation information gathering device 1B includes the probe data storage unit 11, the map storage unit 12, the threshold storage unit 13, the traveling history storage unit 14, an assist point list estimation unit 15A, the assist point list storage unit 16, the assist contents unit 17, a distribution control unit 18B, the communication unit 19A, the generation unit 10A, and a word-of-mouth unit 100B. The assist point list estimation unit 15A includes the point extraction unit 151A, the division unit 152, the intersection estimation unit 153, the leveling unit 154, the matching unit 155, and the target speed imparting unit 156. The division unit 152 includes the first mesh division unit 1521 and the second mesh division unit 1522. The generation unit 10A includes the route information generation unit 101A and the safety assist information generation unit 102A. The word-of-mouth unit 100B includes a positional information acquisition unit 101B and a word-of-mouth storage unit 102B. In addition, since the operation of the distribution control unit 18A is different from that of the distribution control unit 18B, the description thereof will be made.

When the navigation information gathering device 1A related to the second embodiment and the navigation information gathering device 1B related to the third embodiment are compared with each other, the word-of-mouth unit 100B is added in the navigation information gathering device 1B. Since the other configurations are the same as those of the navigation information gathering device 1A related to the second embodiment, the description thereof will be omitted.

The word-of-mouth unit 100I3 acquires, via networks, word of mouth including positional information and road safety information in the positions thereof that a plurality of users provide to social media, and stores the acquired word-of-mouth information.

Specifically, the positional information acquisition unit 10113 acquires word of mouth, and acquires the positional information on which the word of mouth is posted, through well-known techniques. Also, the positional information acquisition unit 101B stores word-of-mouth information, in which the acquired positional information and the word of mouth are matched with each other, in the word-of-mouth storage unit 102B. Here, the word of mouth is road safety information, for example, information including experiences, comments, or the like when traveling at a certain point. Additionally, positional information and road safety information in the positions thereof are included in the word-of-mouth information.

Additionally, the word-of-mouth unit 100B compares positional information of driving assist locations that the assist point list storage unit 16 stores with the positional information included in the word-of-mouth information, matches the driving assist locations with the word-of-mouth information, and stores the matched information in the word-of-mouth storage unit 102B.

The distribution control unit 18B controls the distribution of the applications managed by the assist contents unit 17. Additionally, the distribution control unit 18B performs the control of transmitting driving assist location information, which is input from the safety assist information generation unit 102A, to the electronic device 2B via the communication unit 19A and the network N1. Additionally, the distribution control unit 18 performs the control of transmitting contents information, which is input from the assist contents unit 17, to the electronic device 2B via the communication unit 19A and the network N1.

When word-of-mouth information related with the positions of caution-required locations included in the driving assist location information input from the safety assist information generation unit 102A is stored in the word-of-mouth storage unit 102B, the distribution control unit 18B performs the control of distributing the word-of-mouth information and the driving assist location information to the electronic device 2B.

Figure 28:
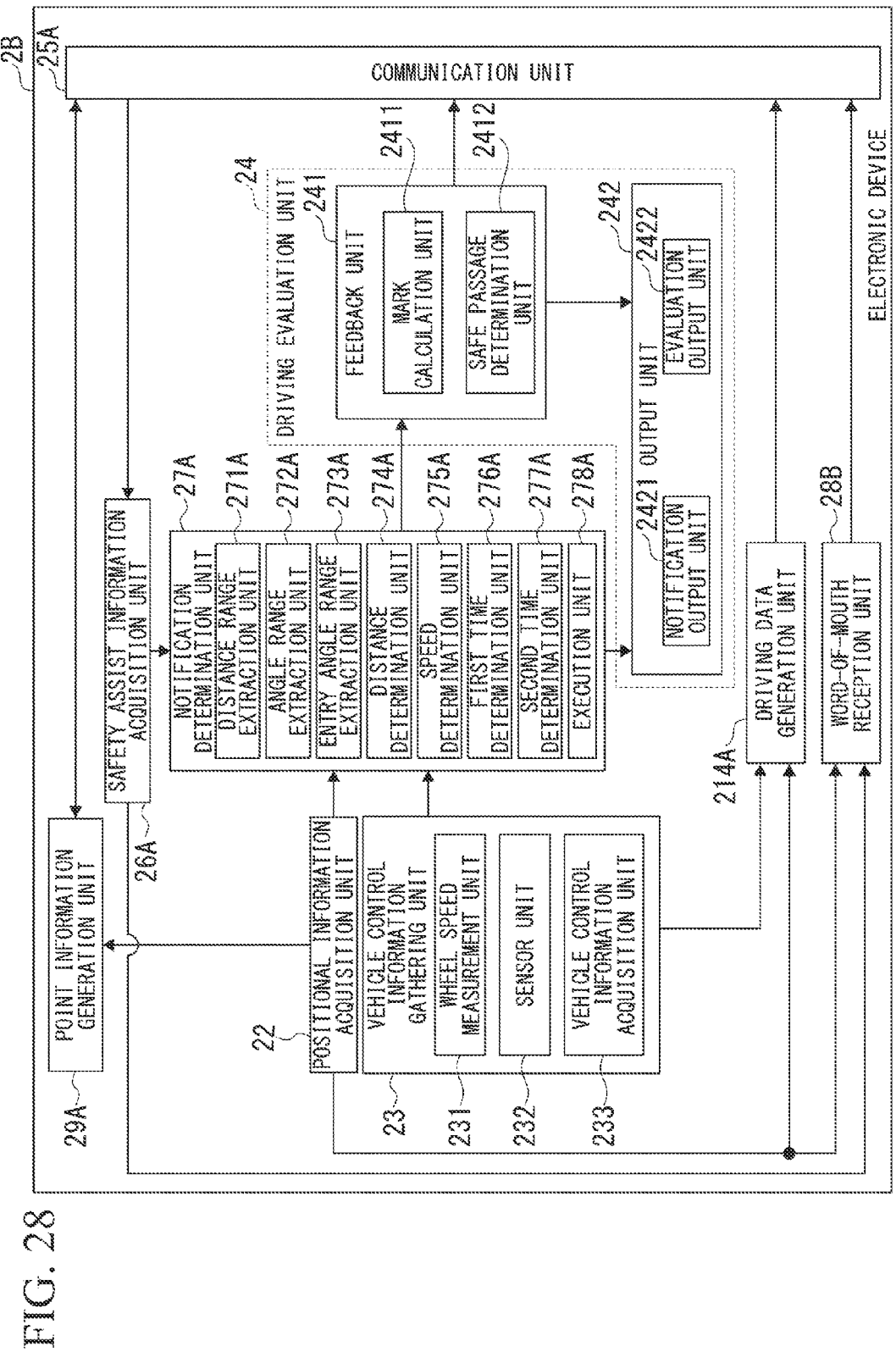
FIG. 28 is a schematic block diagram illustrating an example of the configuration of an electronic device related to the present embodiment.

FIG. 28 is a schematic block diagram illustrating an example of the configuration of the electronic device 2B related to the present embodiment. The electronic device 2B includes the driving data generation unit 214A, the positional information acquisition unit 22, the vehicle control information gathering unit 23, the driving evaluation unit 24, the communication unit 25A, the safety assist information acquisition unit 26A, the notification determination unit 27A, the point information generation unit 29A, and a word-of-mouth reception unit 28B. The vehicle control information gathering unit 23 includes the wheel speed measurement unit 231, the sensor unit 232, and the vehicle control information acquisition unit 233. The driving evaluation unit 24 includes the feedback unit 241 and the output unit 242. The feedback unit 241 includes the mark calculation unit 2411 and the safe passage determination unit 2412. The output unit 242 includes the notification output unit 2421 and the evaluation output unit 2422. The notification determination unit 27A includes the distance range extraction unit 271A, the angle range extraction unit 272A, the entry angle range extraction unit 273A, the distance determination unit 274A, the speed determination unit 275A, the first time determination unit 276A, the second time determination unit 277A, and the execution unit 278A.

If the electronic device 2A related to the second embodiment is compared with the electronic device 2B related to the third embodiment, the word-of-mouth reception unit 28B is added in the electronic device 2B. Since the other configurations are the same as those of the electronic device 2A, the description thereof will be omitted.

The word-of-mouth reception unit 28B receives posting of, for example, word of mouth including road safety information from the driver of the vehicle 4 to social media. The word-of-mouth reception unit 28B matches the caution-required locations included in the positional information of the vehicle 4 and the driving assist location information with the word of mouth, and posts the results to social media via the communication unit 25A.

Figure 29:
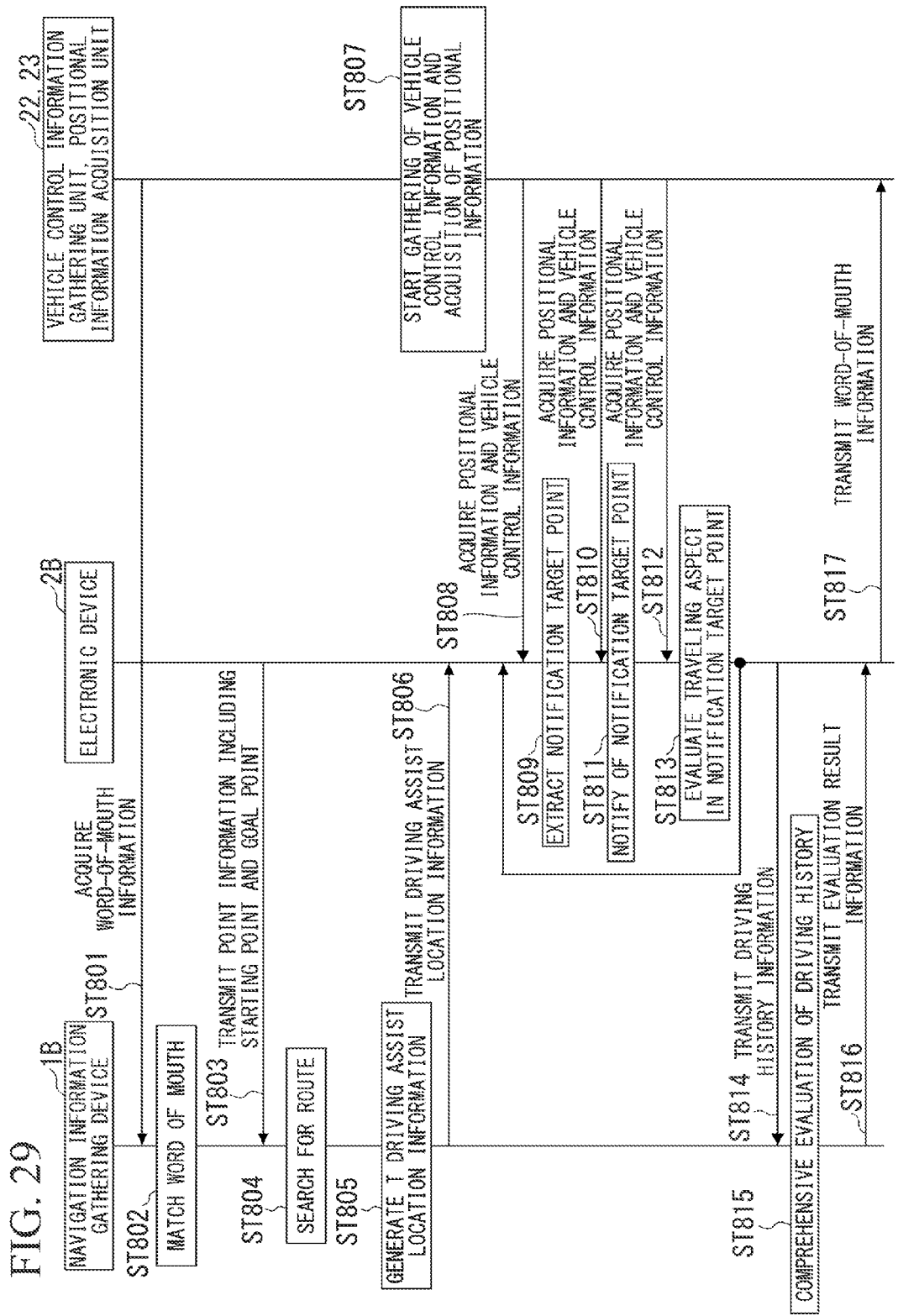
FIG. 29 is a sequence diagram illustrating an example of the operation of the driving assist system related to the present embodiment.

FIG. 29 is a sequence diagram illustrating an example of the operation of the driving assist system S1 related to the present embodiment.

In Step ST801, the word-of-mouth unit 100B acquires word-of-mouth information from a word-of-mouth server device (social media server device).

In Step ST802, the positional information acquisition unit 101B stores word-of-mouth information, in which the acquired positional information and the word of mouth are matched with each other, in the word-of-mouth storage unit 102B.

In Step ST803, the electronic device 2B transmits point information including a starting point and a goal point, which is generated by the point information generation unit 29A, to the navigation information gathering device 1B.

In Step ST804, the route information generation unit 101A reads map data from the map storage unit 12, searches for a route on the basis of the starting point and the goal point, which are included in the point information, from the map data, and generates navigation information.

In Step ST805, the safety assist information generation unit 102A of the navigation information gathering device 1B reads an assist point list within the range including the point information from the assist point list storage unit 16, on the basis of the point information received from the electronic device 2B. The safety assist information generation unit 102A matches sudden braking frequent occurrence intersection information included in the assist point list with the map data included in the navigation information, on the basis of the assist point list and the navigation information input from the route information generation unit 101A, and generates driving assist location information.

In Step ST806, the navigation information gathering device 1B transmits the driving assist location information to the electronic device 2B.

In Step ST807, the positional information acquisition unit 22 and the vehicle control information gathering unit 23 of the electronic device 2B start acquisition of the positional information of the vehicle 4 and gathering of the vehicle control information of the vehicle 4.

In Step ST808, the notification determination unit 27A of the electronic device 2B acquires the positional information of the vehicle 4 and the vehicle control information of the vehicle 4 that are acquired or gathered by the positional information acquisition unit 22 and the vehicle control information gathering unit 23.

In Step ST809, the notification determination unit 27A extracts a notification target point from a plurality of caution-required locations included in the assist point list, on the basis of the acquired positional information and vehicle control information.

In Step ST810, the notification determination unit 27A acquires the positional information of the vehicle 4 and the vehicle control information of the vehicle 4 that are acquired or gathered by the positional information acquisition unit 22 and the vehicle control information gathering unit 23.

In Step ST811, the notification determination unit 27A performs notification determination for the extracted notification target point, and executes the caution-required location traveling notification on the basis of the determination result.

In Step ST812, the notification determination unit 27A acquires the positional information of the vehicle 4 and the vehicle control information of the vehicle 4 that are acquired or gathered by the positional information acquisition unit 22 and the vehicle control information gathering unit 23.

In Step ST813, the driving evaluation unit 24 performs evaluation for the traveling aspect of the vehicle 4, on the basis of the traveling aspect of the vehicle 4 within a predetermined range including the notification target point, and notifies the driver of the vehicle 4 of the evaluation result immediately after the vehicle 4 has passed through the notification target point.

In addition, the electronic device 2B repeats the processing of Step ST808 to Step ST813, and performs the processing until the vehicle 4 reaches the goal point from the starting point.

In Step ST814, the electronic device 2B transmits one trip, that is, a traveling history from the starting point to the goal point, to the navigation information gathering device 1B as driving history information.

In Step ST815, the navigation information gathering device 1B stores the driving history information received from the electronic device 2B in the traveling history storage unit 14, and the assist contents unit 17 comprehensively evaluates the driving history.

In Step ST816, the navigation information gathering device 1B transmits evaluation result information including the evaluation result to the electronic device 2B.

In Step ST817, the word-of-mouth reception unit 28B transmits the received word-of-mouth information to the word-of-mouth server device (social media server device).

Figure 30:
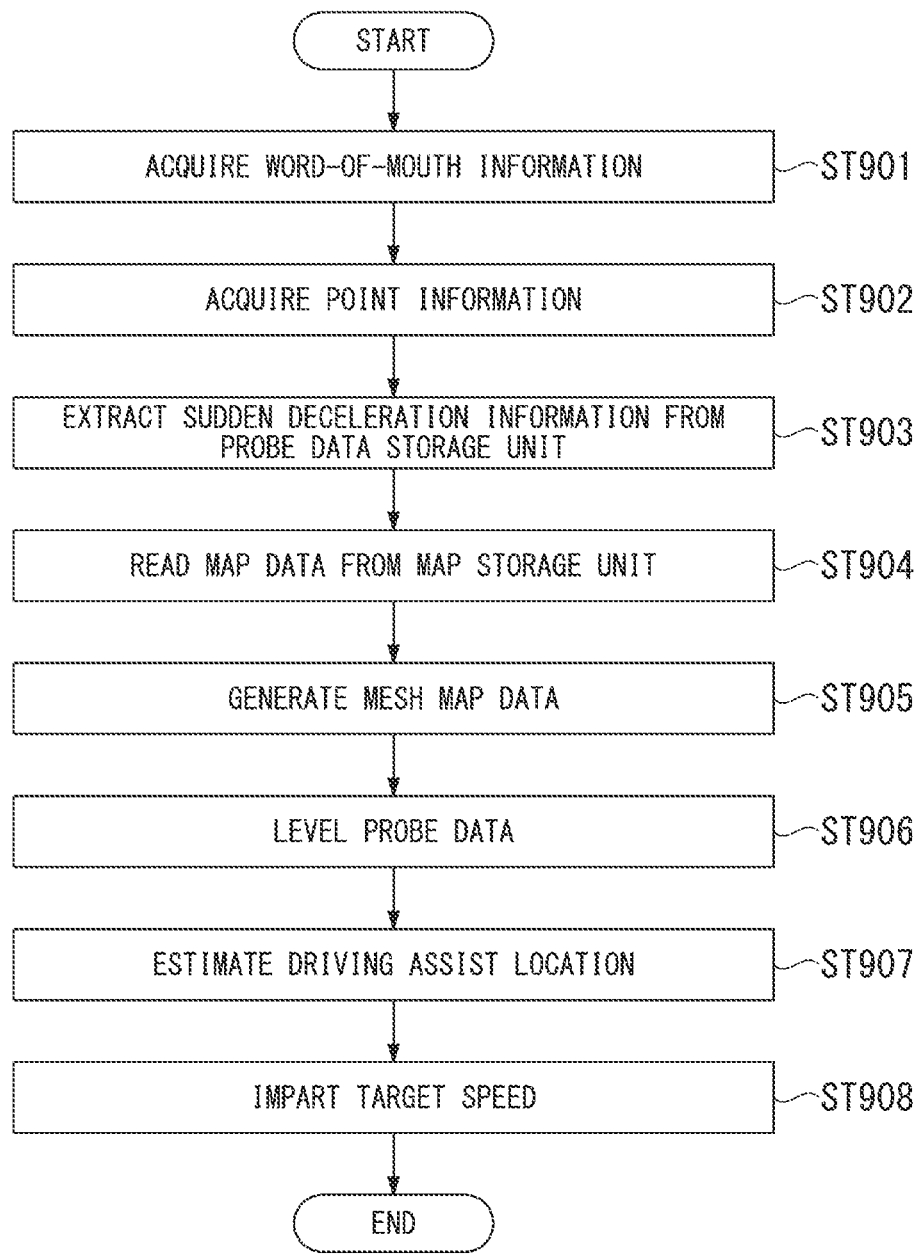
FIG. 30 is a flowchart illustrating an example of assist point list extraction processing of an assist point list estimation unit related to the present embodiment.

FIG. 30 is a flowchart illustrating an example of assist point list extraction processing of the assist point list estimation unit 15A related to the present embodiment.

In Step ST901, the word-of-mouth unit 100B acquires word-of-mouth information from social media.

In Step ST902, the point extraction unit 151A acquires point information from the electronic device 2B via the communication unit 19A and the network N1.

In Step ST903, the point extraction unit 151A reads a predetermined range of probe data including the point information from the probe data storage unit 11, and extracts, from the probe data, sudden deceleration information, including a position where a sudden deceleration phenomenon corresponding to a predetermined condition (for example, the vehicle speed information is deceleration equal to or higher than a threshold) has occurred and the traveling direction of the vehicle when the sudden deceleration phenomenon occurred.

In Step ST904, the division unit 152 reads map data from the map storage unit 12.

In Step ST905, the first mesh division unit 1521 divides a predetermined range of the map data into block-shaped meshes in the latitudinal direction and the longitudinal direction, and generates first mesh map data. The second mesh division unit 1522 divides one mesh in the first mesh map data into, for example, nine meshes, and generates second mesh map data.

In Step ST906, the leveling unit 154 refers to the probe data, and levels one or both of the probe data and sudden braking frequent occurrence intersections estimated by the intersection estimation unit 153 in a predetermined period.

In Step ST907, the intersection estimation unit 153 estimates the sudden braking frequent occurrence intersections as driving assist locations, on the basis of the first mesh map data, the second mesh map data, the number of sudden deceleration occurrence points, a sudden deceleration orientation, and sudden deceleration probability.

In Step ST908, the target speed imparting unit 156 imparts target speeds, which are calculated for the links in the sudden braking frequent occurrence intersections and become targets for safely passing through the sudden braking frequent occurrence intersections, to the sudden braking frequent occurrence intersections, on the basis of the probe data and the map data.

In this way, according to the present embodiment, a notification system (the driving assist system S1) includes: a first extraction unit (the distance range extraction unit 271A) that extracts caution-required locations present within a predetermined distance range centered on a current position of a vehicle from a plurality of caution-required locations of which the positional information is previously acquired; a second extraction unit (the angle range extraction unit 272A) that extracts caution-required locations present within a predetermined angle centered on a current traveling direction of the vehicle from the plurality of caution-required locations; a third extraction unit (the entry angle range extraction unit 273A) that extracts a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted in common by both the first extraction unit (the distance range extraction unit 271A) and the second extraction unit (the angle range extraction unit 272A); and an execution unit 278A that executes a caution-required location traveling notification in accordance with the approach of the vehicle to the caution-required location extracted by the third extraction unit (the entry angle range extraction unit 273A).

Accordingly, the notification system (driving assist system S1) can extract the caution-required location where the current position of the vehicle 4 is present within the predetermined distance range where the vehicle 4 is located, within the predetermined angle centered on the current traveling direction of the vehicle 4, and within the predetermined angle range centered on the orientation of the link through which the vehicle 4 is determined to pass through, from the plurality of caution-required locations, and can execute the caution-required location traveling notification in response to the vehicle 4 approaching the caution-required location. For this reason, a user's convenience when the caution-required location is reported can be improved.

In addition, in the above-described embodiments, searching of a traveling route may be performed by either an electronic device or a navigation information gathering device, or evaluation of the traveling aspect of the driving evaluation unit 24 may also be performed by either an electronic device or a navigation information gathering device. Additionally, a case where the output unit 242 performs the caution-required location traveling notification has been described. However, for example, the output unit may output a control signal that controls a drive unit or a braking unit (not illustrated) in accordance with caution-required locations while the vehicle 4 is traveling, and may perform the control of applying a reaction force to, for example, the drive unit.

Additionally, in the above-described embodiments, intersections are extracted as caution-required locations (driving assist locations). However, arbitrary locations in roads, for example, locations where children run out a lot, locations where accidents occur frequently, locations where a driver's skill is required during traveling, locations where there is a building height limitation of vehicles, or the like may be extracted as caution-required locations, and drivers may be notified of execution of the caution-required location traveling notification and evaluation results obtained by evaluating traveling aspects in the caution-required locations.

In addition, some or all of a navigation information gathering device and an electronic device in the above-described embodiments may be realized using a computer. In that case, this realization can be performed by recording programs for realizing the functions of controlling these devices on computer-readable recording media and making the programs recorded on the recording media be read into and executed in a computer system. In addition, the "computer system" herein is a computer system built in a navigation information gathering device and an electronic device, and includes operating systems (OS) or hardware such as peripheral devices.

Additionally, the "computer-readable recording media" mean portable media, such as flexible disks, magnetic-optical disks, ROMs, or CD-ROMs, and storage devices, such as hard disks, built into the computer system. Moreover, the "computer-readable recording media" may include recording media that dynamically hold the programs for a short time, like communication lines in cases where the programs are transmitted via networks, such as the Internet, or communication lines, such as telephone lines, or recording media that hold the programs for a certain period of time, like volatile memories inside the computer system serving as a server or a client in that case.

Moreover, the above programs may be programs for realizing some of the aforementioned functions, or may be programs that can realize the aforementioned functions in combination with the programs already recorded on the computer system.

Additionally, some or all of a navigation information gathering device and an electronic device in the above-described embodiments may be realized as integrated circuits, such as large scale integrations (LSIs). The functional blocks of a navigation information gathering device and an electronic device may be individually made as processors, or may be made as processors in which some or all of the blocks are integrated. Additionally, the techniques of making the integrated circuits may be realized by personal circuits or general-purpose processors, and are not limited to the LSIs. Additionally, when the techniques of making the integrated circuits substituting the LSIs appear with the advancement of semiconductor technology, integrated circuits using the techniques may be used.

Although embodiments of the invention have been described in detail with reference to the drawings, the specific configuration of the invention is not limited to the above-described embodiments, and various design changes or the like may be made without departing from the scope of the invention.

In addition, the techniques of the above-described first to third embodiments can be suitably combined and used. Additionally, some constituent elements may be omitted.

DESCRIPTION OF REFERENCE SYMBOLS

S1: DRIVING ASSIST SYSTEM (MAP GENERATION SYSTEM)
S2: NAVIGATION INFORMATION GATHERING SYSTEM
S3, S3-1, S3-2: NAVIGATION SYSTEM
1, 1A, 1B: NAVIGATION INFORMATION GATHERING DEVICE (MAP GENERATION DEVICE)
2, 2-1, 2-2, 2-3, 2A, 2B: ELECTRONIC DEVICE (MAP GENERATION DEVICE)
3: VEHICLE-MOUNTED TERMINAL DEVICE
4, 4-1, 4-2: VEHICLE
N1: NETWORK
10A: GENERATION UNIT
101A: ROUTE INFORMATION GENERATION UNIT
102A: SAFETY ASSIST INFORMATION GENERATION UNIT
11: PROBE DATA STORAGE UNIT
12: MAP STORAGE UNIT (STORAGE UNIT)
13: THRESHOLD STORAGE UNIT
14: TRAVELING HISTORY STORAGE UNIT
15, 15A: ASSIST POINT LIST ESTIMATION UNIT
151, 151A: POINT EXTRACTION UNIT (EXTRACTION UNIT)
152: DIVISION UNIT
1521: FIRST MESH DIVISION UNIT
1522: SECOND MESH DIVISION UNIT
153: INTERSECTION ESTIMATION UNIT (ESTIMATION UNIT)
154: LEVELING UNIT
155: MATCHING UNIT
156: TARGET SPEED IMPARTING UNIT
16: ASSIST POINT LIST STORAGE UNIT
17: ASSIST CONTENTS UNIT
18, 18A, 18B: DISTRIBUTION CONTROL UNIT
19, 19A: COMMUNICATION UNIT
100B: WORD-OF-MOUTH UNIT
101B: POSITIONAL INFORMATION ACQUISITION UNIT
102B: WORD-OF-MOUTH STORAGE UNIT
21: GENERATION UNIT
211: ROUTE INFORMATION GENERATION UNIT
212: ASSIST POINT LIST ACQUISITION UNIT
213: SAFETY ASSIST INFORMATION GENERATION UNIT
214, 214A: DRIVING DATA GENERATION UNIT
22: POSITIONAL INFORMATION ACQUISITION UNIT
23: VEHICLE CONTROL INFORMATION GATHERING UNIT
231: WHEEL SPEED MEASUREMENT UNIT
232: SENSOR UNIT
233: VEHICLE CONTROL INFORMATION ACQUISITION UNIT
24: DRIVING EVALUATION UNIT
241: FEEDBACK UNIT
2411: MARK CALCULATION UNIT
2412: SAFE PASSAGE DETERMINATION UNIT
242: OUTPUT UNIT
2421: NOTIFICATION OUTPUT UNIT
2422: EVALUATION OUTPUT UNIT
25, 25A: COMMUNICATION UNIT
26A: SAFETY ASSIST INFORMATION ACQUISITION UNIT
27A: NOTIFICATION DETERMINATION UNIT
271A: DISTANCE RANGE EXTRACTION UNIT
272A: ANGLE RANGE EXTRACTION UNIT
273A: ENTRY ANGLE RANGE EXTRACTION UNIT
274A: DISTANCE DETERMINATION UNIT
275A: SPEED DETERMINATION UNIT
276A: FIRST TIME DETERMINATION UNIT
277A: SECOND TIME DETERMINATION UNIT
278A: EXECUTION UNIT
28B: WORD-OF-MOUTH RECEPTION UNIT
29A: POINT INFORMATION GENERATION UNIT

The invention claimed is:

1. A notification system comprising:
a first extraction unit configured to extract caution-required locations present within a predetermined distance range centered on a current position of a vehicle from a plurality of caution-required locations of which the positional information is previously acquired;
a second extraction unit configured to extract caution-required locations present within a predetermined angle centered on a current traveling direction of the vehicle from the plurality of caution-required locations;
a third extraction unit configured to extract, as a notification target point, a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted in common by both the first extraction unit and the second extraction unit; and
an execution unit configured to execute a caution-required location traveling notification in accordance with the approach of the vehicle to the notification target point extracted by the third extraction unit.

2. The notification system according to claim 1,
wherein a target speed, which is calculated for each of the caution-required locations and each of the links and becomes a target for safely passing through a caution-required location is included in the information of the plurality of links,
wherein the notification system further comprises:
a distance determination unit configured to determine whether or not the distance between the current position of the vehicle and the notification target point is within a predetermined distance;
a measurement unit configured to measure a traveling speed of the vehicle;
a speed determination unit configured to compare the traveling speed of the vehicle measured by the measurement unit and the target speed of the link of the caution-required location;
a first time determination unit configured to determine whether or not the vehicle reaches the notification target point from the current position of the vehicle within a first time threshold when the vehicle travels at the traveling speed measured by the measurement unit; and a second time determination unit configured to determine whether or not the vehicle reaches the notification target point from the current position of the vehicle within a second time threshold when the vehicle travels at the traveling speed measured by the measurement unit, and wherein the execution unit executes the caution-required location traveling notification in the notification target point, on the basis of determination results of the distance determination unit, the speed determination unit, the first time determination unit, and the second time determination unit.

3. The notification system according to claim 1, wherein the execution unit provides an operation allowable angle range where the caution-required location traveling notification is allowed to be executed around the orientation of the notification target point and executes the caution-required location traveling notification when the current position of the vehicle is present within the operation allowable angle range.

4. The notification system according to claim 1, wherein the execution unit does not execute the caution-required location traveling notification when a minimum speed of the vehicle within a past predetermined period of time exceeds a given speed.

5. The notification system according to claim 1, wherein the caution-required location is a caution-required location where a caution is predicted and determined to be required when a vehicle passes through a certain point, on the basis of the traveling history of a plurality of vehicles that is previously generated.

6. An electronic device comprising:
a first extraction unit configured to extract caution-required locations present within a predetermined distance range centered on a current position of a vehicle from a plurality of caution-required locations of which the positional information is previously acquired;

a second extraction unit configured to extract caution-required locations present within a predetermined angle centered on a current traveling direction of the vehicle from the plurality of caution-required locations;

a third extraction unit configured to extract a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted in common by both the first extraction unit and the second extraction unit; and an execution unit configured to execute a caution-required location traveling notification in accordance with the approach of the vehicle to the caution-required location extracted by the third extraction unit.

7. A notification method comprising:
a first process, executed by a first extraction unit, of extracting caution-required locations present within a predetermined distance range centered on a current position of a vehicle from a plurality of caution-required locations of which the positional information is previously acquired;

a second process, executed by a second extraction unit, of extracting caution-required locations present within a predetermined angle centered on a current traveling direction of the vehicle from the plurality of caution-required locations;

a third process, executed by a third extraction unit, of extracting a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted in common by both the first process and the second process; and a fourth process of executing a caution-required location traveling notification in accordance with the approach of the vehicle to the caution-required location extracted in the third process.

8. A non-transitory computer readable medium storing a program when executed causes a computer to execute:
a first step of extracting caution-required locations present within a predetermined distance range centered on a current position of a vehicle from a plurality of caution-required locations of which the positional information is previously acquired;

a second step of extracting caution-required locations present within a predetermined angle centered on a current traveling direction of the vehicle from the plurality of caution-required locations;

a third step of extracting a caution-required location where the current position of the vehicle is present within a predetermined angle range centered on the orientation of a link through which the vehicle is determined to pass by referring to map data holding information of a plurality of links in which positions and orientations are matched with each other, from caution-required locations extracted in common by both the first step and the second step; and a fourth step of executing a caution-required location traveling notification in accordance with the approach of the vehicle to the caution-required location extracted in the third step.

* * * * *